US012448306B2

(12) United States Patent
Lopez-Ruiz et al.

(10) Patent No.: US 12,448,306 B2
(45) Date of Patent: Oct. 21, 2025

(54) ELECTROCATALYTIC BIO-OIL AND WASTEWATER TREATMENT

(71) Applicant: Battelle Memorial Institute, Richland, WA (US)

(72) Inventors: Juan A. Lopez-Ruiz, Richland, WA (US); Jonathan D. Egbert, Richland, WA (US); Charles J. Freeman, West Richland, WA (US); Oliver Y. Gutiérrez Tinoco, Richland, WA (US); Jamelyn D. Holladay, Kennewick, WA (US); Daniel T. Howe, Pasco, WA (US); Yang Qiu, Richland, WA (US); Ismael A. Rodriguez Perez, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 301 days.

(21) Appl. No.: 17/213,810

(22) Filed: Mar. 26, 2021

(65) Prior Publication Data

US 2021/0300799 A1    Sep. 30, 2021

Related U.S. Application Data

(60) Provisional application No. 63/114,573, filed on Nov. 17, 2020, provisional application No. 63/000,665, filed on Mar. 27, 2020.

(51) Int. Cl.

| | |
|---|---|
| *C02F 1/467* | (2023.01) |
| *B01J 23/46* | (2006.01) |
| *B82Y 30/00* | (2011.01) |
| *B82Y 40/00* | (2011.01) |
| *C02F 1/461* | (2023.01) |
| *C02F 101/32* | (2006.01) |
| *C02F 101/34* | (2006.01) |
| *C02F 101/38* | (2006.01) |

(52) U.S. Cl.
CPC ........... *C02F 1/4672* (2013.01); *B01J 23/462* (2013.01); *C02F 1/46114* (2013.01); *B82Y 30/00* (2013.01); *B82Y 40/00* (2013.01); *C02F 2001/46142* (2013.01); *C02F 2101/32* (2013.01); *C02F 2101/34* (2013.01); *C02F 2101/38* (2013.01); *C02F 2101/40* (2013.01); *C02F 2301/046* (2013.01)

(58) Field of Classification Search
None
See application file for complete search history.

(56) References Cited

U.S. PATENT DOCUMENTS

| | | | |
|---|---|---|---|
| 4,179,347 A | | 12/1979 | Krause et al. |
| 4,479,864 A | * | 10/1984 | Kanai ................... C02F 1/4674 204/291 |
| 6,663,783 B2 | | 12/2003 | Stephenson et al. |
| 10,364,168 B2 | | 7/2019 | Canicio Bardolet et al. |
| 2002/0134674 A1 | * | 9/2002 | Andrews ................... C25B 9/00 204/242 |
| 2004/0115518 A1 | * | 6/2004 | Masel ..................... H01M 4/96 429/492 |
| 2012/0132519 A1 | * | 5/2012 | Kang .................... H01M 4/621 204/242 |

FOREIGN PATENT DOCUMENTS

| | | | |
|---|---|---|---|
| CA | 2632788 A1 | | 11/2009 |
| CN | 110550597 A | * | 12/2019 |
| WO | WO-0109907 A1 | * | 2/2001 .......... C02F 1/46109 |

OTHER PUBLICATIONS

Chauhan et al., "Electrochemical denitrification of highly contaminated actual nitrate wastewater by Ti/RuO$_2$ anode and iron cathode," *Chemical Engineering Journal*, Jun. 24, 2019, vol. 386, 13 pages; download from https://doi.org/10.1016/j.cej.2019.122065.

Holzhäuser et al., "(Non-)Kolbe electrolysis in biomass valorization—a discussion of potential applications," *Green Chem.* 2020, published Dec. 20, 2019, 22:286-301.

Vahidhabanu et al., "Effect of Ruthenium Oxide/Titanium Mesh Anode Microstructure on Electrooxidation of Pharmaceutical Effluent," *Int J Waste Resources*, Jan. 2015, 5(4):1-5; downloaded from http://dx.doi.org/10.4172/2252-5211.1000191.

* cited by examiner

*Primary Examiner* — Ryan B Huang
(74) *Attorney, Agent, or Firm* — Klarquist Sparkman, LLP

(57) ABSTRACT

An anode, a flow cell including the anode, and a method for electrocatalytic treatment of bio-oil and/or wastewater are disclosed. The anode comprises RuO$_2$ particles on a titanium support. The method includes flowing a process stream through the flow cell in the absence of added hydrogen, at a temperature of 0° C. to 50° C. and atmospheric pressure, and applying a potential across the flow cell such that the anode is positive with respect to the cathode, thereby electrocatalytically oxidizing compounds in the process stream to produce a treated process stream at the anode and generating hydrogen gas as a byproduct at the cathode.

20 Claims, 22 Drawing Sheets

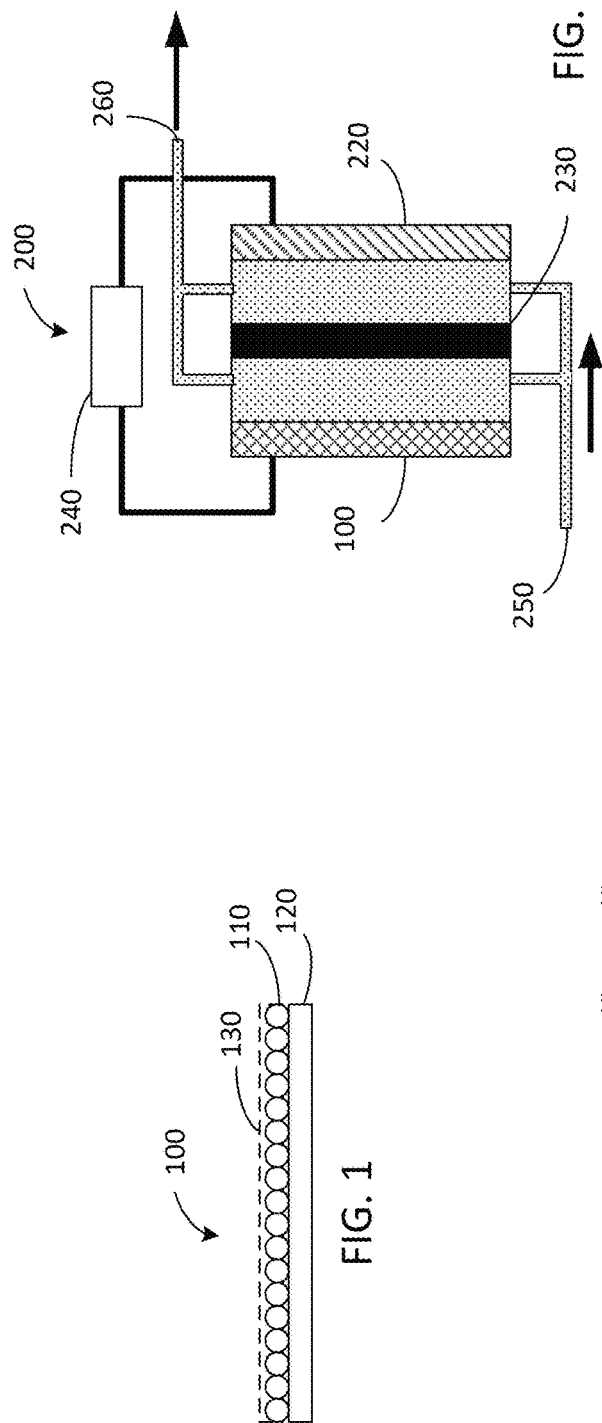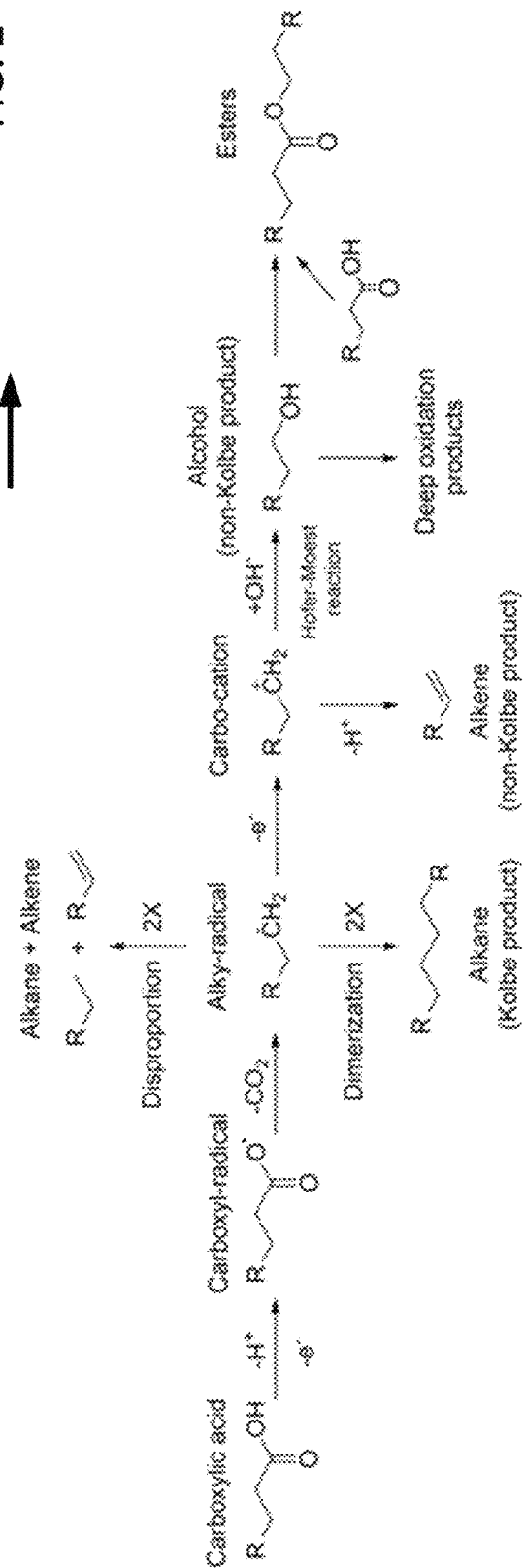

FIG. 5A
FIG. 5B
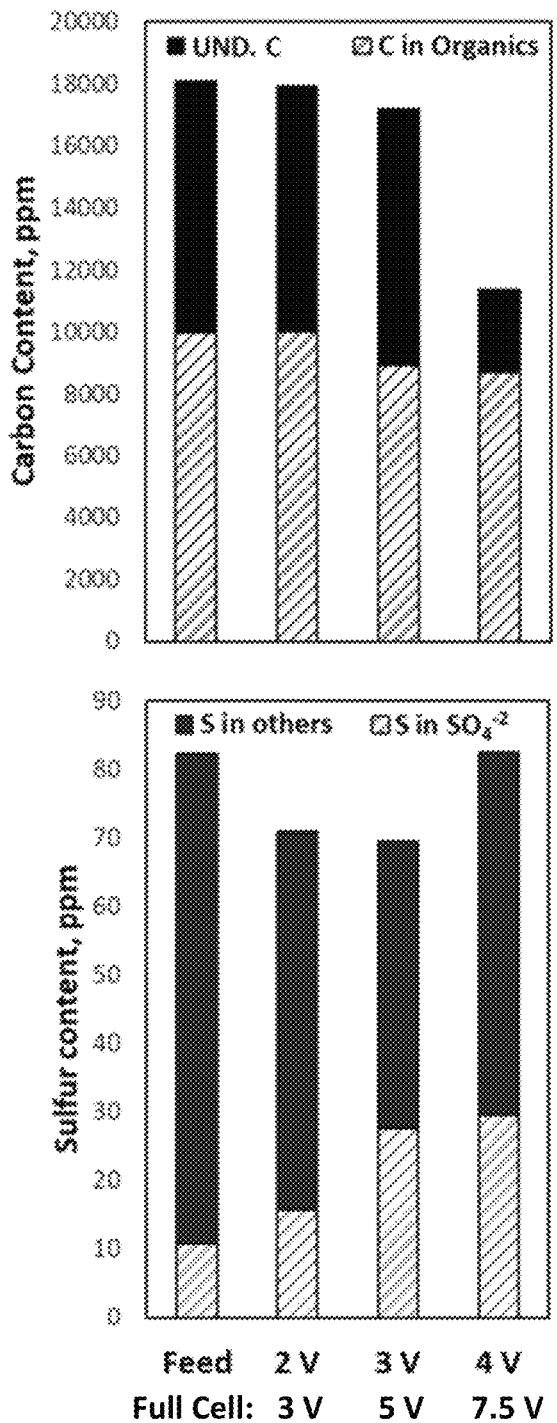
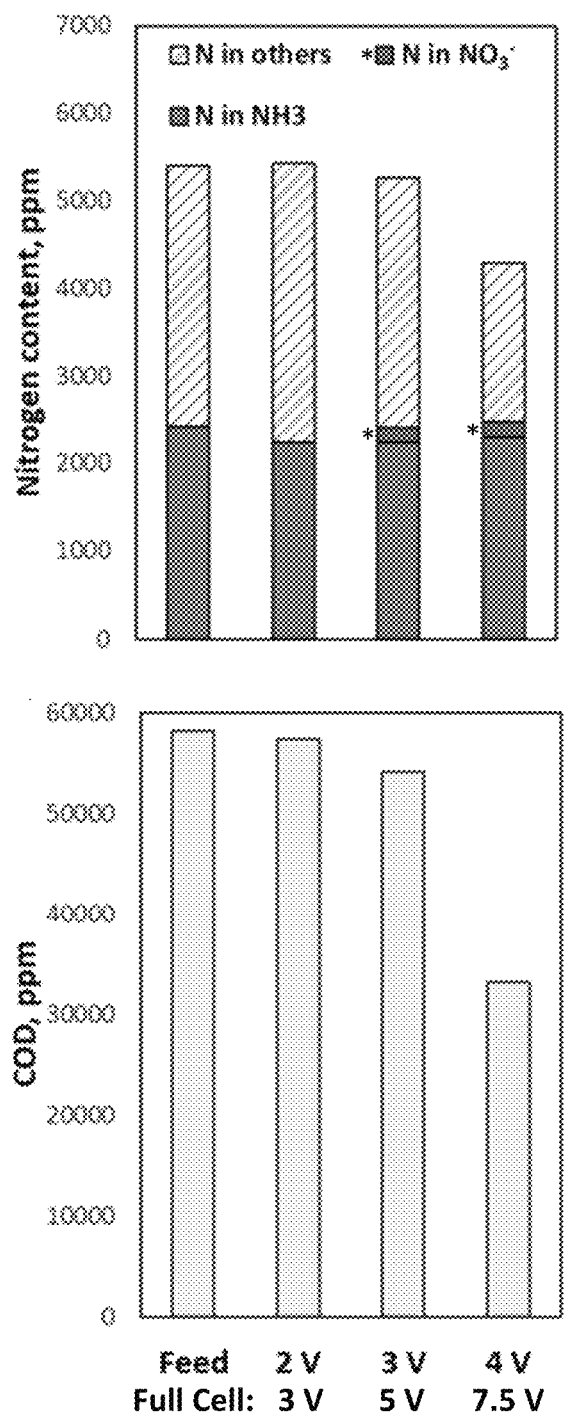
FIG. 5C
FIG. 5D

FIG. 7

| Substrate | Carbon-based product selectivity / % | | | | | | | | | | |
|---|---|---|---|---|---|---|---|---|---|---|---|
| Acetic acid | Methanol 8.19 | Formaldehyde 3.11 | Methane 0.66 | Ethane 30.89 | Methyl-acetate 1.99 | $CO_2$ 31.03 | CO 1.06 | UND. 23.57 | | | |
| Propanoic acid | Formaldehyde 0.38 | Ethane | Ethylene 33.59 | Ethanol 20.77 | Acetic acid 1.78 | $CO_2$ 28.73 | CO 0.11 | UND. 14.58 | | | |
| Butanoic acid | Ethylene 0.17 | Acetaldehyde 0.63 | Acetic acid 0.24 | Propane 0.66 | Propylene 24.39 | 1-propanol 5.59 | Propanoic acid 0.77 | Hexane 35.09 | $CO_2$ 19.2 | CO 0.05 | UND. 13.21 |
| Acetamide | Ethylene 2.81 | Acetic acid 85.78 | 2,3-Butanediol 2.15 | $CO_2$ 5.75 | $NH_3$ 6.88 | UND. 18.65 | | | | | |
| 2-pyrrolidinone | Methanol 87.37 | 2-propanol 12.62 | $CO_2$ 0.01 | UND. 0 | | | | | | | |
| Acetone | Methanol 2.92 | Formaldehyde 6.6 | Formic acid 3.23 | Methane 0.46 | Acetic acid 64.79 | $CO_2$ 17.2 | CO 5.8 | UND. 0 | | | |
| MEK | Methanol 3.25 | Formaldehyde 1.83 | Formic acid 1.54 | Methane 0.08 | Ethanol 6.19 | Acetaldehyde 4.48 | Acetic acid 88.79 | Ethylene 4.87 | $CO_2$ 5.4 | CO 0.05 | UND. 0.06 |
| Ethylene glycol | Formaldehyde 47.05 | Glycolaldehyde 22.35 | Levo-glucosan 8.1 | CO 1.16 | Ethanol 15.4 | $CO_2$ UND. | Propanoic acid 1.88 | $CO_2$ 2.06 | | | |
| Glycolic acid | Formaldehyde 16.69 | Formic acid 4.86 | $CO_2$ 19.69 | Ethane 26.04 | UND. 32.72 | | | | | | |

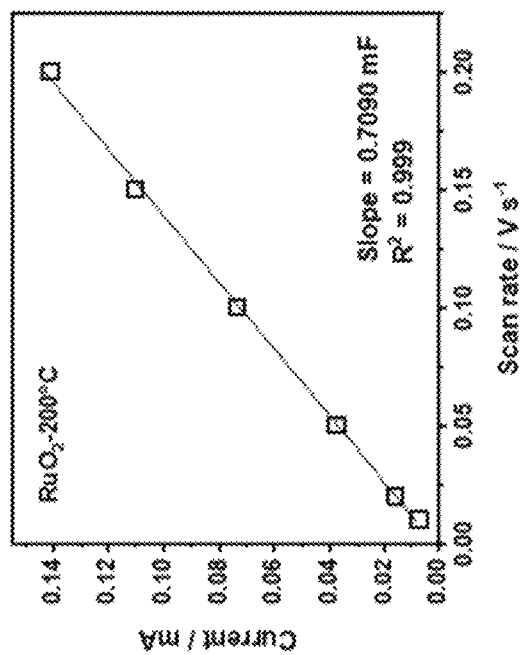
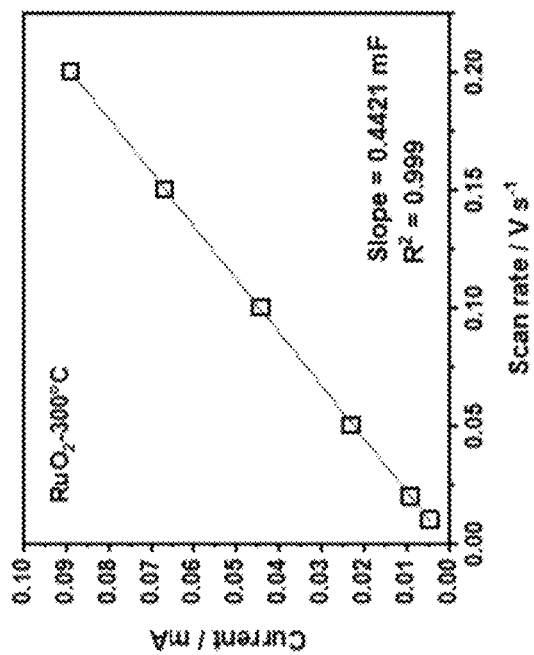
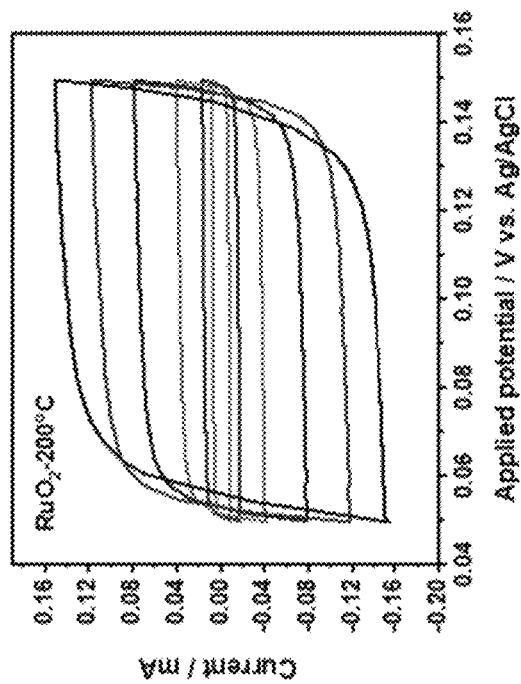
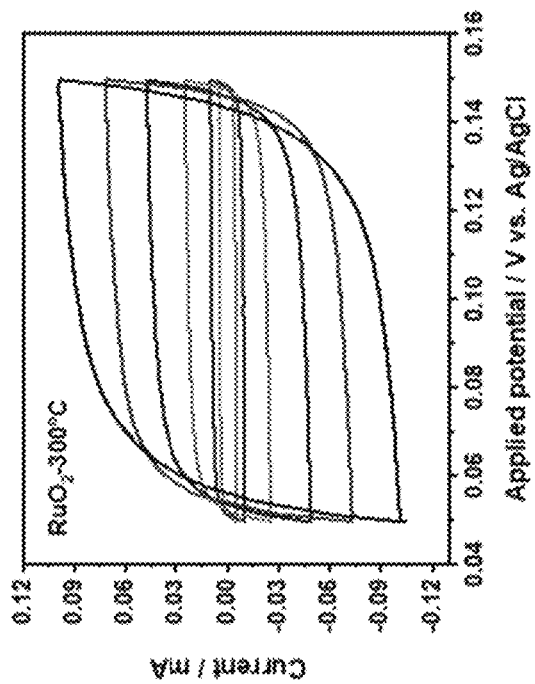
FIG. 21A
FIG. 21B

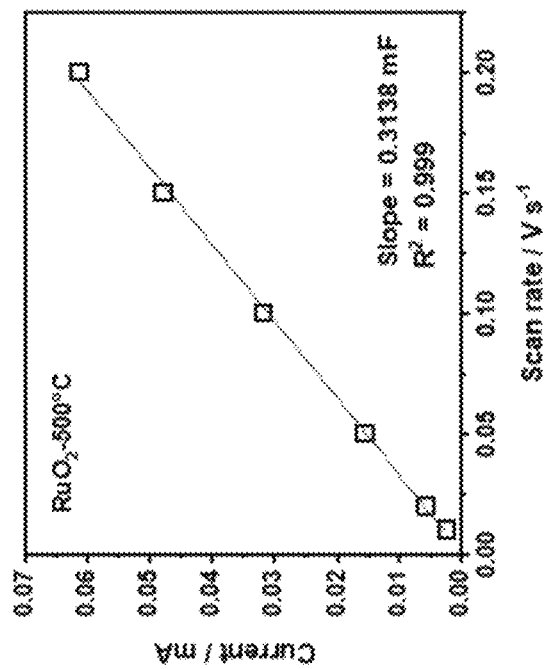
FIG. 21C
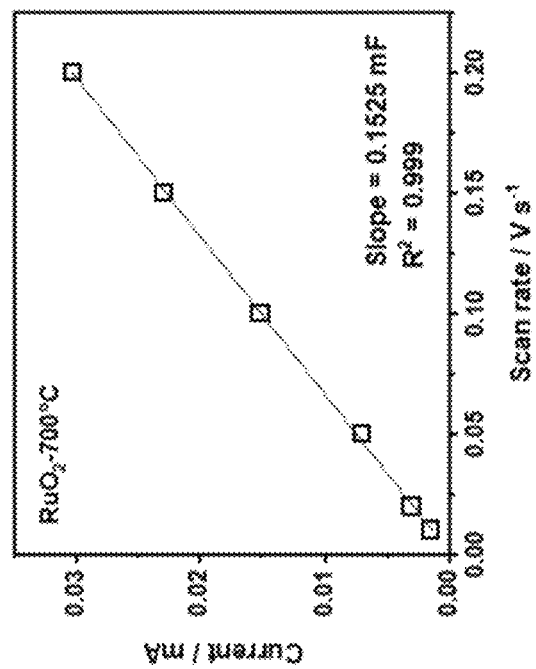
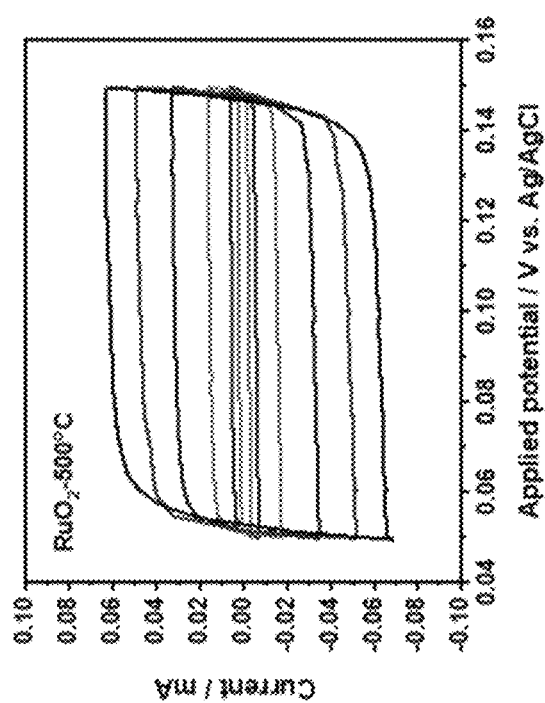
FIG. 21D
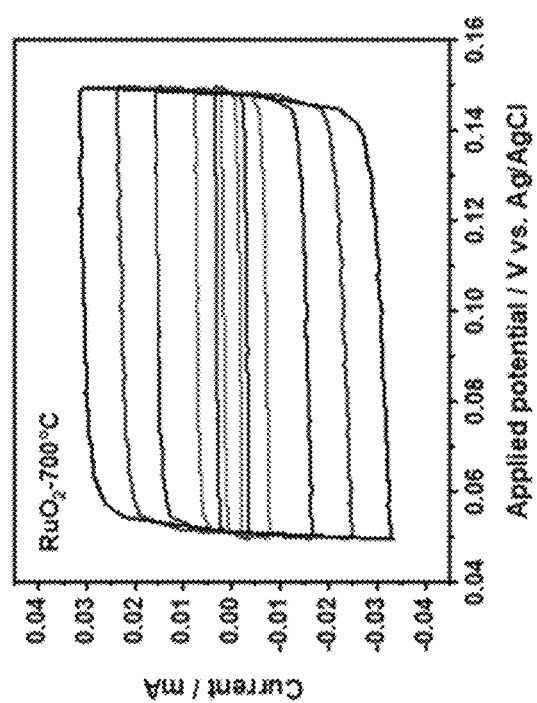

ELECTROCATALYTIC BIO-OIL AND WASTEWATER TREATMENT

CROSS REFERENCE TO RELATED APPLICATIONS

This application claims the benefit of the earlier filing dates of U.S. Provisional Application No. 63/114,573, filed Nov. 17, 2020, and U.S. Provisional Application No. 63/000,665, filed Mar. 27, 2020, each of which is incorporated by reference in its entirety herein.

ACKNOWLEDGMENT OF GOVERNMENT SUPPORT

This invention was made with Government support under Contract DE-AC05-76RL01830 awarded by the U.S. Department of Energy. The Government has certain rights in the invention.

FIELD

This disclosure concerns an anode and method for electrocatalytic treatment of bio-oil and/or wastewater.

BACKGROUND

Biomass may be converted to bio-oils with wastewater as a byproduct. During the biomass valorization processes, deoxygenation steps (e.g., dehydration, hydrogenation, decarboxylation) reduce oxygen content from biomass-derived molecules. Traditional bio-oil stabilization and hydrotreating is performed to remove oxygen and requires intermediate temperatures (>120° C.), moderate pressures (>10 MPa), and added $H_2$ (about 2500 L $H_2$/L bio-oil). Current wastewater treatment methods are selective towards the removal of certain organic and nitrogen-containing compounds. Anaerobic digestion, used for biogas generation, is inhibited by carboxylic acids at the concentrations generated in biomass- and bio-fuels-processing facilities. Electrocatalytic methods may be used, but require high energy input, and generate low-pressure $H_2$ and low-grade volatile hydrocarbons that do not have a commercial application. Additionally, current electrocatalytic methods are not effective for upgrading the main constituents of bio-oils and wastewaters, i.e., carboxylic acids and amides. Thermocatalytic wastewater treatment methods (gasification) that can upgrade carboxylic acids require moderate to high temperatures (e.g., 200° C. to 500° C.), moderate pressure (e.g., 0.6 MPa to 6 MPa), and an external $H_2$ supply, and the catalysts deactivate over time. A need exists for a process that can be used for co-treatment of bio-oil and wastewater at low temperatures and pressures, and without the need for added $H_2$.

SUMMARY

Embodiments of an anode, a flow cell comprising the anode, and a method of using the flow cell for electrocatalytic treatment of bio-oil and/or wastewater are disclosed. The anode may include a support comprising titanium, and $RuO_2$ particles deposited onto a surface of the support. The $RuO_2$ particles may have an average size of 10 nm to 200 nm, such as an average size of 10 nm to 50 nm. In any of the foregoing or following embodiments, the support may comprise titanium foil. In any of the foregoing or following embodiments, the anode may further include a polymeric coating on the $RuO_2$ particles. In some embodiments, the polymeric coating comprises poly(vinylidene fluoride) or a tetrafluoroethylene polymer. In any of the foregoing or following embodiments, the anode may have (i) a specific surface area of 40 $m^2$ $g_{RuO2}^{-1}$ to 100 $m^2$ $g_{RuO2}^{-1}$; or (ii) an electrochemical surface area of 25 $m^2$ $g_{RuO2}^{-1}$ to 60 $m^2$ $g_{RuO2}^{-1}$; or (iii) both (i) and (ii).

Embodiments of a flow cell may include an anode as disclosed herein, a cathode, and a separator positioned between the anode and the cathode. In some embodiments, the cathode comprises Pd/C or Cu/C.

A method for electrocatalytic treatment of a process stream includes flowing a process stream through a flow cell as disclosed herein, in the absence of added hydrogen, and applying a potential across the flow cell such that the anode is positive with respect to the cathode, thereby electrocatalytically oxidizing compounds in the process stream to produce a treated process stream at the anode and generating hydrogen gas as a byproduct at the cathode. The process may be performed at a temperature of 0° C. to 50° C. and at atmospheric pressure. In some implementations, the potential is from 2 V to 5 V vs. a reversible hydrogen electrode (RHE). In any of the foregoing or following embodiments, the anode may have (i) an areal electrocatalytic decarboxylation rate to areal oxygen evolution reaction rate ratio of at least 1; or (ii) a hydrocarbon selectivity of at least 20%; or (iii) both (i) and (ii).

In any of the foregoing or following embodiments, the process stream may comprise a crude bio-oil, wastewater, or a combination thereof. In some embodiments, the process stream is provided by hydrothermal liquefaction of a feedstock.

In any of the foregoing or following embodiments, electrocatalytically oxidizing the compounds in the process stream may include decarboxylating carboxylic acids, oxidizing nitrogen-containing compounds, oxidizing sulfur-containing compounds, or any combination thereof. In some embodiments, the process stream comprises organic compounds and electrocatalytically oxidizing the organic compounds produces aliphatic compounds, ketones, esters, alcohols, or a combination thereof. In some implementations, the aliphatic compounds comprise C1-C8 aliphatic compounds, and the method further includes separating the C1-C8 aliphatic compounds from the treated process stream, and using at least a portion of C1-C8 aliphatic compounds to generate heat.

In any of the foregoing or following embodiments, at least a portion of the hydrogen gas may be used to generate electricity. In some embodiments, when the process stream comprises a crude bio-oil, the method further includes using at least a portion of the hydrogen gas in a subsequent catalytic hydrotreatment of the treated process stream. In some implementations, when the process stream comprises wastewater and electrocatalytically oxidizing compounds in the process stream produces hydrocarbons and gases, the method further includes separating the gases and the hydrocarbons from water in the treated process stream, utilizing at least a portion of the hydrocarbons to generate heat, recycling at least a portion of the water to a hydrothermal liquefaction process.

The foregoing and other objects, features, and advantages of the invention will become more apparent from the following detailed description, which proceeds with reference to the accompanying figures.

BRIEF DESCRIPTION OF THE DRAWINGS

FIG. 1 is a cross-sectional schematic diagram of an exemplary anode as disclosed herein.

FIG. 2 is a cross-sectional schematic diagram of an exemplary flow cell as disclosed herein.

FIG. 3 is a reaction scheme for formation of Kolbe products, non-Kolbe products, esters, and deep oxidation products by electrolysis of carboxylic acids.

FIGS. 5A-5D show the composition of hydrothermal liquefaction (HTL)-derived aqueous feedstock as a function of applied potential after 48 hours of oxidation treatment using Pt electrodes as the anode and cathode at room temperature; FIG. 5A is the carbon content (UND. C=unidentified carbon compounds), FIG. 5B is the nitrogen content, FIG. 5C is the sulfur content, and FIG. 5D is the chemical oxygen demand (COD).

FIG. 7 is a table showing the products formed by ECO of single compounds at 5 V vs. Ag/AgCl on Pt electrodes after 2 hours of reaction.

FIGS. 21A-21D show electrochemical capacitance measurements to determine the electrochemical surface area of $RuO_2$ nanoparticles calcined at 200° C. (FIG. 21A), 300° C. (FIG. 21B), 500° C. (FIG. 21C), and 700° C. (FIG. 21D); the left panels are cyclic voltammograms to determine the capacitive current from double-layer charging in a non-Faradaic potential region, conducted in $N_2$-saturated 0.14 M $Na_2SO_4$ solution (pH 6) at scanning rates of 10, 20, 50, 100, 150, and 200 mV $s^{-1}$; the right panels show measured capacitive currents as a function of scan rate.

DETAILED DESCRIPTION

Figure 4:
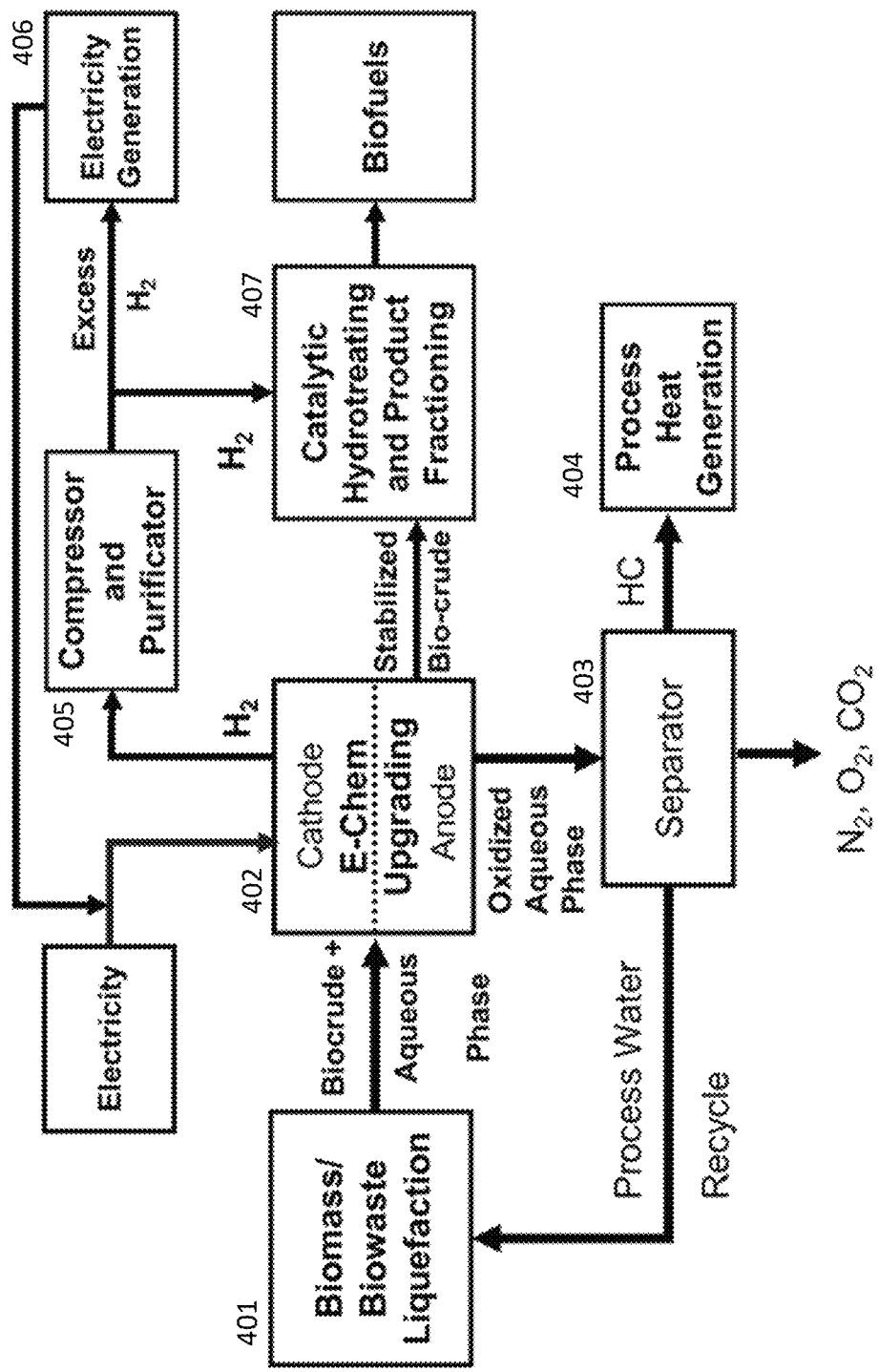
FIG. 4 is a simplified process diagram of one embodiment of a combined HTL-ECO process for electrochemically upgrading both aqueous waste and biocrude.

Embodiments of an anode, a flow cell comprising the anode, and a method of using the flow cell for electrocatalytic treatment of bio-oil and/or wastewater are disclosed. In some embodiments, the anode comprises $RuO_2$ particles deposited on a titanium support. The method includes flowing a process stream through the flow cell in the absence of added hydrogen, at a temperature of 0° C. to 50° C. and atmospheric pressure, and applying a potential across the flow cell such that the anode is positive with respect to the cathode, thereby electrocatalytically oxidizing compounds in the process stream to produce a treated process stream and generating hydrogen gas as a byproduct. In some embodiments the process stream comprises a crude bio-oil, wastewater, or a combination thereof. Advantageously, the method can be used for co-treatment of bio-oil and wastewater generated during biomass liquefaction processes, such as hydrothermal liquefaction and pyrolysis. The generated hydrogen may be used for subsequent hydrotreatment of compounds in the treated process stream and/or for electricity generation, thereby reducing the energy consumption and costs of the process.

I. DEFINITIONS

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, molarities, voltages, capacities, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Although there are alternatives for various components, parameters, operating conditions, etc. set forth herein, that does not mean that those alternatives are necessarily equivalent and/or perform equally well. Nor does it mean that the alternatives are listed in a preferred order unless stated otherwise.

Definitions of common terms in chemistry may be found in Richard J. Lewis, Sr. (ed.), *Hawley's Condensed Chemical Dictionary*, published by John Wiley & Sons, Inc., 2016 (ISBN 978-1-118-13515-0).

In order to facilitate review of the various embodiments of the disclosure, the following explanations of specific terms are provided:

Alcohol: An organic compound including at least one hydroxyl group. Alcohols may be monohydric (including one-OH group), dihydric (including two-OH groups; diols, such as glycols), trihydric (including three-OH; triols, such as glycerol) groups, or polyhydric (including three or more-OH groups; polyols). The organic portion of the alcohol may be aliphatic, cycloaliphatic (alicyclic), heteroaliphatic, cycloheteroaliphatic (heterocyclic), polycyclic, aryl, or heteroaryl, and may be substituted or unsubstituted.

Aliphatic: A substantially hydrocarbon-based compound, or a radical thereof (e.g., $C_6H_{13}$, for a hexane radical), including alkanes, alkenes, alkynes, including cyclic versions thereof, and further including straight- and branched-chain arrangements, and all stereo and position isomers as well.

Anode: An electrode through which electric charge flows into a polarized electrical device. From an electrochemical point of view, negatively-charged anions move toward the anode and/or positively-charged cations move away from it to balance the electrons leaving via external circuitry. In a discharging battery or galvanic cell, the anode is the negative terminal where electrons flow out. Unless otherwise specified, the term "anode" as used herein, refers to the negative electrode or terminal where electrons flow out during discharge Areal electrocatalytic decarboxylation rate: ECDX rate per unit surface area of catalyst. Areal ECDX rate may be expressed in terms of $mmol\ h^{-1}\ cm^{-2}_{catalyst}$.

Areal oxygen evolution reaction rate: OER rate per unit surface area of catalyst. Areal OER rate may be expressed in terms of $mmol\ h^{-1}\ cm^{-2}_{catalyst}$.

Bio-oil: Oil produced from biomass (e.g., plant matter, forestry residues/waste, crop residues/waste, etc.). As used here, the terms "bio-oil" and "oil" are interchangeable, with both terms referring to oil produced from biomass.

Cathode: An electrode through which electric charge flows out of a polarized electrical device. From an electrochemical point of view, positively charged cations invariably move toward the cathode and/or negatively charged anions move away from it to balance the electrons arriving from external circuitry. In a discharging battery or galvanic cell, the cathode is the positive terminal, toward the direction of conventional current. This outward charge is carried internally by positive ions moving from the electrolyte to the positive cathode, where they may be reduced. When the battery is recharged, the cathode becomes the negative terminal where electrons flow out and metal atoms (or cations) are oxidized. Unless otherwise specified, the term "cathode" as used herein, refers to the positive electrode during discharge.

Chemical oxygen demand (COD): The amount of oxygen consumed by a reaction. COD is often expressed as mass of oxygen per unit volume of a solution, mg/L.

Deep oxidation products: Products that go through several electrocatalytic oxidation cycles.

Electrocatalysis: An electrochemical reaction produced by a catalyst on an electrode surface or a catalyst that functions at an electrode surface.

Electrocatalytic decarboxylation (ECDX): Electrocatalytic removal of a carboxyl group with release of $CO_2$. ECDX converts carboxylic acids to paraffins, olefins, and alcohols via carbon-carbon bond cleavage and $CO_2$ elimination under positive applied potentials.

Electrocatalytic oxidation: Electrocatalytic generation of intermediates, such as hydroxyl radicals, that oxidize or degrade compounds in an electrolyte, e.g., oxidation of organic compounds to carbon dioxide and water, or conversion of alcohols to carboxylic acids or esters.

Electrochemical surface area (ECSA): The surface area of the electrode material that is accessible to the electrolyte for charge transfer and/or storage, often expressed in units of $m^2\ g^{-1}$.

Ester: A chemical compound derived from an organic acid (general formula: $RCO_2H$) where the hydrogen of the —OH (hydroxyl) group is replaced by an aliphatic, alkyl or aryl group. A general formula for an ester derived from an organic acid is shown below:

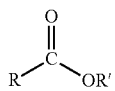

where R and R' denote virtually any group, including aliphatic, substituted aliphatic, aryl, arylalkyl, heteroaryl, etc.

Flow cell: An electrochemical cell in which electrolyte flows through the cell. A flow battery may include one or more electrochemical cells. The cell includes an anode, a cathode, and a separator between the anode and cathode. An anolyte flows through the cell on the anode side of the separator, and a catholyte flows through the cell on the cathode side of the separator. The anolyte and catholyte may have the same or different chemical compositions.

Geometric surface area: As used herein, the term geometric surface area ($cm^2_{geo}$) refers to the surface area (L×W) of an electrode surface, without consideration of the particle roughness. In contrast to an electrode surface comprising a smooth film, an electrode surface comprising a plurality of nanoparticles will have a geometric surface area that is less than the combined surface area of the nanoparticles.

HTL-ECO: Hydrothermal liquefaction-electrocatalytic oxidation.

Hydrocarbon: A compound consisting of carbon and hydrogen.

Hydrogen evolution reaction (HER): A reaction that generates molecular hydrogen.

Hydrothermal liquefaction (HTL): Thermochemical liquefaction of biomass into liquid fuels by processing in a hot, pressurized water environment for sufficient time to depolymerize the solid polymeric structures into mainly liquid components. Biomass polymers such as cellulose, hemicellulose, and lignin are thermally cracked. A portion of the oxygen present in the polymers is removed by dehydration and decarboxylation reactions.

Hydrotreatment: Reaction of organic compounds in the presence of hydrogen to remove heteroatoms, e.g., oxygen (deoxygenation), nitrogen (denitrification), and/or sulfur (desulfurization).

Nanoparticle: A nanoscale particle with a size that is measured in nanometers, for example, a nanoscopic particle that has at least one dimension of less than about 100 nm.

Olefin: An unsaturated aliphatic hydrocarbon having one or more double bonds. Olefins with one double bond are alkenes; olefins with two double bonds are alkadienes or diolefins. Olefins typically are obtained by cracking petroleum fractions at high temperatures.

Oxygen evolution reaction (OER): A reaction that generates molecular oxygen, such as by water electrolysis and electrocatalytic oxygen evolution from oxoacids.

Paraffin: A saturated aliphatic hydrocarbon having the general formula $C_nH_{2n+2}$.

Polymer: A molecule of repeating structural units (e.g., monomers) formed via a chemical reaction, i.e., polymerization.

Selectivity: As used herein, selectivity refers to the ability of a catalyst to direct a reaction to preferentially form a particular product. For example, suppose a catalyst can dehydrate compound A to form compound B, compound C, or a mixture of compounds B and C. If the catalyst has a compound B selectivity of 90%, compound A will be dehydrated to form 90% compound B and 10% compound C. Selectivity may be determined by analysis of the products formed by the reaction.

Specific surface area (SSA): Total surface area of a material per unit of mass, often expressed in units of $m^2\ g^{-1}$.

Support: As used herein with respect to an electrode, the term "support" refers to a free-standing component on which catalyst particles are deposited. The support may be, for example, a metal foil or a metal mesh.

Total acid number (TAN): A measurement of acidity reported as the amount of KOH (in milligrams) needed to neutralize the acids in one gram of oil.

Turnover frequency (TOF)/turnover number: The number of moles of substrate that react per unit of time normalized by the moles of catalysts exposed to the reaction environment as determined via ECSA, often expressed in units of $s^{-1}$.

VA: Valeric acid.

Water electrolysis: A reaction that generates molecular oxygen by splitting water into molecular oxygen and molecular hydrogen.

II. ANODES AND CELLS

Anodes for electrocatalytic treatment of bio-oils and wastewater are disclosed. In some embodiments, the anode 100 comprises a plurality of $RuO_2$ particles 110 deposited on surface of a metal support 120 (see, e.g., FIG. 1). In certain embodiments, the metal support comprises titanium metal. In any of the foregoing or following embodiments, the $RuO_2$ particles may be deposited directly on the surface of the metal support, i.e., without any intervening materials between the $RuO_2$ particles and the metal support surface. In some implementations, the anode is prepared by spraying or spreading a suspension comprising $RuO_2$ particles onto the metal support, or by dipping the metal support into the suspension, and then drying the nanoparticle-coated metal support. In some examples, the metal support may be etched (e.g., with oxalic acid), washed, and dried, before applying the $RuO_2$ particles.

In any of the foregoing or following embodiments, the anode may further comprise a polymeric coating 130 on the $RuO_2$ particles 110. In some embodiments, the polymeric coating comprises poly(vinylidene fluoride) or a tetrafluoroethylene polymer. In certain implementations, the tetrafluoroethylene polymer is a copolymer of tetrafluoroethylene and a perfluoro (vinyl ether) monomer with a sulfonic acid terminal group (for example, commercially available Nafion™ polymer, The Chemours Company, Wilmington, DE).

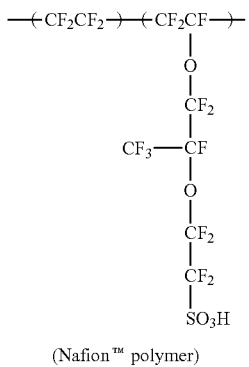

(Nafion™ polymer)

The polymeric coating may be applied by any suitable method including, but not limited to, drop-casting, spraying, or spreading a liquid solution or suspension of the polymer onto the anode, or by dipping the anode into a solution or suspension of the polymer, and then drying the coating. In some embodiments, the polymer coating is applied after the $RuO_2$ particles are deposited onto the support. In an independent embodiment, the polymer coating is applied to the $RuO_2$ particles (for example, the $RuO_2$ particles may be dispersed in a solution or suspension of the polymer to provide polymer-coated particles), and the polymer-coated $RuO_2$ particles are deposited onto the support.

In any of the foregoing or following embodiments, the $RuO_2$ particles may have an average size of 4 nm to 200 nm, such as an average size of 4 nm to 150 nm, 4 nm to 100 nm, 5 nm to 75 nm, 5 nm to 50 nm, 5 nm to 40 nm, 5 nm to 30 nm, 10 nm to 20 nm, or 10 nm to 15 nm. In some implementations, the $RuO_2$ particles are deposited as a thin film onto the metal support; the $RuO_2$ particles in such embodiments may have an average size of 50 nm to 200 nm, such as 100 nm to 200 nm. The thin film may have an average thickness of 0.05 μm to 5 μm, such as 0.1 μm to 2.5 μm, or 0.2 μm to 1 μm. In some embodiments, the $RuO_2$ particles are nanoparticles having an average size of 10 nm to 50 nm, such as 10 nm to 40 nm, 10 nm to 30 nm, 10 nm to 25 nm, 10 nm to 20 nm, or 10 nm to 15 nm. In certain implementations, the $RuO_2$ nanoparticles have an average size of 12 nm to 14 nm, or 12 nm to 13 nm. In any of the foregoing or following embodiments, the $RuO_2$ particles may have a specific surface area (SSA) of 40 $m^2$ $g_{RuO2}^{-1}$ to 100 $m^2$ $g_{RuO2}^{-1}$, such as 50 $m^2$ $g_{RuO2}^{-1}$ to 90 $m^2$ $g_{RuO2}^{-1}$, 60 $m^2$ $g_{RuO2}^{-1}$ to 80 $m^2$ $g_{RuO2}^{-1}$, or 65 $m^2$ $g_{RuO2}^{-1}$ to 70 $m^2$ $g_{RuO2}^{-1}$. The size and SSA may be determined by any suitable method, such as transmission electron microscopy or by using the Debye-Scherrer equation and X-ray diffraction data.

In any of the foregoing or following embodiments, the metal support may comprise titanium metal or $TiO_2$. In some embodiments, the metal support comprises titanium foil. The foil may have a thickness of 0.025 mm to 2.5 mm, such as a thickness of 0.1 mm to 2 mm, 0.5 mm to 1.5 mm, or 1 mm to 1.5 mm.

In any of the foregoing or following embodiments, the anode may have a $RuO_2$ loading on the metal support of 0.5 mg $cm^{-2}_{geo}$ to 2 mg $cm^{-2}_{geo}$, such as 0.5 mg $cm^{-2}_{geo}$ to mg $cm^{-2}_{geo}$, or 0.8 mg $cm^{-2}_{geo}$ to 1.2 mg $cm^{-2}_{geo}$. In any of the foregoing or following embodiments, the anode may have a $RuO_2$ electrochemical surface area (ECSA) of 25 $m^2$ $g_{RuO2}^{-1}$ to 60 $m^2$ $g_{RuO2}^{-1}$, such as 30 $m^2$ $g_{RuO2}^{-1}$ to 50 $m^2$ $g_{RuO2}^{-1}$, or 30 $m^2$ $g_{RuO2}^{-1}$ to 40 $m^2$ $g_{RuO2}^{-1}$. In some embodiments, ECSA is measured using impedance and the Hupd (hydrogen underpotential deposition) method.

As shown in FIG. 2, a typical flow cell 200 comprises an anode 100 as disclosed herein, a cathode 220, and a separator 230. To complete the circuit during use, the anode 100 and cathode 220 are electrically connected with an external load 240. An electrolyte 250 is flowed through each side of the flow cell 200. In one embodiment, the same electrolyte is flowed through both sides of the flow cell. In an independent embodiment, electrolytes with different compositions may be flowed through each side of the flow cell. A treated process stream 260 flows out of the flow cell 200. In one embodiment, the outflows from both sides of the flow cell are combined as a single treated process stream. In an independent embodiment, the outflows are maintained as separate treated process streams.

In some embodiments, the cathode comprises Pd/C or Cu/C. In certain implementations, the carbon is a carbon felt (CF). In one embodiment, the cathode comprises 0.5 wt. % to 4 wt. % Pd on CF, such as 0.5 wt. % to 3 wt. % Pd/CF or 0.5 wt. % to 2 wt. % Pd/CF. In an independent embodiment, the cathode comprises 0.1 wt. % to 0.5 wt. % Cu on CF, such as 0.2 w.t % to 0.4 w.t % Cu/CF.

III. METHODS OF TREATING BIO-OILS AND WASTEWATER

Bio-oil compositions may vary with feedstock and liquefaction process (e.g., pyrolysis, hydrothermal liquefaction, etc.) Bio-oils produced by hydrothermal liquefaction are primarily composed of carboxylic acids, amides, sugars, and phenolics. While model systems indicate that aldehydes, ketones, and phenolics can be upgraded by electrocatalytic hydrogenation (ECH), the carboxylic acids are not electrocatalytically hydrogenated. In some instances, bio-oils may comprise 20 wt. % to 40 wt. % carboxylic acids. The aqueous phase derived from biomass-processing facilities is rich in compounds that cannot be upgraded by ECH. The aqueous stream generated during HTL of biomass (including waste or algae) may contain from 1 wt. % to 3 wt. % carbon, primarily in the form of carboxylic acids, which may represent 65 wt. % to 80 wt. % of organic compounds in the aqueous streams, e.g., formic acid, acetic acid, propanoic acid, butanoic acid, glycolic acid, and the like.

Electrocatalytic decarboxylation (ECDX) is a viable route to upgrade carboxylic acids into olefins, paraffins, and alcohols at room temperature and atmospheric pressure without consuming $H_2$ via the (non-) Kolbe electrolysis. The most accepted mechanism of (non-) Kolbe electrolysis proceeds via the formation of radicals and is illustrated in FIG. 3. After the adsorption of a carboxylic acid, a carboxyl-radical is generated through one-electrode oxidation. The following decarboxylation leads the formation of an alkyl-radical and $CO_2$. On one hand, two alkyl-radicals can be dimerized into an alkane via Kolbe electrolysis, or disproportionated to a short alkane and a short alkene. On the other hand, the alkyl-radical can be further oxidized to carbocations with one electron transfer followed by deprotonation to yield an alkene via non-Kolbe electrolysis or reacting with water (or OH—) to form an alcohol via Hofer-Moest reaction. The alcohol could then react with a carboxylic acid to generate esters or further oxidize to subsequent aldehydes, ketones, and carboxylic acids with shorter carbon chain (i.e., deep oxidation products).

Embodiments of the disclosed anodes and flow cells can be utilized to treat a process stream. In some embodiments, the process stream comprises a crude bio-oil, wastewater, or a combination thereof. The process may degrade contaminants and/or upgrade components of the process stream. In some implementations, the process reduces the oxygen content, nitrogen content, sulfur content, and/or acidity of the process stream. When the process stream comprises a crude bio-oil (or biocrude), the process also may increase a H:C mole ratio in the process stream.

In some embodiments, the method includes flowing a process stream through a flow cell as disclosed herein, in the absence of added hydrogen. Advantageously, the method may be performed at a temperature of 0° C. to 50° C. and at atmospheric pressure. A potential is applied across the flow cell such that the anode is positive with respect to the cathode, thereby electrocatalytically oxidizing compounds in the process stream to produce a treated process stream at the anode. Hydrogen gas is generated as a byproduct at the cathode. Additional gaseous byproducts may include $N_2$, $O_2$, $CO_2$, and combinations thereof.

In any of the foregoing or following embodiments, the potential may be from 2 V to 5 V vs. a reversible hydrogen electrode (RHE). In some embodiments, the potential is from 2.5 V to 4.5 V vs. RHE, or 3.5 V to 4.5 V vs. RHE.

The method may be performed at a temperature 0° C. to 50° C. and at atmospheric pressure. In some embodiments, the temperature is 5° C. to 40° C., 10° C. to 30° C., or 15° C. to 25° C. In certain implementations, the method is performed at ambient temperature, or at room temperature, e.g., 20° C. to 25° C.

In contrast to other anodes, such as anodes comprising Pt nanoparticles, embodiments of the disclosed anodes selectively form hydrocarbons by ECDX and generate little $O_2$. In any of the foregoing or following embodiments, the anode of the process cell may have an areal ECDX rate to areal oxygen evolution reaction (OER) rate ratio of at least 1. In some embodiments, the areal ECDX rate to areal OER rate ratio is at least 2, at least 5, or at least 10, such as from 1 to 15, from 2 to 15, from 5 to 15, or from 5 to 10. In any of the foregoing or following embodiments, the anode may have a hydrocarbon selectivity of at least 20%. In other words, at least 20% of the products formed as the process stream flows across the anode are hydrocarbons, e.g., olefins and paraffins. In some embodiments, the hydrocarbon selectivity is at least 25%, at least 30%, or at least 40%, such as 20% to 70%, 30% to 60%, or 40% to 60%.

In any of the foregoing or following embodiments, the process stream may comprise a crude bio-oil, wastewater, or a combination thereof. The feedstock may be a biomass feedstock or a fossil fuel-derived feedstock. In some embodiments, the process stream is provided by hydrothermal liquefaction (HTL) or pyrolysis of a biomass feedstock. In one implementation, the process stream comprises a crude bio-oil. In an independent implementation, the process stream comprises wastewater. In another independent implementation, the process stream comprises a combination of a crude bio-oil and wastewater. Such process streams may be generated from biomass. The ratio of bio-oil to wastewater in the process stream may depend at least in part on the method used to generate the process stream. In some examples, the combination of crude-bio-oil and wastewater is provided by HTL of a biomass. In other examples, the of crude-bio-oil and wastewater is provided by pyrolysis. In some embodiments, the bio-oil to wastewater ratio in the process stream is 1:2 to 1:20 by volume, such as 1:3 to 1:15 or 1:3 to 1:12. The proportion of water generally is greater when the process stream is generated by HTL and less when the process stream is generated by pyrolysis.

In any of the foregoing or following embodiments, electrocatalytically oxidizing the compounds in the process stream may comprise decarboxylating carboxylic acids, oxidizing nitrogen-containing compounds, oxidizing sulfur-containing compounds, or any combination thereof. For example, as illustrated in FIG. 3, carboxylic acids may be decarboxylated to form aliphatic radicals that may dimerize or disproportionate to form hydrocarbons (e.g., alkanes and/or alkenes), or may be subsequently oxidized to form esters, ketones, and/or alcohols. Ammonia may be oxidized into $N_2$. Amides and alpha-hydroxyacids may be oxidized into carboxylic acids that are decarboxylated as previously mentioned. Other organic nitrogen- and sulfur-containing compounds may be oxidized to nitrates and sulfates. Byproducts include $H_2$ and also may include $CO_2$, $O_2$, and/or $N_2$.

In some embodiments, the process stream comprises organic compounds and electrocatalytically oxidizing the organic compounds produces aliphatic compounds, ketones, esters, alcohols, or a combination thereof. In certain embodiments, the aliphatic compounds comprise C1-C8 aliphatic compounds, and the method further includes separating the C1-C8 aliphatic compounds from the treated process stream, and using at least a portion of the C1-C8 aliphatic compounds to generate heat.

Embodiments of the disclosed process generate $H_2$ gas as a byproduct. In some embodiments, at least a portion of the $H_2$ is used to generate electricity. Electricity may be generated, for example, using gas turbines or solid oxide fuel cells. In certain implementations, the process stream comprises a crude bio-oil and the method further includes using at least a portion of the $H_2$ gas in a subsequent catalytic hydrotreatment of the treated process stream. For example, the $H_2$ may be used for electrocatalytic reduction of aldehydes and olefins in the treated process stream.

In some implementations, the process stream comprises wastewater, and electrocatalytically oxidizing compounds in the process stream produces hydrocarbons (e.g., C1-C8 aliphatic compounds) and gases. The gases comprise $H_2$, and also may comprise $N_2$, $O_2$, $CO_2$, or any combination thereof. In such implementations, the method may further include separating the gases and the hydrocarbons from water in the treated process stream, utilizing at least a portion of the hydrocarbons to generate heat, and recycling at least a portion of the water. For instance, at least a portion of the water may be recycled to an HTL process. The gases may further be separated, and at least a portion of the $H_2$ may be used for electricity generation and/or catalytic hydrotreatment of a treated process stream comprising a stabilized bio-oil. In some embodiments, conversion of the hydrocarbons and $H_2$ back into electricity may provide from 10% to 35% of the electricity needed for the electrocatalytic treatment of the process stream.

FIG. 4 is a simplified process diagram of one embodiment of a combined HTL-ECO process for electrocatalytically upgrading both aqueous waste and biocrude. Biomass or biowaste is hydrothermally liquefied (step 401) to provide a process stream comprising biocrude (or bio-oil) and wastewater. The process stream is flowed through a flow cell as disclosed herein (step 402). The treated process stream may be separated into a stabilized biocrude fraction, an oxidized aqueous phase, and $H_2$ gas. The oxidized aqueous phase is further separated (step 403) to provide a hydrocarbon fraction, gases (e.g., $N_2$, $O_2$, $CO_2$, and combinations thereof), and water. At least a portion of the water may be recycled to the hydrothermal liquefaction process (step 401). At least a portion of the hydrocarbons (e.g., C1-C8 hydrocarbons) may be used in a heat generation process (step 404). The hydrogen gas may be compressed and purified (step 405). A portion of the $H_2$ may be used for electricity generation (step 406). In some implementations, the generated electricity may be used to operate the flow cell (step 402). A portion of the $H_2$ may be combined with the stabilized biocrude fraction in a catalytic hydrotreating and production fractionation process (step 407) leading to the production of biofuels.

IV. EXAMPLES

Example 1

Electrocatalytic Valorization of an Aqueous Stream

Electrochemical oxidation was evaluated for the valorization of HTL-derived aqueous streams. The changes in carbon, nitrogen, and sulfur contents, and chemical oxygen demand (COD) as a function of applied potential were evaluated on a Pt electrode using an HTL-derived aqueous feedstock. Model studies with individual components were used to identify how the main organic molecules react. The worked showed that that ECO removes carbon through the conversion of organic molecules into short chain carboxylic acids that subsequently are upgraded to hydrocarbons following the (non-) Kolbe electrolysis. Nitrogen is removed by oxidation of ammonia, amines, and amides to nitrates and $N_2$. The VHC generated during ECO can increase the HTL carbon yield from 55% to 64%. A preliminary cost analysis showed the electricity cost required to run the system can be fully offset by lowering the operation potential (<4.5 V), selling to excess $H_2$ generated, and using cheap electricity.

Materials: Acetic acid (glacial, ACS reagent, ≥99.7%), propanoic acid (ACS reagent, ≥99.5%) butyric acid (≥99%), acetamide (~99% (GC)), 2-pyrrolidinone (99%), acetone (HPLC Plus, ≥99.9%), methyl ethyl ketone (MEK, Pharmaceutical Secondary Standard), ethylene glycol (anhydrous, 99.8%), glycolic acid (ReagentPlus®, 99%), ammonia ($NH_3$, anhydrous, ≥99.98%), phenol (ACS reagent, ≥99%), and $Na_2SO_4$ (≥99.0%) were purchased from Sigma Aldrich and used as received. Ti foil was purchased from Alfa Aesar. $N_2$ (99.9%) was purchased from Praxair.

Electrochemical testing: All electrochemical measurements were carried out in an undivided 100 mL H-type batch cell. Pt foil (Alfa Aesar) electrodes of 4 cm$^2$ was used as anode and cathode. A calibrated Ag/AgCl was used as reference electrode to monitor the anodic half-cell potential. More information about the calibration and reactor setup can be found elsewhere. An AMETEK® VersaSTAT 4 Potentiostat Galvanostat was used to operate the electrocatalytic cell and monitor the current and applied cell potential.

The HTL-derived aqueous feedstock was obtained from a test with an engineered-scale HTL system [referred to as the Modular HTL System (MHTLS[76])] operated at 3000 psig and 350° C. The feedstock for the HTL test was a mixture of primary and secondary sludge (50:50) from Contra Costa Central Sanitary District with a 13 wt. % solids. The HTL-derived feedstock was used as received and the composition can be found in Tables 1 to 3. The ECO activity was performed via chronopotentiometry at 4 V vs. Ag/AgCl, 15° C. to 20° C., and ambient pressure. Before each test, the electrolyte was purged with $N_2$ at 100 SCCM for 30 min to remove $O_2$ from the head space and the liquid volume of the HTL-derived aqueous feedstock. Liquid samples were taken every 12 h to monitor conversion and product generation in the aqueous phase only.

TABLE 1

Characterization of HTL-derived aqueous waste using total carbon (TC), total nitrogen (TN), ammonia ($NH_3$), chemical oxygen demand (COD), and ion chromatography (IC) before and after electrocatalytic oxidation at 2, 3, and 4 V vs. Ag/AgCl on Pt electrodes for 48 h at room temperature.

| Cell Voltage, V vs. Ag/AgCl | 0 (Feed) | 2 | 3 | 4 |
|---|---|---|---|---|
| TC, ppm | 18087 | 17906 | 17192 | 11384 |
| TN, ppm | 5412 | 5433 | 5274 | 4295 |
| $NH_3$, ppm | 2960 | 2720 | 2720 | 2790 |
| COD, ppm | 58200 | 57300 | 54200 | 33200 |
| Chloride, ppm | 32.7 | 26.0 | 49.5 | 13.7 |
| Bromide, ppm | 0.386 | BDL | 1.80 | BDL |
| Nitrate, ppm | 122 | 458 | 797 | 864 |
| Sulfate, ppm | 58.1 | 56.6 | 82.8 | 88.4 |
| Phosphate, ppm | 10.4 | 10.4 | 12.9 | 10.8 |

BLD represents below detection limit.

TABLE 2

Characterization of HTL-derived aqueous waste using high-performance liquid chromatograph (HPLC) before and after electrocatalytic oxidationat 2, 3 and 4 V vs. Ag/AgCl on Pt electrodes for 48 h at room temperature.

| Cell Voltage, V vs. Ag/AgCl | 0 (Feed) | 2 | 3 | 4 |
|---|---|---|---|---|
| Glycolic acid | 0 | 0 | 0.017 | 0.047 |
| Glycerol | 0.042 | 0.044 | 0.058 | 0.043 |
| Formic acid | 0.007 | 0.021 | 0.094 | 0.148 |
| Acetic acid | 0.771 | 0.772 | 0.966 | 1.004 |
| Ethylene glycol | 0.013 | 0.018 | 0.021 | 0.032 |
| Levulinic acid | 0.027 | 0.036 | 0.026 | 0.047 |
| 1,3-Propanediol | 0 | 0 | 0.026 | 0.051 |
| Propanoic acid | 0.265 | 0.269 | 0.236 | 0.155 |
| 1,2-Butandiol | 0.055 | 0.055 | 0.042 | 0.024 |
| Ethanol | 0.069 | 0.068 | 0.042 | 0.046 |
| Butanoic acid | 0.334 | 0.331 | 0.263 | 0.08 |
| Acetone | 0 | 0 | 0 | 0.144 |
| 2,5-Hexanedione | 0.084 | 0.084 | 0.048 | 0.014 |
| MEK (2-Butanone) | 0.044 | 0.04 | 0.011 | 0.011 |
| 2-Methyl-1-propanol | 0.055 | 0.053 | 0.02 | 0 |
| 3-Pentanone | 0.019 | 0.02 | 0 | 0.001 |
| 2-Cyclopenten-1-one | 0.063 | 0.061 | 0.016 | 0.003 |
| 3-Hexanone | 0.01 | 0.011 | 0.003 | 0 |
| Phenol | 0.048 | 0.045 | 0.041 | 0.053 |
| 3-Methyl-2-cyclopentene-1-one | 0.019 | 0.023 | 0 | 0 |
| m-Cresol | 0.041 | 0.034 | 0.003 | 0 |

TABLE 3

Characterization of HTL-derived aqueous waste using Inductively coupled plasma-optical emission spectroscopy (ICP-OES) before and after electrocatalytic oxidation at 2, 3 and 4 V vs. Ag/AgCl on Pt electrodes for 48 h at room temperature.

| | Concentration, ppm | | | |
|---|---|---|---|---|
| Cell Voltage, V vs. Ag/AgCl | 0 (Feed) | 2 | 3 | 4 |
| Ag | <2.5 | <1 | <1 | <2.5 |
| Al | <2.5 | <1 | <1 | <2.5 |
| As | <2.5 | <1 | <1 | <2.5 |
| Ba | <2.5 | <1 | <1 | <2.5 |
| Ca | 5.32 | 6.83 | 6.74 | 6.34 |

TABLE 3-continued

Characterization of HTL-derived aqueous waste using Inductively coupled plasma-optical emission spectroscopy (ICP-OES) before and after electrocatalytic oxidation at 2, 3 and 4 V vs. Ag/AgCl on Pt electrodes for 48 h at room temperature.

| Cell Voltage, V vs. Ag/AgCl | Concentration, ppm | | | |
|---|---|---|---|---|
| | 0 (Feed) | 2 | 3 | 4 |
| Cc | <2.5 | <1 | <1 | <2.5 |
| Co | <2.5 | <1 | <1 | <2.5 |
| Cr | <2.5 | <1 | <1 | <2.5 |
| Cu | <2.5 | <1 | <1 | <2.5 |
| Fe | <2.5 | <1 | <1 | <2.5 |
| K | 247.1 | 275.0 | 262.2 | 291.7 |
| Mg | 4.72 | 4.13 | 4.22 | 4.94 |
| Mn | <2.5 | <1 | <1 | <2.5 |
| Na | 185.4 | 165.9 | 178.4 | 206 |
| Ni | <2.5 | <1 | <1 | <2.5 |
| P | 7.83 | 8.07 | 7.92 | 8.30 |
| Pb | <2.5 | <1 | <1 | <2.5 |
| Re | <2.5 | <1 | <1 | <2.5 |
| Sr | <2.5 | <1 | <1 | <2.5 |
| V | <2.5 | <1 | <1 | <2.5 |
| Y | <2.5 | <1 | <1 | <2.5 |
| Zn | <2.5 | <1 | <1 | <2.5 |
| Mo | <2.5 | <1 | <1 | <2.5 |
| Si | 157.2 | 141.9 | 146.3 | 157.9 |
| Ti | <2.5 | <1 | <1 | <2.5 |
| W | <1 | <1 | <1 | <1 |
| Au | <2.5 | <1 | <1 | <2.5 |
| Pd | <2.5 | <1 | <1 | <2.5 |
| Pt | <2.5 | 2.39 | 18.51 | 56.88 |
| Rh | <2.5 | <1 | <1 | <2.5 |
| S | 82.38 | 70.99 | 69.57 | 82.52 |
| Sn | <2.5 | <1 | <1 | <2.5 |
| Zr | <2.5 | <1 | <1 | <2.5 |
| Ru | <2.5 | <1 | <1 | <2.5 |

ECO of individual model compounds was investigated via chronopotentiometry 4 V vs. Ag/AgCl, 15° C. to 20° C., ambient pressure, and constant substrate concentration of 0.5 M in a supporting electrolyte composed of 0.14 M $Na_2SO_4$ in water. Before each test, the electrolyte was purged with $N_2$ at 100 SCCM for 30 min to remove $O_2$ from the head space and the liquid volume. During the experiment, the reactor was purged with $N_2$ gas at 10 SCCM to carry the produced gases to an online micro GC (Inficon Micro GC Fusion® Gas Analyzer). Liquid samples were collected every 30 minutes to determine conversion and product formation. A liquid trap containing iso-propanol (IPA) at ~0° C. was used to collect volatilized compounds (e.g., octane, butanol, butanoic acid).

Product Analysis: The gas samples were analyzed using a gas chromatograph (Inficon Micro GC Fusion® Gas Analyzer) equipped with thermal conductivity detector (TCD) to quantify the production of gaseous products (e.g., butene, butane, propane, propylene, ethane, ethylene, $CO_2$) generated during the ECO of model compounds.

Due to the complexity of the reaction product liquid samples, a variety of instruments were required to analyze them. The reaction products were identified using a gas chromatograph (Agilent 6890 GC) equipped with a mass spectrometer (Agilent 5975C) and a DB-5 column (Agilent) and quantified using a high-performance liquid chromatograph (HPLC) equipped with a Waters 2414 refractive index detector and a Bio-Rad Aminex HPX-87H ion exclusion column (300 mm×7.8 mm). Ion chromatography (IC) was performed in a Dionex ICS-3000 equipped with a conductivity detector. Total carbon (TC) and total nitrogen (TN) measurements were performed on a VarioTOC Cube Carbon Analyzer (Elementar Analysensysteme GmbH, Langenselbold Germany) equipped with nondispersive infrared detector (NDIR) of carbon and chemiluminescence detector (CLD). Inductively coupled plasma-optical emission spectroscopy (ICP-OES) was performed on a PerkinElmer Optima 7300DV instrument. The chemical oxygen demand (COD) and ammonia ($NH_3$) content were determined using high range HACH reagent-kits (20-1500 mg/L COD and 2-47 mg/L $NH_3$—N) and spectrophotometry.

Calculation of rates: Conversion, current efficiency (CE), product selectivity, and carbon balance were calculated by using Eq. 1 to 4, respectively.

$$\text{Conversion (\%)} = \frac{\text{(Initial moles of reactant} - \text{Final moles of reactant)}}{\text{Inital moles of reactant}} \times 100 \quad \text{Eq. 1}$$

$$CE\ (\%) = \frac{\overline{\sum(n_i \cdot z_i \cdot F)}}{Q} \times 100 \quad \text{Eq. 2}$$

where $n_i$ is the number of moles of product i, $z_i$ is the number of electrons transferred per molecule of product i (e.g., z=2 for ethane, ethylene, propylene), F is the Faraday constant (96485 C $mol^{-1}$), and Q is the total charge transferred as measured by the potentiostat.

$$\text{Product carbon selectivity (\%)} = \frac{\text{Moles of carbon in specific products}}{\text{Total moles of carbon in products}} \times 100 \quad \text{Eq. 3}$$

$$\text{Carbon balance (\%)} = \frac{\text{Final total moles of carbon in reactant and products}}{\text{Initial total moles of carbon in reactant}} \times 100 \quad \text{Eq. 4}$$

Under the reaction conditions used in this work, the carbon balance was from 80% to 95%. The solubilized $CO_2$ in the aqueous phase was not quantified. No conversion was observed in the absence of electrocatalysts, potential, or current.

Results and Discussion

Electrocatalytic oxidation of HTL-derived aqueous feedstock. As shown in FIGS. 5A-5D, the ECO products of the aqueous feedstock were potential dependent. The characterization of the feedstock before after the ECO experiments (e.g., HPLC, IC-OES, TC, TN, $NH_3$, COD) can be found in Tables 1-3 above. After the treatment at 2 V vs. Ag/AgCl, the concentration and distribution of C, N, S, and COD were the same as in the initial feedstock. At 3 V vs. Ag/AgCl, negligible decrease of C, N, and COD was observed. At 4 V vs. Ag/AgCl, the removal of C, N, and COD increased reaching 39%, 23%, 48%, respectively. However, the oxidation of sulfur and nitrogen containing compounds to sulfates and nitrates was similar to that observed at 3 V vs. Ag/AgCl, Table 1. For example, the concentration of nitrates increased from 122 ppm in the feed to 797 and 864 ppm (>800%) after ECO for 48 h at 3 and 4 V vs. Ag/AgCl, respectively. The concentration of sulfates increased from 58.1 ppm in the feed to 82.8 and 88.4 ppm (>42%) after ECO for 48 h at 3 and 4 V vs. Ag/AgCl, respectively. The system was stable for 48 h of experimentation even in the presence of sulfur and nitrogen containing compounds, and the formation of nitrates and sulfates as a function of time when operating at 4 V vs. Ag/AgCl. Interestingly, FIG. 5A shows that the carbon compounds being removed are the ones that cannot be identified by HPLC (i.e., unidentified carbon). The process was 40-45% efficient, with the rest being the oxygen evolution reaction.

Figure 6:
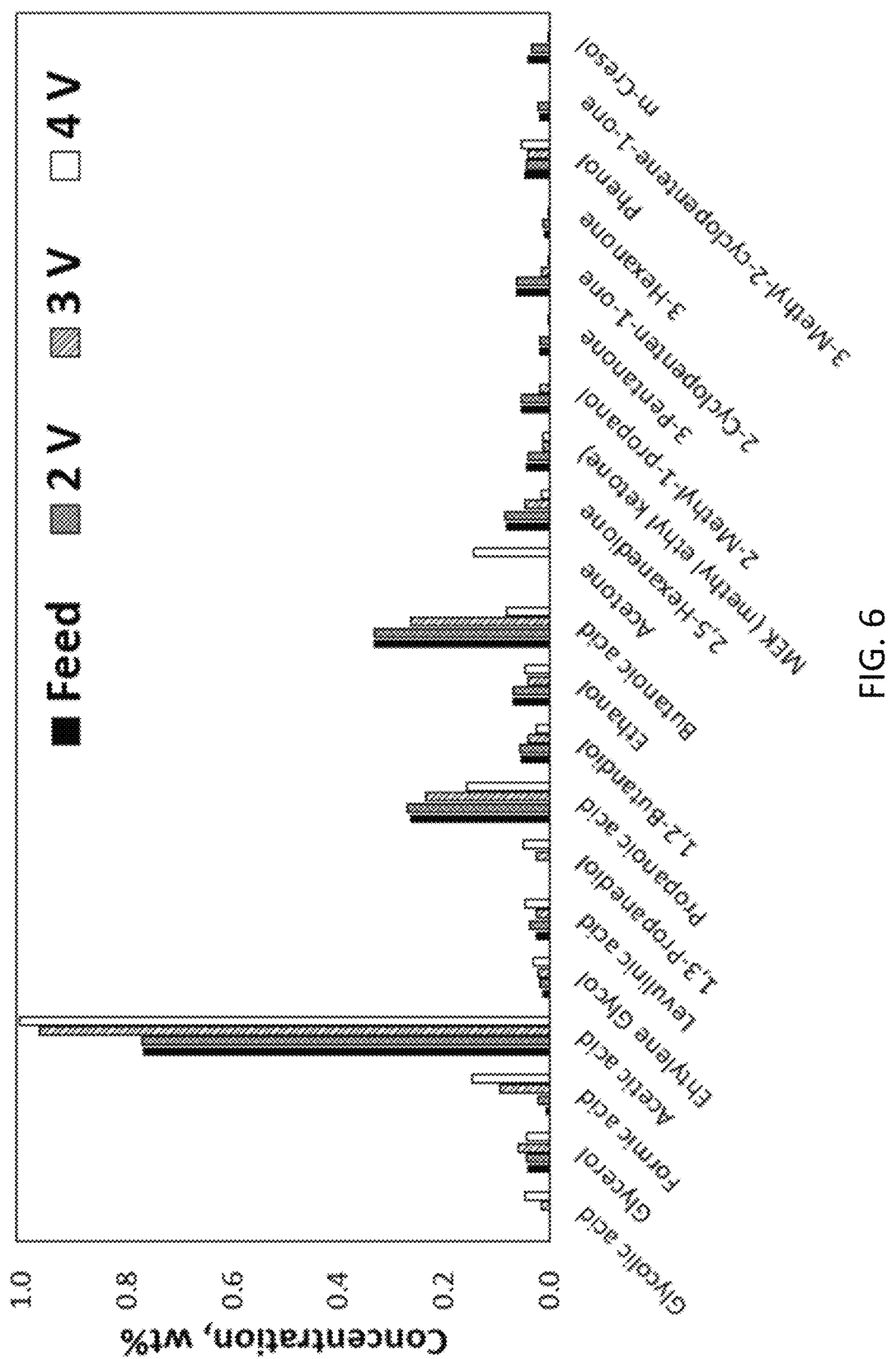
FIG. 6 shows the composition of HTL-derived aqueous feedstock before (feed) and after 48 h of electrocatalytic oxidation (ECO) on Pt electrodes at 2V, 3V, or 4V.

FIG. 6 shows that the ECO of the aqueous feedstock converted the longer carbon chain organic molecules (e.g., propanoic acid, butanediol, ethanol, butanoic acid, etc.) while forming shorter chain organic molecules (e.g., glycolic acid, glycolaldehyde, formic acid, acetic acid, etc.). As shown in FIG. 5A, the overall C content associated with the organic molecules detected by HPLC decreased by 10% (from 10,000 to 9,000 ppm) at 4 V vs. Ag/AgCl, while C in unidentified compounds decreased by 75% (from 8,000 to 2,000 ppm). Thus, it is believed that the unidentified C was also being converted to short chain organic molecules.

Figure 8:
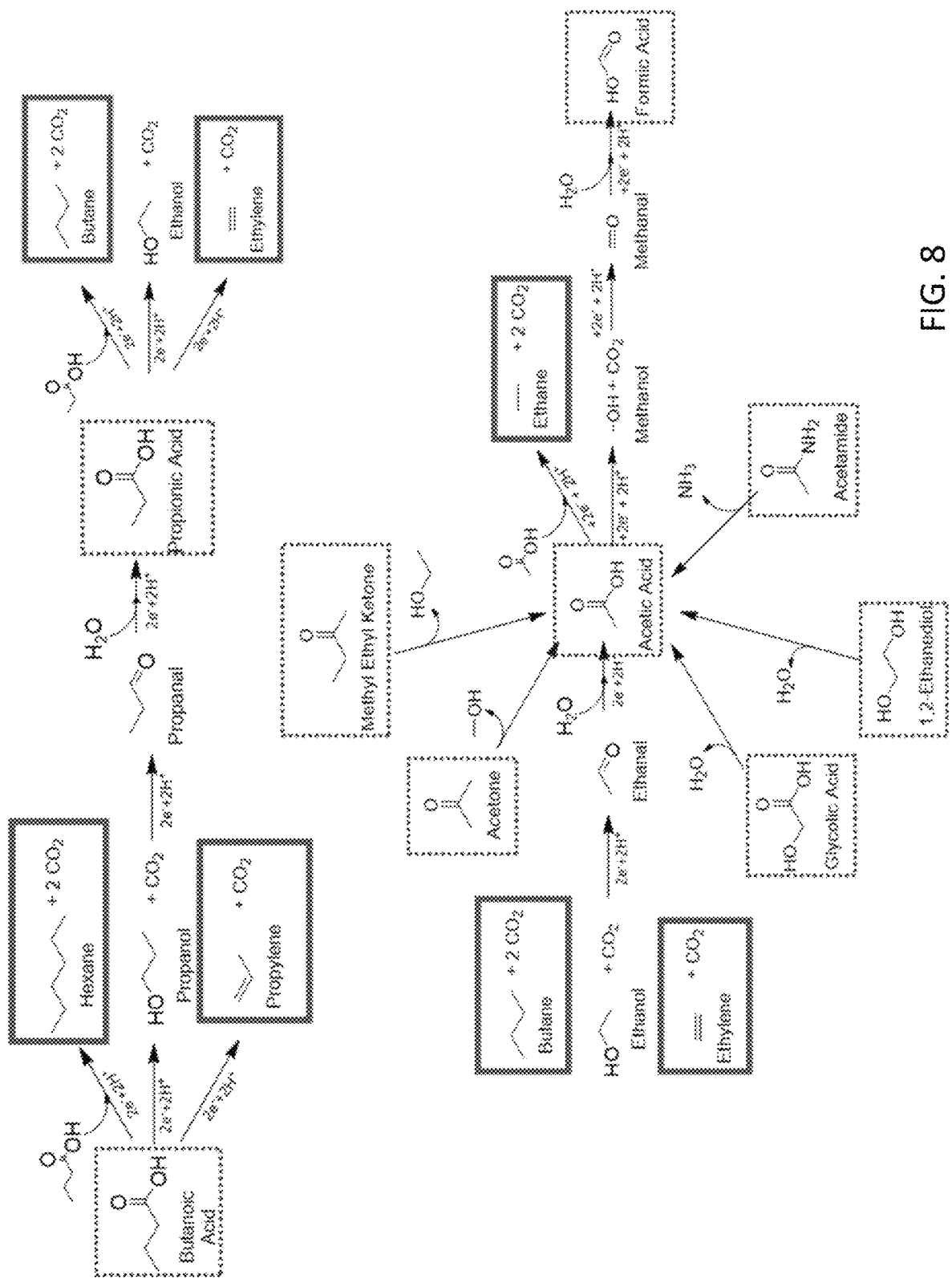
FIG. 8 is an exemplary reaction scheme for ECO of representative compounds of HTL-derived aqueous feedstock; the compounds in dashed boxes are observed in the feedstock, and the compounds in solid boxes are reaction products.

Electrocatalytic oxidation of model compounds. ECO experiments of single components (0.5 M) of the HTL-derived aqueous feedstock were performed at 5 V vs. Ag/AgCl. The initial concentration of the single compounds was 0.5 M in an electrolyte composed of 0.14 M $Na_2SO_4$. The temperature was kept constant at 10-15° C. using a cooling loop submerged in the electrolyte. As shown in FIG. 7, all the components reacted but the conversions, current efficiencies, and product selectivities differed. For example, out of all the molecules tested, acetic acid, propionic acid, and butyric acid, had similar conversion (50%) and CE (60-80%). However, while acetic acid and butyric acid had similar carbon selectivity towards paraffins (ethane and hexane), propionic acid ECO was not selective towards the olefin product (ethylene). $NH_3$ conversion and CE was similar to that of the carboxylic acids, but the only detected product was $N_2$ ($NO_3^-$ was not detected by IC). Acetamide was less reactive (13% conversion) than carboxylic acids and the main product was acetic acid. The amide groups may have directly oxidized to $N_2$ as there was no observation of $NH_3$ and $NO_3^-$ being formed. Pyrrolidinone was also reactive for N removal with the main reaction products being alcohols. Like in the case for acetamide, $NH_3$ and $NO_3^-$ were not observed. Interestingly, the tested ketones (acetone and MEK) and hydroxyacids (ethylene glycol acid and glycolaldehyde) produced acetic acid as the main product. However, the reactivities of acetone and MEK were >2 times lower than that of acetic acid. ECO of ethylene glycol and glycolic acid also yielded acetic acid as the main product. Overall, the study of single molecules showed that ECO can convert the organic molecules into carboxylic acids (acetic acid primarily as observed during the conversion of HTL-derived aqueous feedstock, FIG. 6) and subsequently into VHC following Kolbe-chemistry. A summary of the reaction network is shown in FIG. 8

Process integration and simplification. The results obtained during the ECO of the HTL-derived aqueous feedstock were analyzed to estimate the power requirement and the rates of hydrocarbons and $H_2$ generated during the process. Some relevant process parameters for the HTL of wet waste to fuels are summarized in Table 4 (Snowden-Swan et al., *Conceptual Biorefinery Design and Research Targeted for* 2022: *Hydrothermal Liquefaction Processing of Wet Waste to Fuels*, PNNL-27186). Table 5 summarizes the results extrapolated for the full conversion by ECO of the compounds in the HTL-derived aqueous feedstock studied in this work. Comparing Tables 4 and 5, the amount of $H_2$ generated during the ECO of HTL-derived aqueous feedstock was 2.6 times higher than the $H_2$ required for hydrotreating (235 and 90 kg $H_2$/h, respectively), suggesting that the excess $H_2$ (145 kg $H_2$/h) can be sold as a by-product to subsidize the electricity costs. This indicates that ECO may replace the current $H_2$ generation plant (i.e., steam reforming of natural gas) and decrease the associated $CO_2$ emissions (5.5 kg $CO_2$/kg $H_2$).

The ammonia removal unit is no longer needed as organic nitrogen compounds and ammonia were removed during the ECO (FIGS. 5B and 7). This further decreases the consumption of natural gas and the associated $CO_2$ emissions. Lastly, the VHC (ethane primarily) generated during the ECO of the carbonaceous species present in the HTL-derived aqueous feedstock have similar heating value (47.8 MJ/kg) than NG (47 MJ/kg) suggesting that the HC generated during ECO (238 kg/h) can be used to generate process heat (in the boiler) instead NG (170 kg/h).

TABLE 4

Selected hydrothermal liquefaction (HTL) process parameters for a 110 dry ton/day sludge system.

| Key HTL Process Parameters | Values | Units |
|---|---|---|
| Biofuel production rate | 543 | GGE/h Fuel |
| Aqueous phase flow rate | 4249 | Gal/h |
| C flow rate in aqueous phase at 23,000 ppm | 380 | kg/h |
| $H_2$ requirement for hydrotreating | 90 | kg/h |
| NG requirement for $H_2$ plant | 122 | kg/h |
| NG required for $NH_3$ oxidation | 79 | kg/h |
| NG required for heat generation in boiler | 170 | kg/h |

NG stands for natural gas.
GGE is gasoline gallon equivalent.

TABLE 5

Projections of energy cost and estimation of $H_2$ and volatile hydrocarbons (VHC) generated by the complete removal of organic compounds from HTL-derived aqueous feedstock using electrocatalytic oxidation (ECO).

| ECO Projections using Experimental Values* | Value | Units |
|---|---|---|
| Experimental rate of C conversion [a] | 6 | g/kWh |
| Power required to convert all the C present in the aqueous phase (379.5 kgC/h) | 47 | MW |
| ECO energy required per volume on aqueous phase | 11 | MJ/L |
| Energy required per volume of biofuel produced | 83 | MJ/LGE |
| Hydrocarbon (ethane) produced from ECO of C in the HTL-derived aqueous feedstock [b] | 238 | kg/h |

TABLE 5-continued

Projections of energy cost and estimation of $H_2$ and volatile hydrocarbons (VHC) generated by the complete removal of organic compounds from HTL-derived aqueous feedstock using electrocatalytic oxidation (ECO).

| ECO Projections using Experimental Values* | Value | Units |
|---|---|---|
| $H_2$ generated during ECO of C present in the HTL-derived aqueous feedstock [c] | 235 | kg/h |

[a] The conversion rate was estimate using the conditions and experimental results of this study (7.5 V, 150 mA, 8,000 ppm of C converted in 48 h).
[b] The rate of VHC produced was calculated assuming that all the carbon is present as acetic acid and that it is upgraded to ethane following the Kolbe chemistry ($2CH_3COOH \rightarrow CH_3-CH_3 + 2CO_2 + H_2$).
[c] The $H_2$ generation rate was estimated directly from the current (150 mA) assuming that all the $e^-$ and $H^+$ generated at the anode form $H_2$ at the cathode.
GGE stands for gasoline equivalent and LGE stands for liter of gasoline equivalent.

Values in Table 5 were calculated as follows.

Carbon Conversion Rate Obtained During the ECO of HTL-Derived Aqueous Waste:

Rate C converted =

$$\frac{\left(18000\frac{mg}{L}\text{feed} - 11384.8\frac{mg}{L}\right) \times \frac{1g}{1000 \text{ mg}} \times 0.05 \text{ L}}{48 \text{ }h \times 7.5 \text{ V} \times 0.15 \text{ }A} = 6.13\frac{g}{kWh}$$

Rate of Carbon in HTL-Derived Aqueous Waste:

$$4269\frac{Gal}{h} \times 3.785\frac{L}{Gal} \times 23,600\frac{mg}{L} X \frac{1g}{1000 \text{ mg}} = 379,500\frac{g}{h}$$

Power and Current Requirements:

$$\text{Power Requirements} = \frac{379,500\frac{g}{h}}{6.13\frac{g}{kWh}} = 47261.3 \text{ kW} = 47.3 \text{ MW}$$

$$\frac{\text{Power Requirements}}{LGE} = \frac{47.3 \text{ MW}}{542.48\frac{GGE}{h} \times \frac{3.785 \text{ }LGE}{1 \text{ }GGE}} =$$

$$0.023\frac{MWh}{LGE} \times \frac{3600 \text{ s}}{1 \text{ h}} \times \frac{1\frac{MJ}{s}}{1 \text{ MW}} = 82.9 \text{ }kL/LGE$$

$$\text{Current} = \frac{47.3 \text{ MW}}{7.5 \text{ V}} = 6.30 \text{ }MA$$

Theoretical $H_2$ Generation Rate:

$$H_2 \text{ generation} = \frac{6.30 \text{ MA} \times \frac{1 \cdot 10^6 A}{1 \text{ }MA}}{26.8\frac{A \cdot h}{mol} \times 2\frac{e^{-1}}{mol}} =$$

$$117,559\frac{\text{mol }H_2}{h} \times \frac{2 \text{ g }H_2}{1 \text{ mol }H_2} \times \frac{1 \text{ kg }H_2}{1000 \text{ g }H_2} = 235.1\frac{\text{kg }H_2}{h}$$

Theoretical Volatile Hydrocarbon (HC) Generation Rate:

Assuming all C can be represented as acetic acid, the overall cell reaction can be simplified as: 2 $H_3CCOOH \rightarrow H_3C-CH_3 + 2 CO_2 + H_2$ $$HC \text{ generation} = 379,500\frac{g \text{ }C}{h} \times \frac{1 \text{ mol }C}{12 \text{ g }C} \times$$

$$\frac{1 \text{ mol Acetic Acid}}{2 \text{ mol }C} \times \frac{1 \text{ mol Ethane}}{2 \text{ mol Acetic Acid}} \times \frac{1 \text{ mol Ethane}}{2 \text{ mol Acetic Acid}} \times \times$$

$$\frac{30.07 \text{ g Ethane}}{1 \text{ mol Ethane}} \times \frac{1 \text{ kg Ethane}}{1000 \text{ g Ethane}} = 237.22\frac{\text{kg Ethane}}{h}$$

Figure 9A:
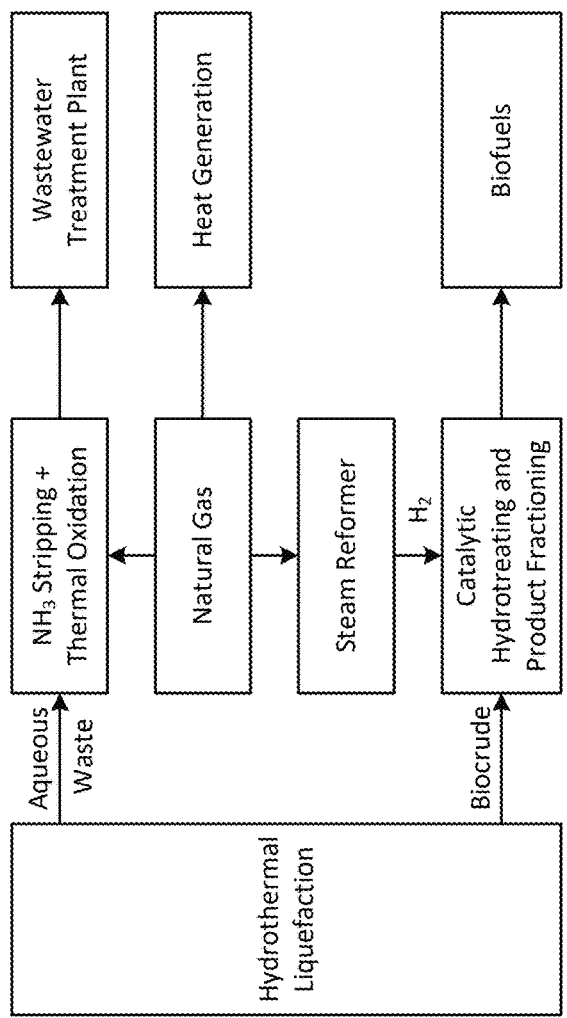
FIGS. 9A and 9B are simplified process diagrams of a traditional HTL process for thermally oxidizing aqueous waste and catalytically hydrotreating biocrude (FIG. 9A) and a combined HTL-ECO process for electrochemically upgrading aqueous waste and catalytically hydrotreating biocrude (FIG. 9B).
Figure 9B:
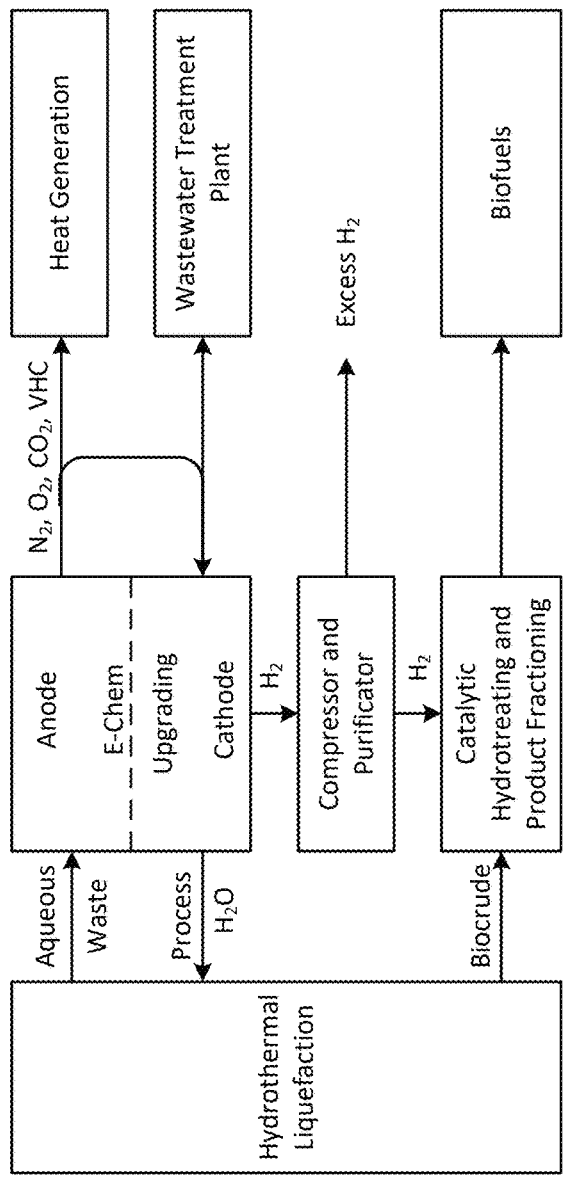
Figure 10:
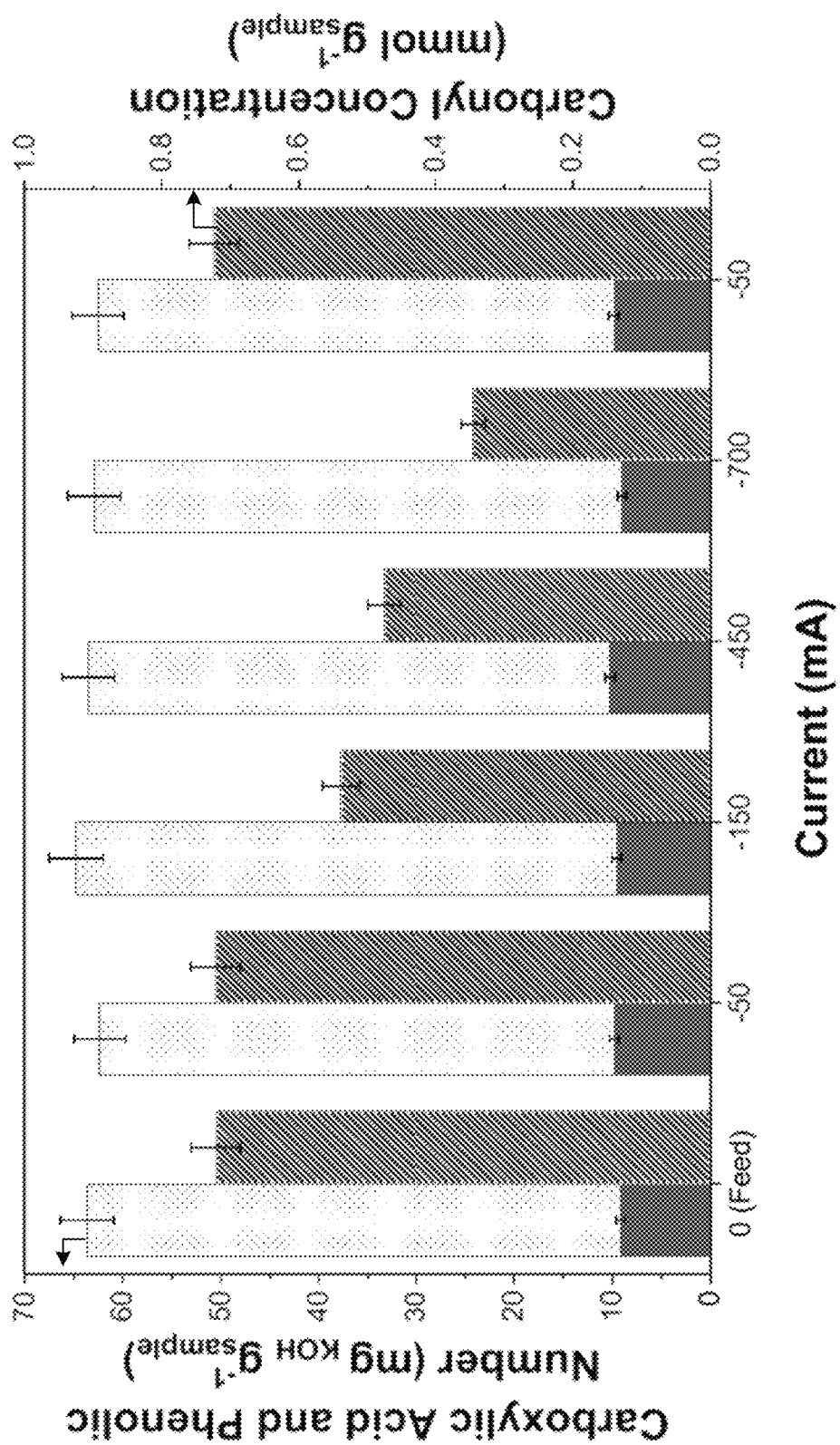
FIG. 10 is a graph of carboxylic acid number (light portion of first bars), phenolic acid number (solid portion of first bars), and carbonyl concentration (second bars) as a function of current.

The use of NG in the current HTL process (for heating, $H_2$ generation, and $NH_3$ removal) is responsible for a 15% loss in carbon yield (from 64.1 to 54.5%, Table 6), as all the carbon input from NG is lost as $CO_2$. Therefore, these results suggest that the use for ECO for $H_2$ generation, $NH_3$ removal, and VHC generation (for use in heating) instead of NG can be used to simplify the process and increase the overall carbon yield. Notice that using the VHC for heating does not negatively affect the carbon yield because they were made from the already wasted (i.e., lost) carbon present in the aqueous. A simplified block diagram schematic comparing the integration of ECO with the current HTL process can be found in FIG. 9A (current HTL process, Snowden-Swan et al., *Conceptual Biorefinery Design and Research Targeted for 2022: Hydrothermal Liquefaction Processing of Wet Waste to Fuels*, PNNL-27186) and FIG. 9B (integrated HTL-ECO process).

TABLE 6

Carbon yield for the hydrothermal liquefaction (HTL) excluding and including carbon associated with the use of natural gas (NG).

| Carbon yield | HTL reaction (Including feed preparation, and $NH_3$ removal) | Upgrading (including $H_2$ generation, hydrotreating, and hydrocracking) | HTL + Upgrading |
|---|---|---|---|
| Excluding NG | 72.1% | 88.9% | 64.1% |
| Including NG | 65.5% | 83.2% | 54.5% |

This study illustrates the use of electrocatalytic oxidation (ECO) for the valorization, into $H_2$ and volatile hydrocarbons (VHC), of aqueous streams generated by hydrothermal liquefaction (HTL) of waste sludges. Carbon and nitrogen were removed from the real HTL-derived aqueous feedstock proportionally to time and applied potential. The highest decreases were 39% C, 23% N, and 48% COD at the applied potential of 4 V vs. Ag/AgCl. All organic compounds (quantified and unidentified) were converted into short chain molecules (mostly acetic acid) during the ECO experiment. While the quantified carbon in organic compounds only decreased 10%, the unidentified carbon content decreased by 75%. Parallelly, the concentration of nitrates and sulfates increased >800% and >42%, respectively. Studies with single model compounds (contained in the HTL-derived aqueous feedstock) revealed that all the molecules were oxidized to carboxylic acids and alcohols while the carboxylic acids were further converted to olefins and paraffins following (non) Kolbe chemistry. The N containing molecules such as acetamide, pyrrolidinone and ammonia were oxidized with $N_2$ as the end product.

The simultaneous denitrification, decarbonification, and $H_2$ generation achieved during the ECO of the aqueous feedstock can replace and simplify the current unit operations used in a commercial HTL process, which eliminates the natural gas (NG) consumption for these unit operations and increases the overall carbon yield by 18%. Further, the hydrocarbons generated during the ECO can be used to generate process heat, eliminating the use of NG natural for the entire process. The high operation potential required to drive the ECO reaction is responsible for high operation costs; however, the costs can be either partially or fully subsidized with sale of excess $H_2$. Further, lowering the operation cell potential will lower the operation cost and increase the overall revenue obtained with the sale of excess $H_2$. Further, the operation at room temperature using electricity enables the utilization of this technology for remote, intermittent, and distributed operation.

Example 2

Simultaneous Electrocatalytic Bio-Oil Stabilization and Wastewater Treatment

When a mixture of bio-oil and wastewater is treated, the $e^-$ and $H^+$ generated at the anode can drive hydrogenation and $H_2$ evolution reactions at the cathode:
Anode Reactions:

$H_2O \rightarrow \frac{1}{2}O_2 + 2H^+ + 2e^-$ $2\ C_xH_yO_z \rightarrow C_{2(x-1)}H_{2(y-2)}O_{2(z-2)} + CO_2 + 2H^+ + 2e^-$ (e.g., $2C_2H_4O_2 \rightarrow C_2H_6 + 2\ CO_2 + 2H^+ + 2e^-$)

$2NH_3 \rightarrow N_2 + 6H^+ + 6e^-$

Cathode Reactions:

$2H^+ + 2e^- \rightarrow H_2$ $2\ C_xH_yO_z + 2H^+ + 2e^- \rightarrow C_xH_{(y+2)}O_z$ or $C_xH_yO_{(z-1)}$ (e.g., $C_7H_{14}O + 2H^+ + 2e^- \rightarrow C_7H_{15}OH$ In one example, a 1:5 bio-oil to wastewater ratio was selected and combined with isopropyl alcohol (IPA) to provide 10 wt. % bio-oil and 80 mM benzaldehyde in 47.5 wt. % IPA: 47.5 wt. % $H_2O$: 5 wt. % acetic acid (7.3 M IPA) as a catholyte. IPA was used to avoid phase separation. The anolyte was 1 M KOH in methanol:$H_2O$ (10:90 by mass). The cathode was 0.5 wt. % Pd/CF (CF=carbon felt), and the anode was 0.1 g of Pt paper (2 $mg_{Pt}$ $cm^{-2}$, Fuel Cell Store). The catholyte and anolyte were flowed through the cell under reaction conditions of a flow rate of 2.0 $cm^3\ min^{-1}$ in an open-loop, single pass 10 $cm^2$ fixed-bed continuous flow electrocatalytic cell with a LHSV of 20 $h^{-1}$, room temperature, 7.1-23 mA $cm^{-2}$, 0.6 to 2 V vs Ag/AgCl half-cell potential. An AMETEK VersaSTAT 4 Potentiostat Galvanostat was used to operate the electrocatalytic cell and monitor the current and full-cell potential. Before each experiment, the catalysts were exposed to a 50 wt % methanol and 50 wt % DI water solution under galvanostatic operation at −220 mA (half-cell potential of −1.60 V vs Ag/AgCl) for 15 min to cathodically protect the metals and avoid metal leaching. Then, the catalysts were reduced in situ for 2 h using a catholyte composed of 47.5 wt % methanol, 47.5 wt % DI water, and 5.0 wt % acetic acid (Sigma-Aldrich, Glacial) and an anolyte composed of 40 wt % methanol, 40 wt % DI water, 5.0 wt % acetic acid (Sigma-Aldrich, Glacial), and 5.0 wt % sodium acetate ($CH_3COONa$) (Sigma-Aldrich, anhydrous≥99%). After in situ reduction, the anolyte, catholyte, and current were adjusted to the desired reaction conditions.

The gas products were analyzed using an Agilent GC 3000 A gas chromatograph equipped with Mol Sieve and Plot U columns and a thermal conductivity detector to monitor He, $H_2$, $O_2$, CO, $CO_2$, and $N_2$. Under the reaction conditions operated in this work, $H_2$ was the only gas product observed. The liquid phase was analyzed using a high-performance liquid chromatography instrument equipped with a Waters 2414 refractive index detector. A Bio-Rad Aminex HPX-87Hion exclusion column (300 mm×7.8 mm) was used for anolyte separation. Sulfuric acid (0.005 M) was used as the eluent at a flow rate of 0.55 $cm^3\ min^{-1}$. The liquid phase also was analyzed via $H^1$-nuclear magnetic resonance (1H NMR) analysis on a Varian 500 MHZ NMR spectrometer to detect the low concentration reaction products. The carboxylic acid and phenolic contents were determined using the ASTM standard method D664. The carbonyl content was determined using the Faix titration method (Black et al., *Determination of Carbonyls in Pyrolysis Bio-oils by Potentiometric Titration. Faix Method. Laboratory Analytical Procedure (LAP)*; National Renewable Energy Lab. (NREL), Golden, CO: United States, 2016, DOI: 10.2172/1241099) The water content was determined using the Karl Fischer titration method, which is based on the ASTM standard method D6304. Under the operating conditions, the water content of the samples remained constant regardless of the current and potential used during the upgrading experiment. The pH of the samples containing bio-oil was also measured before and after upgrading using a pH meter (Fisher) and it remained at around 10.5. For product identification of the bio-oil-containing samples, a gas chromatograph from Shimadzu QP2010 equipped with a RXI-5Sil MS column (30 m×0.25 mm×0.5 μm) and a mass spectrometer were used. The compositions of the bio-oil-containing samples were analyzed using a HP 6890 gas chromatograph from Agilent equipped with a VF-1701 ms column (60 m×0.25 mm×0.25 μm). Parallel mass spectrometry/flame ionization detector (MS/FID) detection was used for improved qualification and quantification. The ionization energy was 70 eV. Electron impact mass spectra were obtained on a HP 5972 MS system.

As shown in FIG. 8, phenolic acid number and carboxylic acid number remained constant regardless of current and applied potential, suggesting that the phenolics and carboxylic acids present in the bio-oil were not electrocatalytically upgraded. However, the carbonyl concentration (CON) decreased as a function of current and applied potential, suggesting that only the organic molecules containing carbonyl functionality were reduced. The increase in current from −50 to −700 mA decreased the CON by half. At the same time, the hydrogen evolution rates (HER) were significantly increased, resulting in a decrease of the Faradaic efficiency from 100 to 15%.

Figure 11:
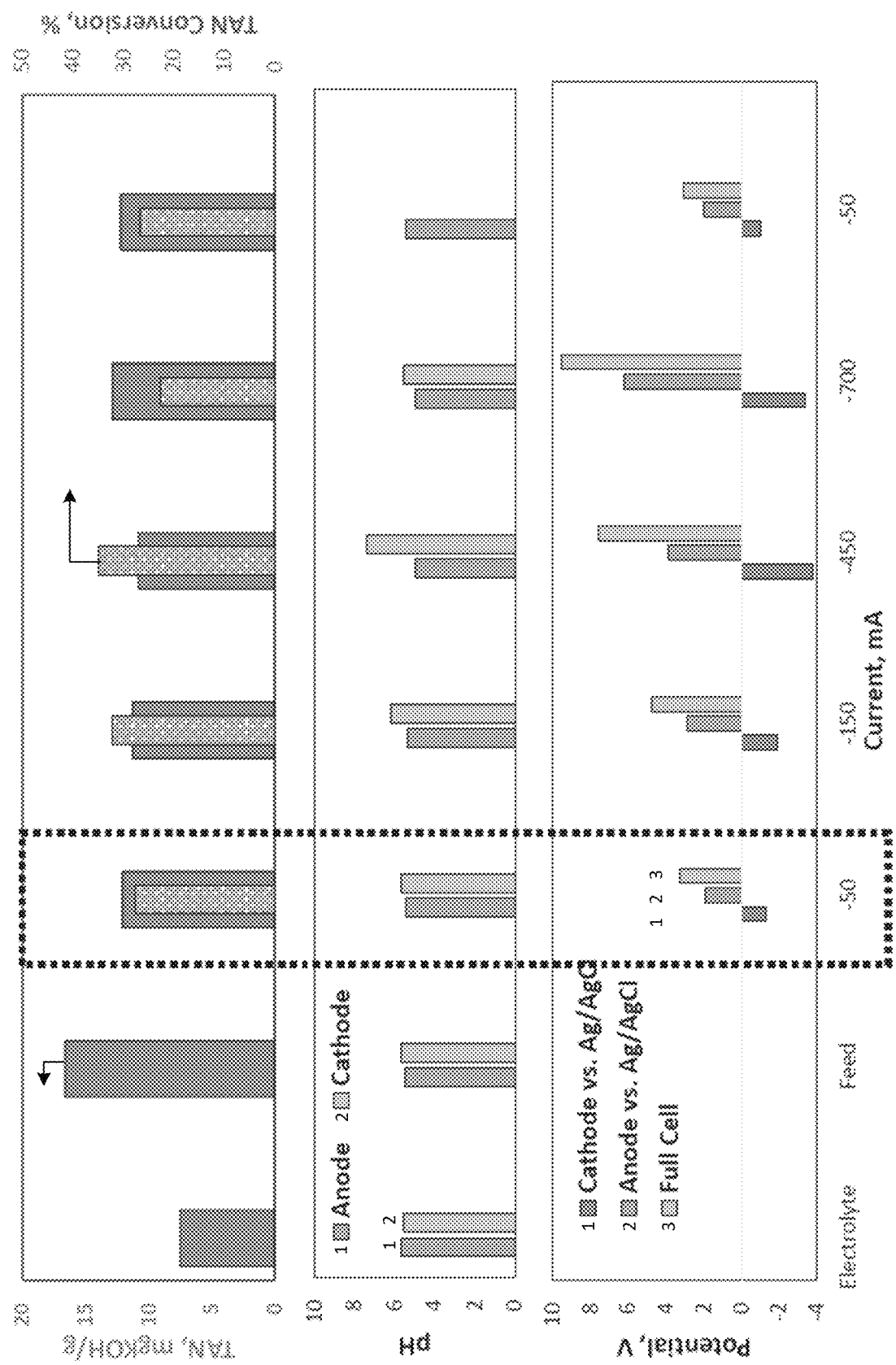
FIG. 11 shows total acid number (TAN) conversion, electrolyte pH, and potential as a function of current in a cell with a $RuO_2$ thin film ($RuO_2$-TF)/Ti anode and a Pd/carbon felt (CF) cathode, and an electrolyte including 10 wt. % bio-oil+0.5 M KOH in 47.5 wt. % IPA: 47.5 wt. % $H_2O$: 5 wt. % acetic acid.

A $RuO_2$ thin film ($RuO_2$-TF)/Ti anode (10.6 mg $RuO_2$-TF/Ti) was evaluated for bio-oil electrocatalytic oxidation in a continuous-flow single-pass configuration cell using a Nafion™ membrane to separate the anode and the Pd/CF cathode (20 mg Pd). The catholyte and anolyte included 10 wt. % bio-oil+0.5 M KOH in 47.5 wt. % IPA: 47.5 wt. % $H_2O$: 5 wt. % acetic acid. The cell was operated at a flow rate of 2 mL/min, room temperature, atmospheric pressure, 3.25 V (full cell potential), $WHSV_{RuO2-TF}$=11.0 kg bio-oil/h, $WHSV_{Pd}$=5.8 kg bio-oil/h. The results are shown in FIG. 11 (TAN=total acid number). The Pd/CF cathode was active for parallel biocrude electrocatalytic hydrogenation (ECH) and HER. The $RuO_2$-TF anode was active for carboxylation, with 35% carboxylic acid removal in a single pass.

Figure 12:
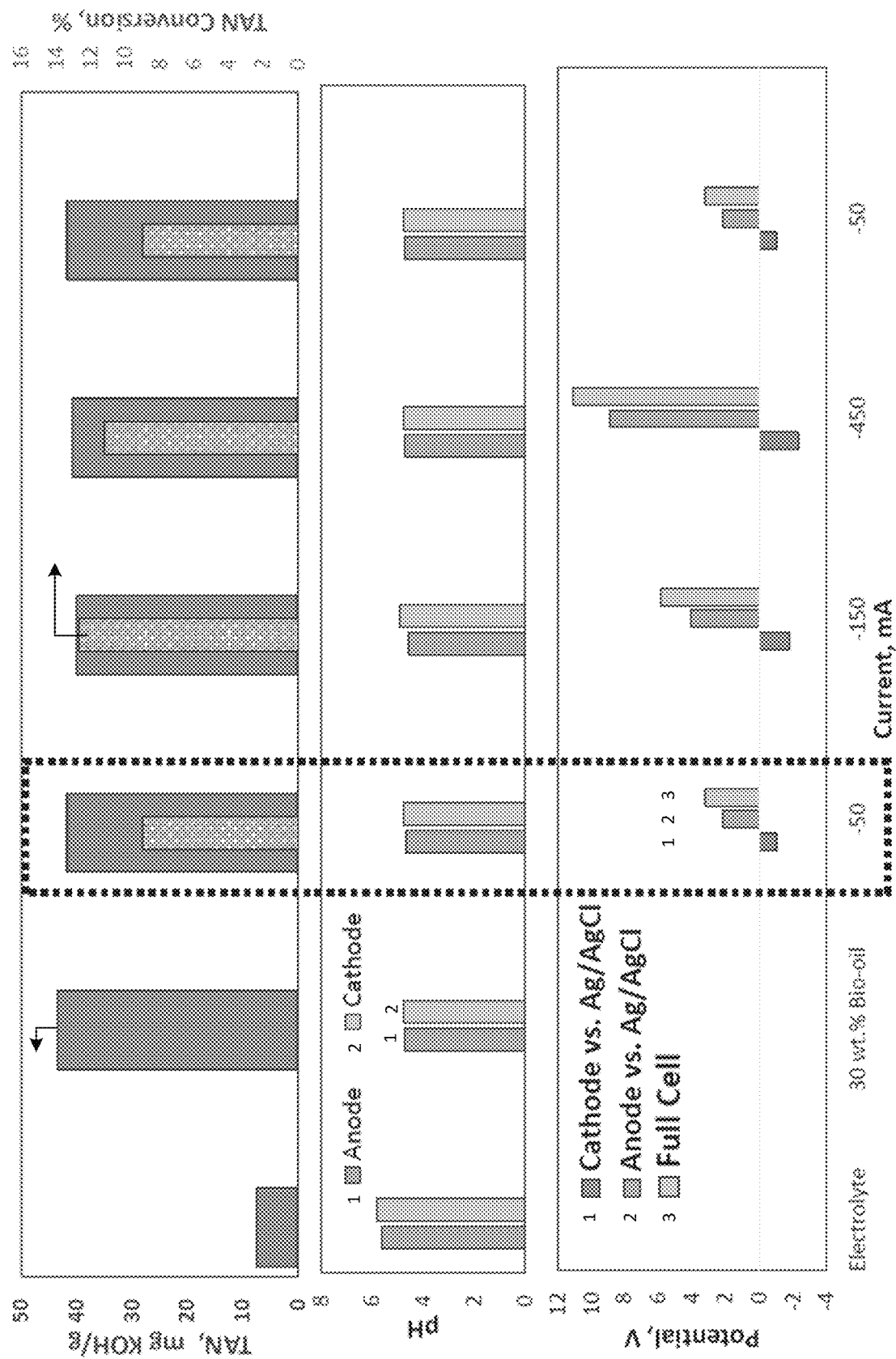
FIG. 12 shows total acid number (TAN) conversion, electrolyte pH, and potential as a function of current in a cell with a $RuO_2$-TF/Ti anode and a Pd/CF cathode, and an electrolyte including 30 wt. % bio-oil+0.5 M KOH in 47.5 wt. % IPA: 47.5 wt. % $H_2O$: 5 wt. % acetic acid.

The ECO of carboxylic acids was also successful with a higher (30 wt. %) bio-oil content at 3.25 V. The potentials required to generate the same current were higher. The results are shown in FIG. 12. The Pd/CF cathode was active ER. The $RuO_2$-TF anode was active for carboxylation, with 15% carboxylic acid removal in a single pass. The lower decarboxylation rate was attributed to the lower current density and higher TAN concentration.

The long-term performance of $RuO_2$-TF for bio-oil ECO was evaluated in a continuous flow cell operated in full-recycle operation mode. The anode was 10.6 mg $RuO_2$-TF/Ti, and the cathode was 20 mg Pd/CF. The catholyte an anolyte included 10 wt. % or 30 wt. % bio-oil+0.5 M KOH in 47.5 wt. % IPA: 47.5 wt. % $H_2O$: 5 wt. % acetic acid. Because of the potential-dependence on activity and product selectivity, the long-term ECO performance for the 10 wt. % and 30 wt. % bio-oil feeds was evaluated at similar potentials.

Figure 13:
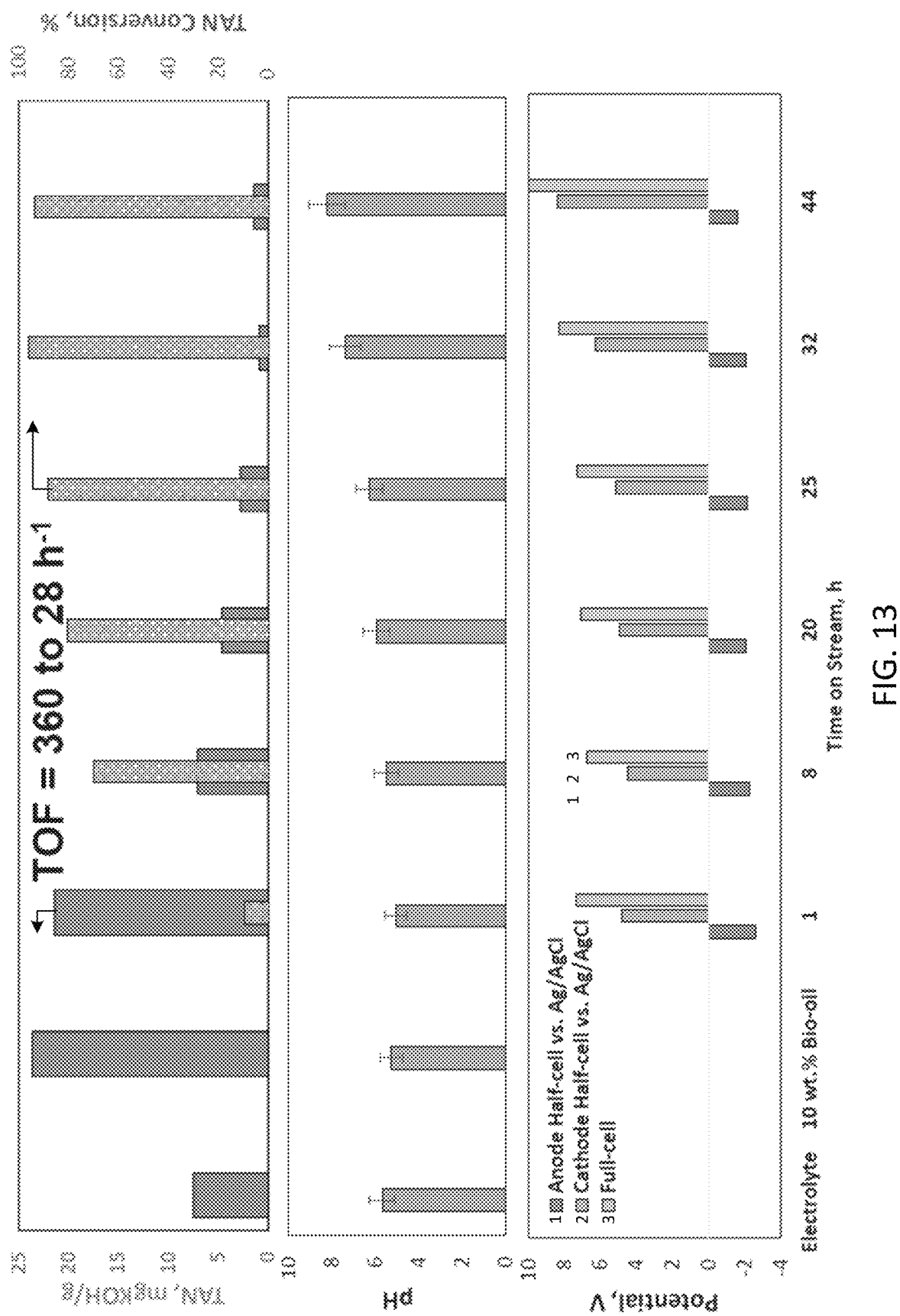
FIG. 13 shows long-term (44 hours) total acid number (TAN) conversion, electrolyte pH, and potential as a function of current in a cell with a $RuO_2$-TF/Ti anode and a Pd/CF cathode, and an electrolyte including 10 wt. % bio-oil+0.5 M KOH in 47.5 wt. % IPA: 47.5 wt. % $H_2O$: 5 wt. % acetic acid.

FIG. 13 shows the results with 10 wt. % bio-oil under reaction conditions of galvanostatic operation at −450 mA, 4 mL/minute, full recycle, 600 mL total volume, room temperature, $WHSV_{RuO2-TF}$=22.0 kg bio-oil/h, $WHSV_{Pd}$=11.6 kg bio-oil/h. The Pd/CF cathode was active and stable for HER. The $RuO_2$-TF anode was active for decarboxylation and achieved 95% carboxylic acid (TAN) removal. The anodic potential increased due to the removal of acids and changes in pH. The main gaseous product was $CO_2$. No $O_2$ was evolved.

Figure 14:
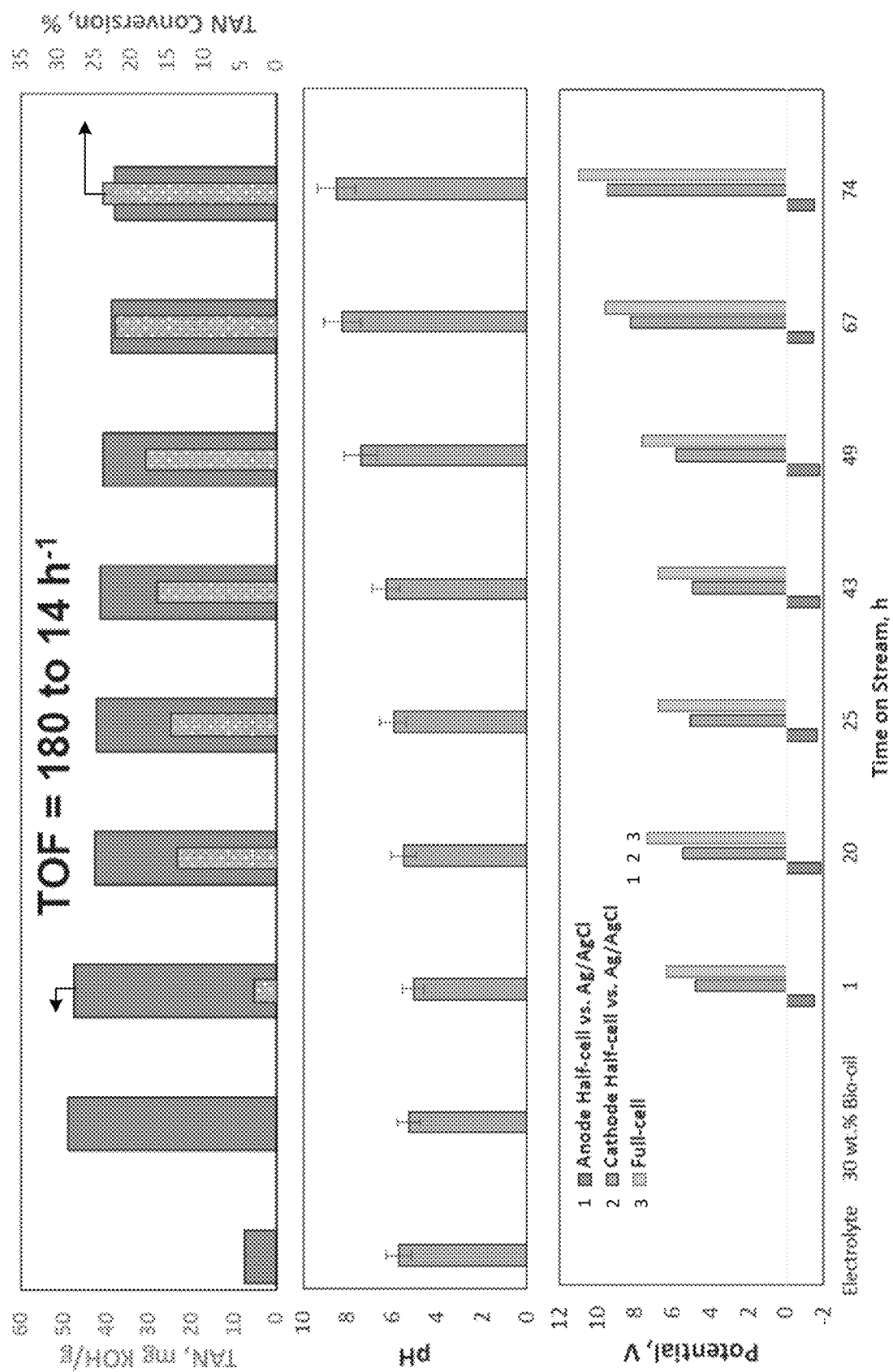
FIG. 14 shows long-term (74 hours) total acid number (TAN) conversion, electrolyte pH, and potential as a function of current in a cell with a $RuO_2$-TF/Ti anode and a Pd/CF cathode, and an electrolyte including 10 wt. % bio-oil+0.5 M KOH in 47.5 wt. % IPA: 47.5 wt. % $H_2O$: 5 wt. % acetic acid.

FIG. 14 shows the results with 30 wt. % bio-oil under reaction conditions of galvanostatic operation at −150 mA, 4 mL/minute, full recycle, 600 mL total volume, room temperature, $WHSV_{RuO2-TF}$=66.0 kg bio-oil/h, $WHSV_{Pd}$=34.8 kg bio-oil/h. The Pd/CF cathode was active and stable for HER. The $RuO_2$-TF anode was active for decarboxylation and achieved 35% carboxylic acid (TAN) removal. The lower conversion is due to the higher TAN and lower current density. The anodic potential increased due to the removal of acids and changes in pH. The main gaseous product was $CO_2$. No $O_2$ was evolved.

Figure 15:
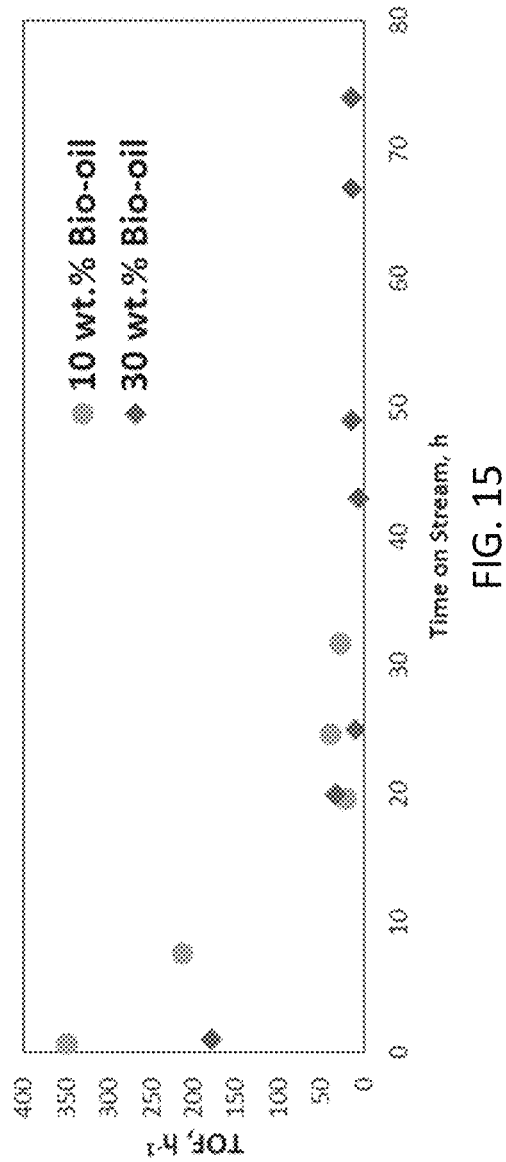
FIG. 15 shows modeled results of turnover frequency (TOF) for ECO of model studies at room temperature, atmospheric pressure as a function of time.

The turnover frequency (TOF) for ECO of model studies at room temperature, atmospheric pressure (and without $H_2$) is between 350 and 10 $h^{-1}$ (FIG. 15) with a 10.6 mg $RuO_2$-TF/Ti anode, and bio-oil+0.5 M KOH in 47.5 wt. % IPA: 47.5 wt. % $H_2O$: 5 wt. % acetic acid, under galvanostatic operation, full recycle, 600 mL total volume, and room temperature.

Figure 17:
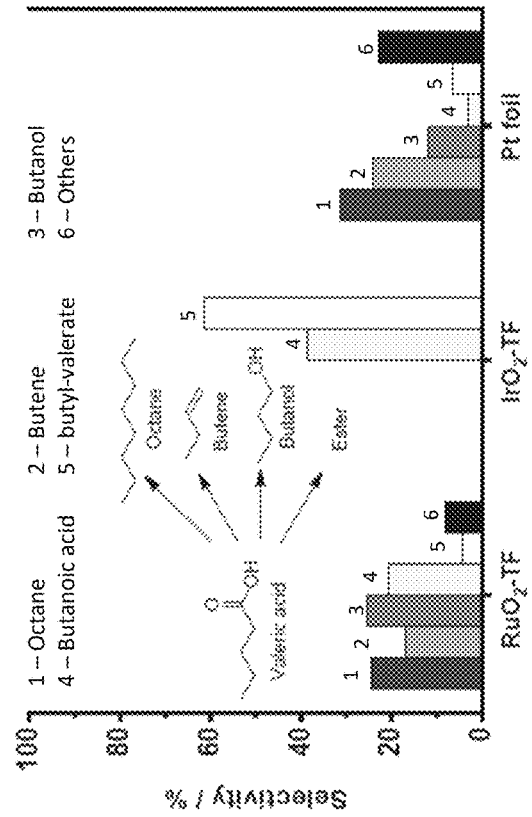
FIG. 17 shows product selectivity of VA reaction on various anodes—$RuO_2$-TF, $IrO_2$-TF, and Pt foil.
Figure 16:
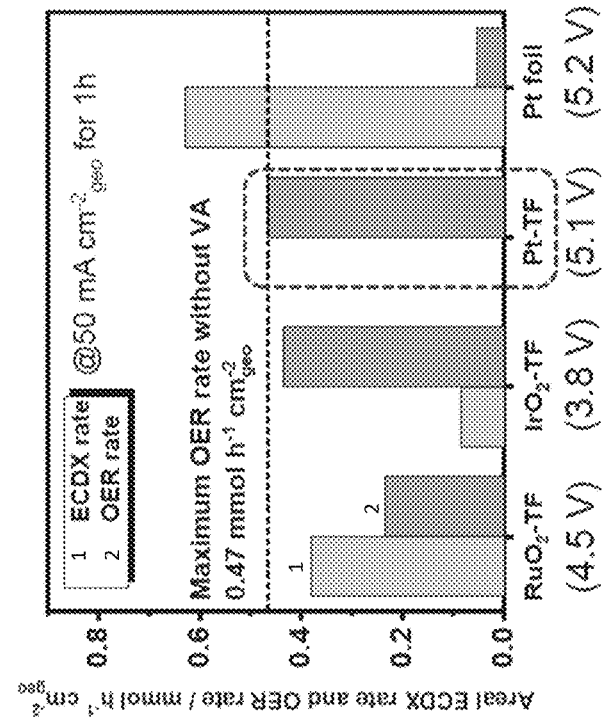
FIG. 16 compares electrocatalytic decarboxylation (ECDX) and oxygen evolution reaction (OER) rates of valeric acid (VA) on various anodes—$RuO_2$-TF, $IrO_2$-TF, Pt-TF, and Pt foil.

The $RuO_2$-TF anode was demonstrated to have a similar areal reaction rate to Pt foil for valeric acid ECDX at a fraction of the metal loading/cost. A chronopotentiometry test was performed at 50 mA $cm^{-2}_{geo}$ (400 mA) at 20° C. in a well-mixed cell. The electrolyte included 0.5 M valeric acid+0.14 M $Na_2SO_4$ solution (pH 5) for 1 h; the electrodes had a surface area of 8 $cm^2_{geo}$. The results are shown in FIG. 16 and Table 7 below. The $RuO_2$-TF had a 10× higher specific rate that Pt foil, but a 40× lower TOF than the Pt foil. The Pt was structure sensitive as the thin film was only active for OER while the bulk was selective for ECDX and paraffin formation. The $RuO_2$-TF was active for ECDX and olefin formation. The $IrO_2$-TF was mostly active for OER and ester formation. The selectivities are shown in FIG. 17.

TABLE 7

|  | $RuO_2$-TF | $IrO_2$-TF | Pt-TF | Pt foil |
|---|---|---|---|---|
| TOF/$s^{-1}$ | 0.65 | 0.12 | 0 | 27.4 |
| Specific ECDX rate/ $mmol_{VA}$ $h^{-1}$ $g_{catalyst}^{-1}$ | 243.3 | 54.2 | 0 | 23.5 |

Figure 18:
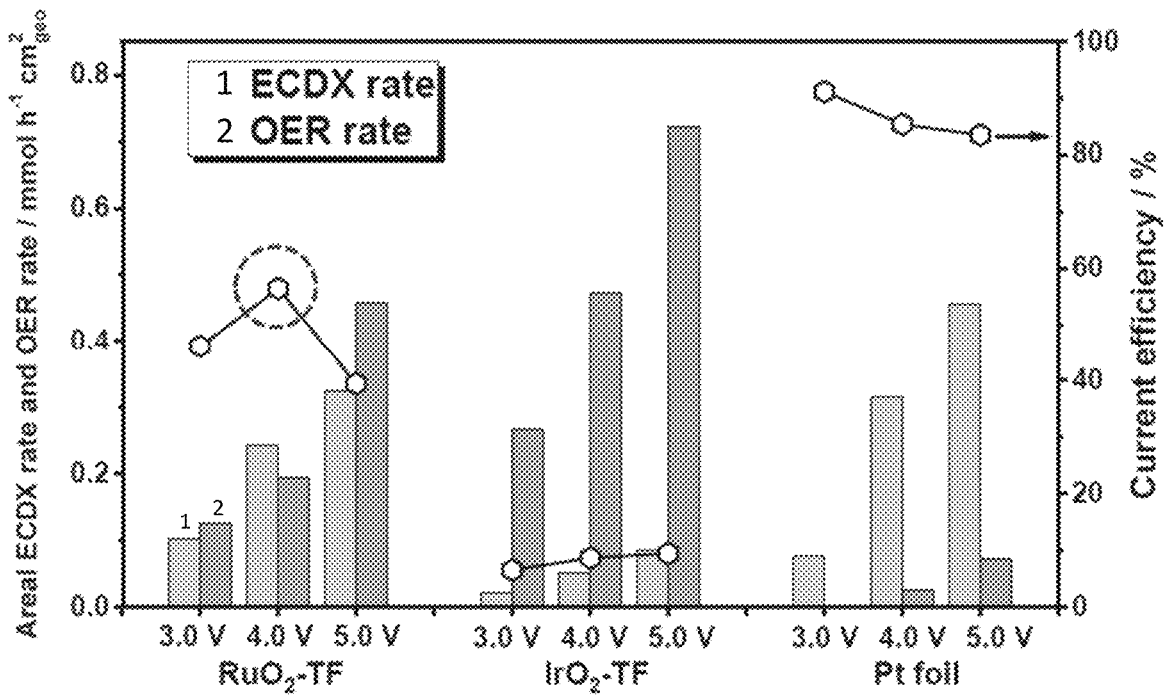
FIG. 18 compares electrocatalytic decarboxylation (ECDX) and oxygen evolution reaction (OER) rates of valeric acid (VA) on various anodes—$RuO_2$-TF, $IrO_2$-TF, and Pt foil—as a function of potential.
Figure 19:
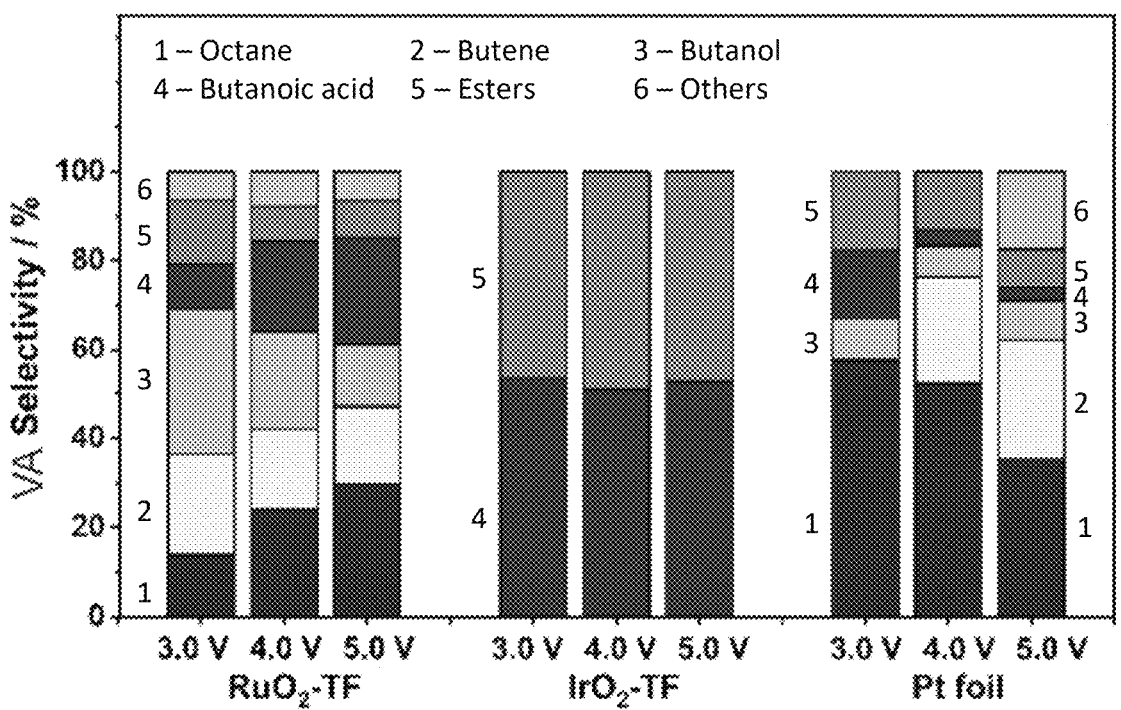
FIG. 19 shows product selectivity of VA reaction on various anodes—$RuO_2$-TF, $IrO_2$-TF, and Pt foil—as a function of potential.

ECDX activity and selectivity are potential-dependent. A chronoamperometry test was performed at 3.0 V to 5.0 V vs. RHE, with an electrolyte including 0.5 M valeric acid+0.14 M $Na_2SO_2$ solution (pH 5) for 2 hours, with 8 $cm^2_{geo}$ electrodes of $RuO_2$-TF, $IrO_2$-TF, and Pt foil. The results are shown in FIGS. 18 and 19. The $RuO_2$-TF had a higher specific ECDX rate than Pt foil, and exhibited the highest CE at 4.0 V vs. RHE. Higher potential led to lower CE due to OER. The $IrO_2$-TF electrode favored OER, while the Pt foil favored ECDX.

Example 3

Electrocatalytic Decarboxylation of Carboxylic Acids over $RuO_2$ and Pt Nanoparticles Electrocatalytic decarboxylation (ECDX) reaction for conversion of carboxylic acids into paraffins, olefins, and alcohols via (non-) Kolbe electrolysis on nanoscaled $RuO_2$ and Pt electrodes was evaluated. The ECDX rate, turnover frequency (TOF), specific activity, product selectivity, and current efficiency (CE) were evaluated as a function of particle size and potential.

Example 2 showed that electrocatalytic decarboxylation (ECDX) was a viable route to upgrade carboxylic acids into olefins, paraffins, and alcohols at room temperature and atmospheric pressure without consuming $H_2$ via the (non-) Kolbe electrolysis. In this example, nano-scaled $RuO_2$ and Pt electrodes were developed and evaluated for the ECDX of valeric acid (VA).

Materials: $RuCl_3 \cdot xH_2O$ (38.0-42.0% Ru basis), NaOH (≥97.0%), oxalic acid (98.0%), iso-propanol alcohol (IPA, ≥99.9%), $Na_2SO_4$ (≥99.0%), and VA (>99.0%) were purchased from Sigma Aldrich. Titanium (Ti) foil was purchased from Alfa Aesar. Pt black (5-7 nm) were purchased from Premetek. All chemicals were used as received without further purification. Nitrogen ($N_2$, 99.9%, Airgas) and ultra-high-purity $H_2$ (99.999%, Airgas) were used for electrochemical characterizations and calibration of the reference electrode.

Product separation, identification, and quantification: The water-soluble products were quantified by a high-performance liquid chromatography (HPLC) instrument equipped with a Waters 2414 refractive index detector. A Bio-Rad Aminex HPX-87H ion exclusion column (300 mm×7.8 mm) was used for analyte separation at 30° C. Sulfuric acid (0.005 M) flowing at 0.55 mL $min^{-1}$ was used as the eluent. A 1 mL liquid aliquots were taken from the sealed reactor at 0, 30, and 60 min of chronoamperometry test. For 6 h durability test, the sample picking up time was changed to 0, 30, 60, 90, 120, 180, 240, 300, and 360 min. In this work, 1-butanol, 2-butanol, and butanoic acid are quantified by HPLC.

The gas products were quantified by an online gas chromatography (Inficon Micro GC Fusion® Gas Analyzer) equipped with a thermal conductivity detector. The carrier gas was controlled to be 20 ml min$^{-1}$ to carry gas products into online GC. Gas aliquots were sampled every 5 min with the first injection starting 5 min after the reaction started. In this work, butene, butane, propane, propylene, $CO_2$, and $H_2$ (generated from cathode electrode) are quantified by online GC.

The n-octane, butyl-valerate, and iso-butyl-valerate esters were quantified using an offline GC (Agilent 6890 GC) equipped with a flame ionization detector (GC-FID). 20 mL dichloromethane (DCM) was injected into electrolyte after chronoamperometry test, and octane and ester can be fully extracted from aqueous electrolyte into DCM by stirring for 20 min. A 1 mL DCM was taken from the sealed reactor for following GC analysis. On the other hand, a 1 mL IPA trapping solution was also taken for octane and esters analysis. A 1 µL sample was injected with a 150:1 split at 300° C. into a HP-5 MS column (30.0 m×250 µm×0.25 µm). Helium flowing at 2.0 mL min$^{-1}$ was used as the carrier gas.

Calculation of conversion, current efficiency, product selectivity: Conversion of valeric acid was calculated using Eq. 5.

$$\text{Conversion (\%)} = \frac{n_{VA,0} - n_{VA,t}}{n_{VA,0}} \times 100 \qquad \text{Eq. 5}$$

where $n_{VA,0}$ and $n_{VA,t}$ are the initial and final moles of valeric acid, respectively. Current efficiency (CE) was calculated using Eq. 6

$$CE\ (\%) = \frac{\sum (n_i \cdot z_i \cdot F)}{Q} \times 100 \qquad \text{Eq. 6}$$

where $n_i$ is the number of moles of product i, $z_i$ is the number of electrons transferred per molecule of product i (e.g., z=2 for octane, butene, butanol, and butyl-valerate; z=6 for butanoic acid), F is the Faraday constant (96,485 C mol$^{-1}$), and Q is the total charge transferred as measured by the integration of I-t curve. Products selectivity (Si) was calculated using Eq. 7.

$$Si\ (\%) \frac{\alpha \times n_i}{n_{VA,0} - n_{VA,t}} \times 100 \qquad \text{Eq. 7}$$

where α is the theoretical stoichiometric number of consumed valeric acid for the specific product formation. For example, α=1 for butene, butane, propane, propylene, butanol, butanoic acid, and butanoic acid formation; α=2 for octane, butyl-valerate, and iso-butyl-valerate formation.

Calculation of specific surface area, electrochemical surface area, areal reaction rate, specific reaction rate, and turnover frequency. The specific surface area (SSA) was calculated using Eq. 8 (Zheng et al., *J Electrochem Soc* 2016, 163(6):F499-F506).

$$SSA\ (m^2g^{-1}) = \frac{6}{\rho_i \times d_{TEM}} \times 10^3 \qquad \text{Eq. 8}$$

where $d_{TEM}$ is the average particle size determined by TEM images with the unit of nm, $\rho_i$ is the materials density ($\rho_{RuO2}$=6.97 g cm$^{-3}$, $\rho_{Pt}$=21.45 g cm$^{-3}$). The electrochemical surface area (ECSA) of $RuO_2$ and Pt nanoparticles was determined using electrochemical impedance spectroscopy (Eq. 9; Qiu et al., *Langmuir* 2014, 30(26):7893-7901) and charge integration of hydrogen desorption (Eq. 10; Zhang et al., *Appl Catal B-Environ* 2013, 136:29-39), respectively.

$$ECSA_{DL}(m^2g^{-1}) = \frac{C_{dl}}{C_s \times m} \qquad \text{Eq. 9}$$

$$ECSA_{HUPD}(m^2g^{-1}) = \frac{Q_r}{0.210\ mC\ cm^{-2} \times m} \qquad \text{Eq. 10}$$

where $C_{dl}$ is electrochemical double layer capacitance, $C_s$ is the specific capacitance of the sample defined as the capacitance of a flat planar surface of the material per unit area, m is the total mass of catalysts, $Q_r$ is the charge corresponding to the hydrogen under potential region calculated from the anodic branch, and 0.210 mC cm$^{-2}$ is the Pt pseudo-capacity. The $C_s$ value of 0.030 mF cm$^{-2}$ for $RuO_2$ nanoparticles reported in literature (McCrory et al., JACS 2013, 135(45): 16977-16987). was used. Areal reaction rate was calculated using Eq. 11.

$$\text{Areal reaction rate}\ (\text{mmol}\ h^{-1}cm_{geo}^{-2}) = \frac{n_{VA,0} - n_{VA,t}}{t \times SA_{geo}} \qquad \text{Eq. 11}$$

where t is reaction time, SA is the geometric electrode surface area. The $SA_{geo}$ is 6 cm$^2$ in this work. Specific rate is calculated using Eq. 12.

$$\text{Specific reaction rate}\ (\text{mmol}\ h^{-1}g_{catalyst}^{-1}) = \frac{n_{VA,0} - n_{VA,t}}{t \times m} \qquad \text{Eq. 12}$$

where m is the total mass of $RuO_2$ or Pt nanoparticles. The turnover frequency (TOF) was calculated using Eq. 13 (Wang et al., J Mater Chem A 2017, 5(15):7191-7199); Kibsgaard et al., Angew Chem Int Edit 2014, 53(52):14433-14437).

$$TOF(s^{-1}) = \frac{\gamma \times N_A}{\rho \times ECSA} \qquad \text{Eq. 13}$$

where γ is the consumption rate of VA in units of mol$_{VA}$ s$^{-1}$, $N_A$ is Avogadro's number ($N_A$=6.022×10$^{23}$ molecules mol$^{-1}$), and ρ is the number of active sites in a plane per unit area.

Synthesis. $RuO_2$ NPs were synthesized through Ru(OH)$_x$ precipitation at pH 10.5, followed by air-calcination at 300° C. 0.01 mol $RuCl_3 \cdot xH_2O$ was dissolved in 100 ml of DI water to prepare a Ru$^{3+}$ solution of 0.1 M. The Ru$^{3+}$ solution was heated at 100° C. for 10 min under air atmosphere with vigorous stirring. 1 mL of 1.0 M NaOH solution was added into Ru$^{3+}$ solution to adjust solution pH to ~10.5, and Ru(OH)$_x$ nucleus are formed. The mixture was further heat-treated at 100° C. for 60 min. After solution cooling down, the mixture was centrifuged at 8000 rpm for 15 min. The obtained Ru(OH)$_x$ nanoparticles was washed with deionized (DI) water (18.2 MΩ) to completely remove unreacted $RuCl_3$, and dried at 60° C. for 12 h. 150 mg dried Ru(OH)$_x$ NPs were calcinated at 200, 300, 500, and 700° C., respectively, with 5° C. min$^{-1}$ heating rate under static air for 2 h. The RuO$_2$ NPs with different particle size were obtained and named as RuO$_2$-200, RuO$_2$-300, RuO$_2$-500, and RuO$_2$-700, respectively.

Commercial Pt NPs were calcinated at 300, 350, and 400° C., respectively, with 10° C. min$^{-1}$ heating rate under 5 v/v % H$_2$/N$_2$ gas with a flow rate of 100 mL min$^{-1}$ for 1.0 (for 300° C.) and 0.5 h (for 350 and 400° C.). The Pt NPs with different particle size were obtained and named as Pt-300, Pt-350, and Pt-400, respectively.

Electrode preparation: The electrochemical characterizations were carried out in a sealed glass cell (120 mL) with a three-electrode setup. A Pd foil and an Ag/AgCl electrode (Pine, LowProfile reference electrode) were used as counter and reference electrode, respectively. To fabricate working electrode, Pt catalysts ink (15 mg$_{Pt}$ mL$^{-1}$) were prepared by mixing Pt NPs with 5 wt. % PTFE solution (catalyst:PTFE=95:5 w/w %) in DI H$_2$O, while RuO$_2$ catalysts ink (15 mgRuO$_2$ mL$^{-1}$) were prepared by dispersing RuO$_2$ NPs in IPA, followed by ink sonication. Prior to ink spraying, Ti foil (2 cm×2.5 cm×1.27 mm) was etched in 10 w/v % oxalic acid at 90° C. for 30 min. The treated Ti foil was then washed by cuprous DI water and air dried at room temperature. The as-prepared catalysts ink was sprayed on pre-treated Ti foil with a final loading of 1.0 mg$_{catalyst}$ cm$^{-2}_{geo}$. After catalyst layer drying, 40 μL (20 μL per side) diluted 1 wt. % Nafion™ polymer solution was drop-casted on the top of the RuO$_2$ catalyst layers surface. The geometric surface area of sprayed Pt or RuO$_2$ catalyst was 6 cm$^2$ (3 cm$^2$ per side).

Physical characterization. Powder X-ray diffraction (XRD) spectra were obtained with a Rigaku MiniFlex II X-ray Generator with monochromatic Cu Kα radiation (λ=1.54056 Å) at room temperature. The operation tube current and tube potential were 15 mA and 30 kV, respectively. The average crystalline size of Pt and RuO$_2$ NPs is calculated based on the XRD diffraction peaks by using the Debye-Scherrer formula as shown in Eq. 14.

$$d = \frac{K \times \lambda}{B \times \cos(\theta)}, \qquad \text{Eq. 14}$$

where d is the average crystalline size of particles, K is Scherrer constant of 0.94 for spherical particle, B is full width at half maximum of the specific XRD diffraction peaks with unit of Radian. λ is X-ray wavelength (Cu k$_\alpha$ average=1.54178 Å), θ is the Bragg angle with unit of Radian.

An FEI Tecnai Scanning Transmission Electron Microscope (STEM) was used to determine the morphology and particle size of Pt and RuO$_2$ NPs. The metal loading and composition of the catalyst were analyzed by inductively coupled plasma optical emission spectroscopy (ICP-OES Optima 7000 DV, PerkinElmer). XPS measurements were performed with a Physical Electronics Quantera Hybrid Scanning X-ray Microprobe. This system uses a focused monochromatic Al Kα X-ray (1486.7 eV) source for excitation and a spherical section analyzer. The instrument has a 32 element multichannel detection system. The X-ray beam is incident normal to the sample and the photoelectron detector is at 45° off-normal. High energy resolution spectra were collected using a pass-energy of 69.0 eV with a step size of 0.125 eV. For the Ag 3d5/2 line, these conditions produced a FWHM of 0.92 eV±0.05 eV. The binding energy (BE) scale is calibrated using the Cu 2p$_{3/2}$ feature at 932.62±0.05 eV and Au 4f$_{7/2}$ at 83.96±0.05 eV.

Electrochemical Characterization:

The Ag/AgCl reference electrode was calibrated prior to ECDX tests in a single batch reactor. Two Pt wires and Ag/AgCl electrodes were used as the working, counter, and reference electrodes, respectively. The 0.14 M Na$_2$SO$_4$ solution (pH 6) was purged with ultrahigh-purity H$_2$ for at least 30 min before calibration to obtain H$_2$-saturated electrolyte, and the linear sweep voltammetry (LSV) test was conducted at a scan rate of 0.5 mV s$^{-1}$ from −0.55 to −0.45 V vs. Ag/AgCl to determine the thermodynamic potential for H$_2$ evolution and oxidation reaction. All potentials are reported against the RHE, which was converted from the potential vs. Ag/AgCl by using Eq 15.

$$E_{RHE} = E_{Ag/AgCl} + 0.487 \text{ V} \qquad \text{Eq. 15}$$

The ECDX performance was investigated by cyclic voltammetry (CV), LSV, and chronoamperometry (i.e., constant potential) experiments using the BioLogic (SP-150). CV and LSV tests were performed in 0.14 M Na$_2$SO$_4$ solution with and without 0.5 M VA. The electrolyte was purged with N$_2$ at 100 mL min$^{-1}$ for at least 30 min to remove dissolved O$_2$. The polarization curves were subsequently collected with scanning rate of 50 mV s$^{-1}$ between 1.2 to 2.8 V vs. RHE with iR correction.

The electrochemical impedance spectroscopy (EIS) was conducted by applying alternating current voltage with 10 mV amplitude in a frequency range from 300 kHz to 100 mHz. The Nyquist plot was obtained at open circuit voltage, and the measured solution resistance, R$_s$, was used to correct the practical potential applied on the working electrode using Eq. 16.

$$E_{iR-corrected} = E_{applied} - iR_s \qquad \text{Eq. 16}$$

where E$_{applied}$ is the applied potential on the working electrode (i.e., the anode in this work), i is the corresponding measured current, Rs is the compensated (85%) electrolyte resistance determined by electrochemical impedance spectroscopy, and E$_{iR-corrected}$ is the potential after iR correction (Qiu et al., *Langmuir* 2014, 30(26):7893-7901).

The chronoamperometry was conducted in 0.5 M VA+0.14 M Na$_2$SO$_4$ solution which was purged using N$_2$ flowing at 100 mL min$^{-1}$ for at least 30 min prior to each test. Constant potentials of 2.5, 3.5, and 4.5 V vs. RHE were applied for 1 to 6 h. The electrolyte was maintained at ~0° C. and ambient pressure during reaction, and N$_2$ gas flowed at 20 mL min$^{-1}$ to carry gas products (e.g. butene, butane, propylene, CO$_2$, etc.) to an online gas chromatography (Inficon Micro GC Fusion® Gas Analyzer equipped with a thermal conductivity detector) instrument. A trapping system containing IPA at ~0° C. was used to collect volatile compounds (e.g., octane, butanol, etc.). A 20 mL dichloromethane was added into electrolyte to after chronoamperometry test to extract octane and esters. All aqueous products in both aqueous and organic phase were quantified using a combination of high-performance liquid chromatography (equipped with a Waters 2414 refractive index detector) and an offline GC (Agilent 6890 equipped with a flame ionization detector) (Qiu et al., *Appl. Catal. B-Environ.* 2020, 277(15):119277).

Results and Discussion

Materials Physical Characterization

Figure 20A:
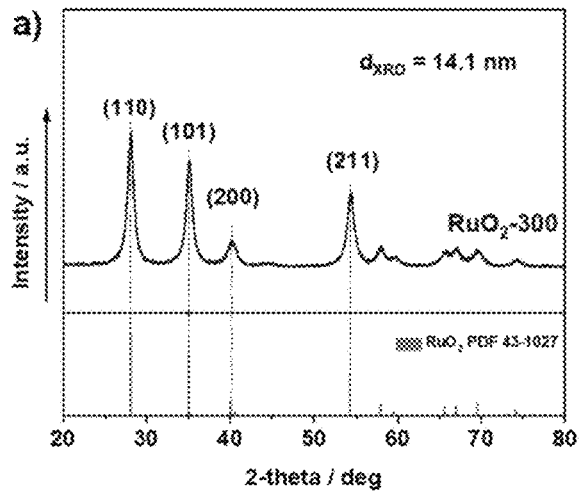
FIGS. 20A-20D show an XRD pattern (FIG. 20A), TEM image and size distribution (FIG. 20B), XPS survey scanning spectrum (FIG. 20C), and Ru 3d high-resolution spectrum of a $RuO_2$-300 sample.
Figure 20B:
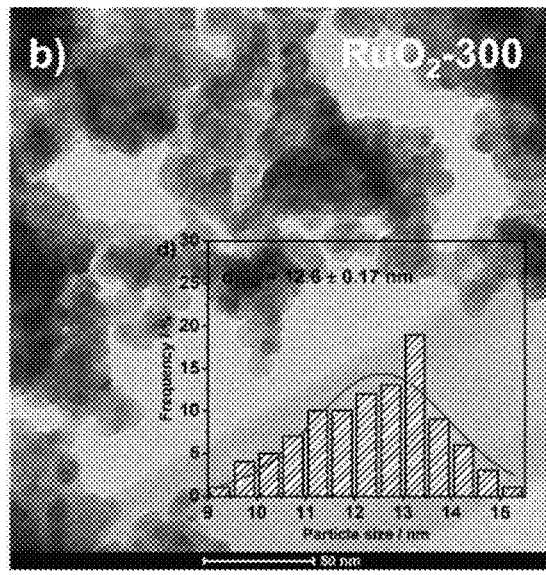

On XRD analysis, the Ru(OH)$_x$ sample showed a broad peak centered at ~33.0°. Three major diffraction peaks of rutile RuO$_2$ (110), (101), and (211) facets were formed at 28.0°, 35.1°, 54.3° after air-calcination (FIG. 20A), indicating the rutile crystalline structured $RuO_2$ were formed. The average particle diameter of $RuO_2$ NPs in the $RuO_2$-300 (i.e., electrode composed of $RuO_2$ NP calcined at 300° C.) sample were determined using both Debye-Scherrer equation ($d_{XRD}$) and TEM ($d_{TEM}$) as shown in Table 8, where $d_{TEM}$ is the number averaged particle diameter determined from TEM, $d_{XRD}$ is the average crystallite size determined by the Debye-Scherrer equation, $SSA_{TEM}$ is the metal surface area calculated from $d_{TEM}$, and ECSA is the electrochemical surface area measured using impedance and Hupd (hydrogen underpotential deposition) method. The electrochemical capacitance measurements to determine the ECSA of the $RuO_2$ NPs is shown in FIGS. 21A-21D. There was about 10% difference in average particle size derived from XRD (14.1 nm) and TEM (12.6 nm) for $RuO_2$-300, which is mainly attributed to the broad size distribution of 9.0 to 15.5 nm for $RuO_2$ NPs (FIG. 20B).

TABLE 8

| Samples | $d_{TEM}$ | $SSA_{TEM}/$ $m^2$ $g_{catalysts}^{-1}$ | $d_{XRD}$ | ECSA/ $m^2$ $g_{catalysts}^{-1}$ | Ratio of ECSA/ SSA |
|---|---|---|---|---|---|
| $RuO_2$-200 | 9.30 ± 0.12 | 92.6 | 9.10 | 59.1 | 0.64 |
| $RuO_2$-300 | 12.6 ± 0.17 | 68.3 | 14.1 | 36.8 | 0.54 |
| $RuO_2$-500 | 20.1 ± 0.20 | 42.8 | 22.9 | 26.2 | 0.61 |
| $RuO_2$-700 | 37.8 ± 0.72 | 22.7 | 42.3 | 12.7 | 0.56 |
| Pt-100 | 5.00 ± 0.07 | 55.9 | 6.80 | 31.6 | 0.56 |
| Pt-300 | 10.2 ± 0.03 | 27.4 | 12.8 | 18.7 | 0.68 |
| Pt-350 | 17.9 ± 0.22 | 15.6 | 20.6 | 12.6 | 0.80 |
| Pt-400 | 44.5 ± 1.35 | 6.30 | 50.1 | 7.70 | 1.23 |

Figure 20C:
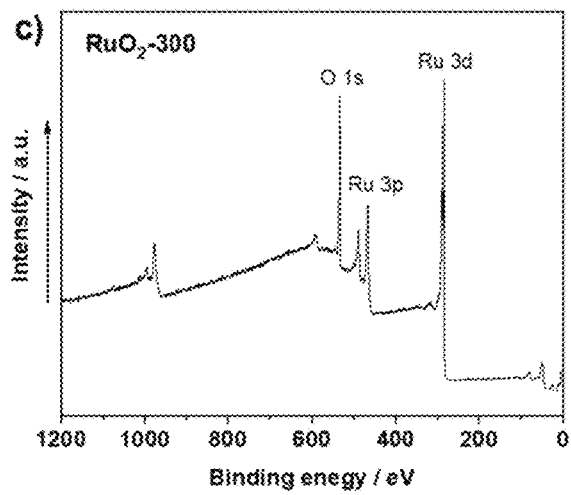
Figure 20D:
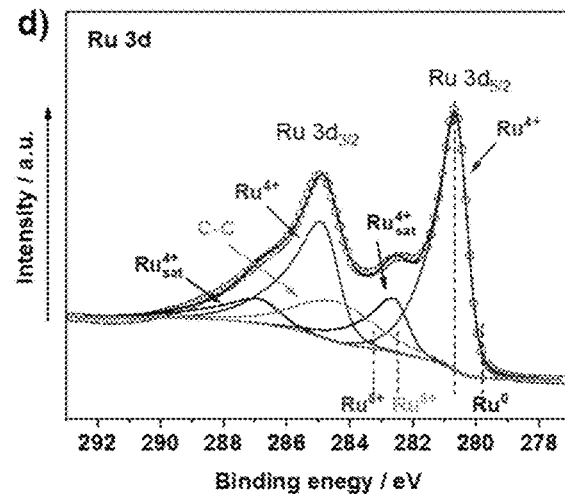

XPS was used to determine the surface composition and oxidation state of Ru in $RuO_2$-300. The survey spectrum (FIG. 20C) showed only Ru and O elements, suggesting that $Cl^-$ from the Ru precursor was completely removed. It is noteworthy that any $Cl^-$ residue can be further oxidized to $Cl_2$ under the potential of ECDX, which might interfere the ECDX performance on $RuO_2$. The high-resolution Ru 3d spectrum (FIG. 20D) showed two major peaks at binding energy of 280.5 and 284.7 eV that can be deconvoluted into the peaks of $Ru^{4+}3d_{5/2}$ (280.5 eV), $Ru^{4+}3d_{3/2}$ (284.7 eV), $Ru_{sat}^{4+}3d_{5/2}$ (282.5 eV), $Ru_{sat}^{4+}3d_{3/2}$ (286.7 eV). The C1s (284.8 eV) with C—C structure was observed and overlapped with Ru 3d peaks. This most likely originated from carbon impurity adsorption on $RuO_2$ surface during XPS sample load and transportation.

Pt NPs were also prepared through heat treatment at 300° C. Pt-300 exhibited an average size of 10.2 nm with a broad size distribution of 7 to 16 nm, which is in good agreement to XRD result of 12.8 nm. The XPS survey scanning and Pt 4f high-resolution spectra showed that the metallic Pt was predominant in Pt-300 samples, and the composition of $Pt^0$ and $Pt^{2+}$ & $Pt^{4+}$ was 94.5 at. % and 5.5 at. %, respectively.

The specific surface area (SSA) and electrochemical surface area (ECSA) of $RuO_2$-300 and Pt-300 were calculated and listed in Table 8. Although Pt-300 and $RuO_2$-300 electrodes have similar average particle size and size distributions, the higher density of Pt (21.45 $g_{Pt}$ $cm^{-3}$) compared to that of $RuO_2$ (6.97 $g_{RuO2}$ $cm^{-3}$) leads a smaller SSA and ECSA of Pt (SSA of 26.6 $m^2$ $g_{Pt}^{-1}$, ECSA of 18.07 $m^2$ $g_{Pt}^{-1}$) than $RuO_2$ (SSA of 66.7 $m^2$ $g_{RuO2}^{-1}$, ECSA of 36.8 $m^2$ $g_{RuO2}^{-1}$). As a result, ~50% lower $RuO_2$ loading is required to achieve the same ECSA and active sites as the Pt electrodes, which is an important advantage for nano-scaled $RuO_2$ as the alternative electrocatalyst to Pt materials.

Electrochemical Characterizations of Valeric Acid Electrocatalytic Decarboxylation The electrode performance of VA ECDX was preliminary evaluated using rotation disk electrode (RDE) (Qiu et al., *Appl. Catal. B-Environ.* 2020, 277(15):119277). The onset potential, Tafel slope, and required potential for current density of 10 mA $cm^{-2}_{geo}$ were collected and summarized in Table 9.

TABLE 9

| | OER $E_{onset}$ [V vs. RHE] | OER Tafel slope [mV $dec^{-1}$] | Mixed reaction Tafel slope [mV $dec^{-1}$] | OER $E_{applied}$ @10 mA $cm^{-2}$ [V vs. RHE] | Mixed reaction $E_{applied}$ @10 mA $cm^{-2}$ [V vs. RHE] |
|---|---|---|---|---|---|
| $RuO_2$-300 | 1.440 | 119 | 179 | 1.661 | 1.819 |
| Pt-300 | 2.020 | 132 | 277 | 2.330 | 2.748 |

Figure 22A:
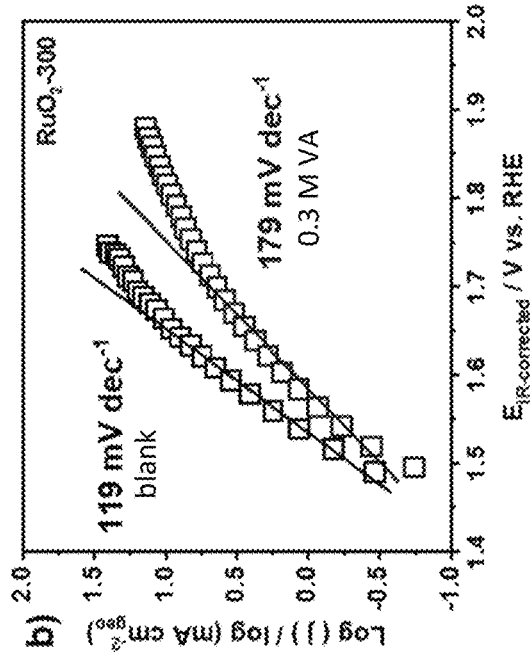
FIGS. 22A-22D show linear sweep voltammograms (FIGS. 22A, 22C) and corresponding Tafel plots (FIGS. 22B, 22D) measured on $RuO_2$-300 and Pt-300 in $N_2$-saturated 0.14 M $Na_2SO_4$ solution with and without 0.3 M valeric acid (VA) (pH 6), collected at 50 mV $s^{-1}$.
Figure 22B:
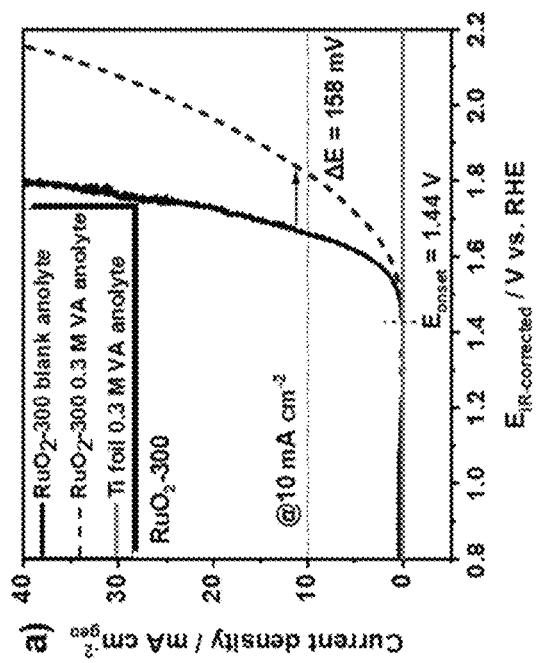
Figure 22C:
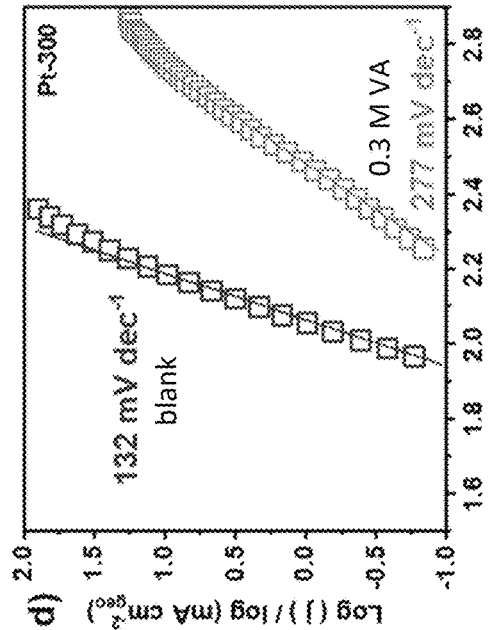
Figure 22D:
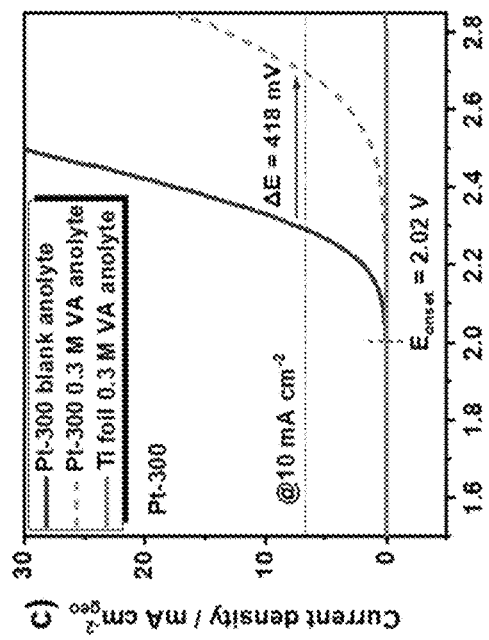

$RuO_2$-300 exhibited a well-defined OER polarization curve in 0.14 M $Na_2SO_4$ solution (pH 6) with an onset potential of 1.44 V vs. RHE with a Tafel slope of 119 mV $dec^{-1}$ (FIGS. 22A, 22B). The measured Tafel slope in weak acidic solution (pH 6) was higher than the previously reported Tafel slope of 40 to 50 mV $dec^{-1}$ over $RuO_2$-based catalysts in strong acidic media (0.5 M $H_2SO_4$ with pH~0), indicating the lower OER activity in weak acidic media (Suen et al., *Chem. Soc. Rev.* 2017, 46(2):337-365; Qiu et al., *Langmuir* 2014, 30(26):7893-7901). In contrast, Pt-300 showed a higher onset potential of 2.02 V vs. RHE with a larger Tafel slope of 132 mV $dec^{-1}$ than $RuO_2$-300, suggesting Pt-300 has inferior OER activity than $RuO_2$-300 under identical conditions. When VA was added into electrolyte, the Tafel slope increased for both $RuO_2$-300 and Pt-300 to 179 and 277 mV $dec^{-1}$, respectively. The potential required to achieve 10 mA $cm^{-2}_{geo}$ also increased for $RuO_2$-300 and Pt-300 to $\Delta E_{10\ mA\ cm-2}$=158 and 418 mV respectively (FIGS. 22A-22D). Both increased Tafel slope and required potential at 10 mA $cm^{-2}_{geo}$ imply that the adsorption of VA-derived intermediate (i.e., valerate) is suppressing OER on both $RuO_2$-300 and Pt-300 electrode.

The ECDX activity over $RuO_2$-300 and Pt-300 was studied through chronoamperometry tests in 0.5 M VA+0.14 M $Na_2SO_4$ solution (pH 6) at 4.5 V vs. RHE. To minimize deep oxidation products formation on Pt and further mitigate OER competition to ECDX, a constant potential of 4.5 V vs. RHE was applied on electrodes, and ECDX was performed at 0° C. for 1 h. $RuO_2$-TF and Pt foil were also investigated under the same testing conditions as the references.

Figure 23A:
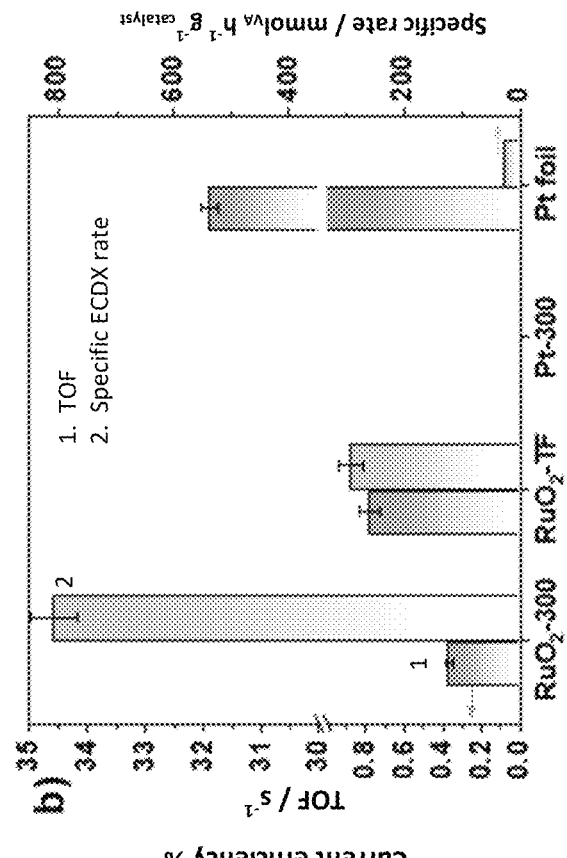
FIGS. 23A and 23B show areal ECDX and OER rate (FIG. 23A), and TOF and ECDX specific rate (FIG. 23B) of valeric acid ECDX for 1 hour over $RuO_2$-300, $RuO_2$-TF, Pt-300, and Pt-foil electrodes at constant anodic potential of 4.5 V vs. RHE; reaction conditions: 70 mL of 0.5 M valeric acid+0.14 M $Na_2SO_4$ solution (pH 6) at ~0° C.

As shown in FIG. 23A, $RuO_2$-300 (0.63 mmolVA h−1 cm−2geo), $RuO_2$-TF (0.61 mmolVA h−1 cm−2geo), and Pt foil (0.70 mmolVA h−1 cm−2geo) showed similar areal ECDX rates, while different areal OER rates were obtained. $RuO_2$-300 (0.036 mmolVA h−1 cm−2geo) and $RuO_2$-TF (0.128 mmolVA h−1 $cm^{-2}_{geo}$) exhibited higher areal OER rate than Pt foil (0.013 mmolVA h−1 cm−2geo), therefore, leading the CE trend of Pt foil (94.5%)>$RuO_2$-300 (85.4%) >$RuO_2$-TF (62.4%). The high CE over $RuO_2$-300 and Pt foil indicates that ECDX is the preferred reaction over OER. In contrast, Pt-300 favored only OER and ECDX of VA was negligible, which is consistent with our previous results showing that ECDX is negligible on Pt microstructures (Pt-TF). This result suggested that the change in onset potential and Tafel slope observed on Pt-300 in the presence of VA is not associated with a change in preferred reaction from OER to ECDX, but to the suppression of OER in the presence of VA. It was hypothesized that the difference in ECDX performance between nano-scaled Pt-300 and bulk Pt foil is mainly attributed to a change in preferred oxidation state between the NPs and bulk material under the same potential of 4.5 V vs. RHE. From the Pt-4f high-resolution spectrum of Pt-300 before and after ECDX tests, an apparent change in $Pt^0/Pt^{2+}\&Pt^4$ ratio from 94.5 at %/5.5 at % to 76.1 at %/23.9 at % after ECDX tests was observed, suggesting that the oxide layer was growing on Pt NPs. This is consistent with previous reports showing that Pt NPs oxidize more easily than bulk Pt foil due to the higher oxophilicity of Pt nanoparticles. The effective of an oxide layer on the ECDX activity over Pt-300 and Pt foil was investigated by conducting 100 cycles CV scanning in 0.14 M $Na_2SO_4$ with and without 0.5 M VA. The OER current density decreased by 52% and 10% on Pt-300 and Pt foil respectively after 100 cycles scanning in blank 0.14 M $Na_2SO_4$ solution, which indicates the faster oxide layer formation on Pt-300 than Pt foil. When VA was introduced, the measured current density decreased 43% on Pt-300 but less than 2% on Pt foil. The negligible current density change observed in the presence of VA on Pt foil may be due to the suppression of OER and surface oxygen species that least to Pt surface oxidation (FIG. 23A). However, the formation of a surface $PtO_x$ layer on the Pt NPs is very facile and is not suppressed in the presence of VA. As shown in FIG. 23A, the $PtO_x$ layer formed on the Pt NPs was not active for ECDX, but remained active for OER.

Figure 23B:
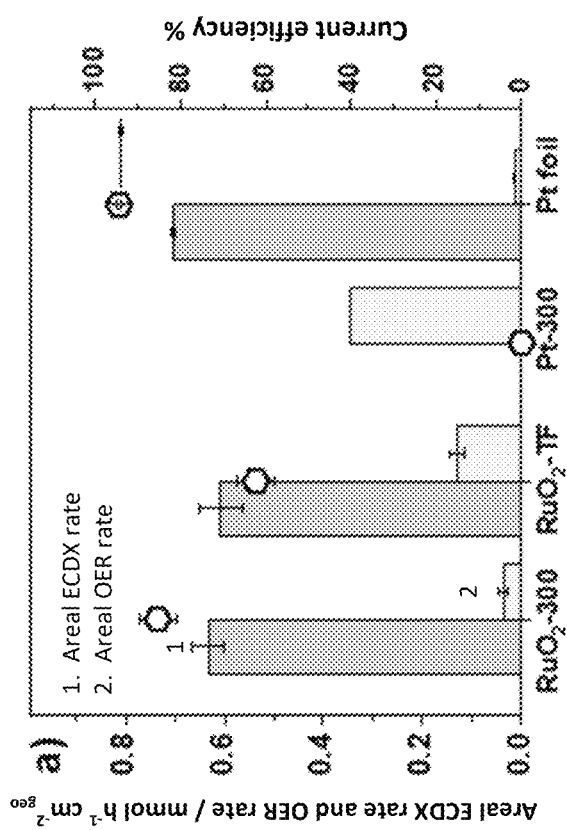

The ECDX activity was evaluated by normalizing the mass of catalytic material (i.e., specific rate) and number of active sites (i.e., TOF) and are summarized in FIG. 23B. Despite the lower ECDX TOF on $RuO_2$-300 than on Pt foil and $RuO_2$-TF, $RuO_2$-300 showed 35 and 2 times higher specific rate than Pt foil and $RuO_2$-TF, respectively. In addition, $RuO_2$-300 exhibited similar (non-) Kolbe product selectivity to $RuO_2$-TF (Table 10), indicating that the $RuO_2$ morphology and particle size did not noticeably affect the ECDX product selectivity. Compared to Pt foil, both $RuO_2$-300 and $RuO_2$-TF showed lower octane and ester selectivities and higher butene and butanol selectivities (Table 10).

TABLE 10

| | Average current | Paraffins octane | Paraffins butane | Olefins butene | Alcohols 1-butanol & 2-butanol | Carboxylic acids butanoic acid | Esters Butyl-valerate & iso-butyl-valerate |
|---|---|---|---|---|---|---|---|
| $RuO_2$-300 | 162 mA | 31.3% | 3.0% | 24.1% | 15.2% | 0.7% | 16.0% |
| $RuO_2$-TF | 220 mA | 33.2% | 3.0% | 23.8% | 12.7% | 2.8% | 11.5% |
| Pt-300 | 223 mA | 0.0% | 0.0% | 0.0% | 0.0% | 0.0% | 0.0% |
| Pt foil | 155 mA | 45.3% | 2.8% | 18.5% | 8.8% | 0.0% | 23.7% |

Figure 24:
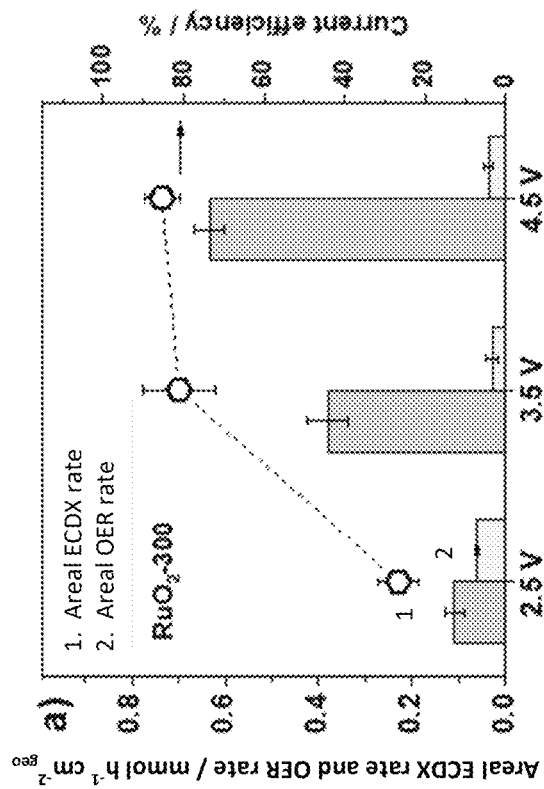
FIG. 24 shows areal ECDX and OER rate of valeric acid ECDX over a $RuO_2$-300 electrode at constant potential of 2.5, 3.5, and 4.5 V vs. RHE for 1 h; reaction conditions: 70 mL of 0.5M valeric acid+0.14M $Na_2SO_4$ solution (pH 6) at ~0° C.

With a higher specific rate and CE, the $RuO_2$ NPs represent a better low metal loading catalyst than Pt NPs, $RuO_2$-TF and Pt-TF for the ECDX reaction. Therefore, the effect of applied potential on the ECDX activity and product selectivity was investigated. When the potential decreased from 4.5 to 2.5 V vs. RHE, the ECDX rate decreased by a factor of =6 (from 0.60 to 0.09 mmol $h^{-1}$ $cm^{-2}_{geo}$), while OER rate increased by 40% (from 0.048 to 0.067 mmol $h^{-1}$ cm 2geo). The selectivity of both Kolbe (i.e., octane, from 31.3% to 15.9%) and non-Kolbe products (e.g., butene, from 24.1% to 5.20%; butanol, from 15.2% to 7.50%; etc.) decreased, while the ester selectivity increased from 16.0% to 39.3% (FIG. 24, Table 11). These results suggest that esterification and alcohol formation via non-Kolbe electrolysis is favored at low potentials, while paraffin and olefin formation via Kolbe and non-Kolbe electrolysis is favored at higher potentials. Surprisingly, the overall selectivity towards alcohol formation (i.e., alcohol+esterification) remained similar regardless of the applied potential. For example, at 2.5 V vs. RHE the overall alcohol selectivity was 27.5% (7.50% direct alcohol+20.0% from ester), while at 4.5 V vs. RHE the overall alcohol selectivity was 28% (16.0% direct alcohol+12.0% from ester). Overall, the nano-scaled $RuO_2$-300 was more active than $RuO_2$-TF toward ECDX, and a lower catalyst loading of $RuO_2$ was required to achieve the same ECDX performance with similar products selectivity to Pt foil.

TABLE 11

| $RuO_2$-300 | Average current | Paraffins octane | Paraffins butane | Olefins butene | Alcohols 1-butanol & 2-butanol | Carboxylic acids butanoic acid | Esters Butyl-valerate & iso-butyl-valerate |
|---|---|---|---|---|---|---|---|
| 2.5 V | 55 mA | 15.9% | 1.1% | 5.2% | 7.5% | 0.0% | 39.3% |
| 3.5 V | 96 mA | 25.3% | 1.3% | 11.1% | 16.0% | 3.8% | 22.5% |
| 4.5 V | 162 mA | 31.3% | 3.0% | 24.1% | 15.2% | 0.7% | 16.0% |

Figure 25A:
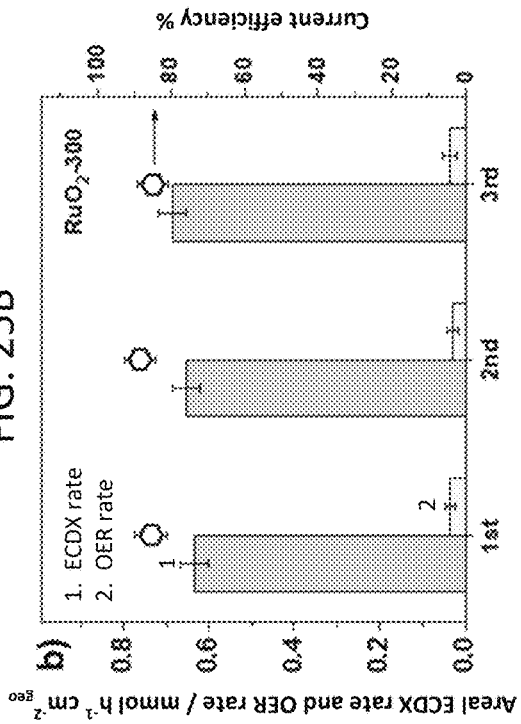
FIGS. 25A and 25B are an XPS survey scanning spectrum (FIG. 25A) and Ru 3d high-resolution spectrum (FIG. 25B) of used $RuO_2$-300 after a 6-hour chronoamperometry test at a constant potential of 4.5 V vs. RHE.
Figure 25B:
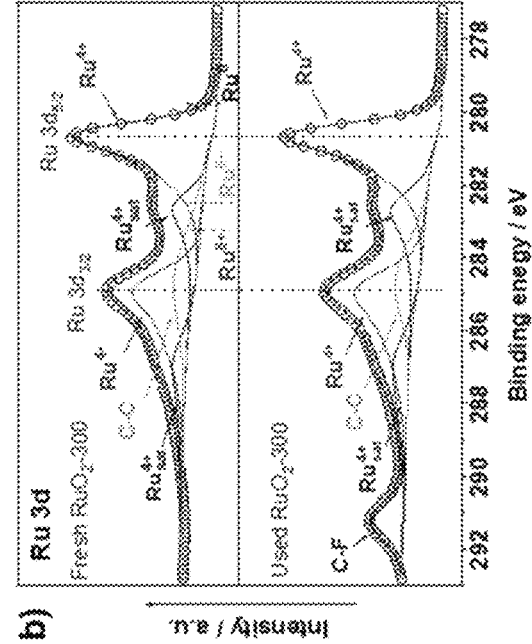
Figure 26A:
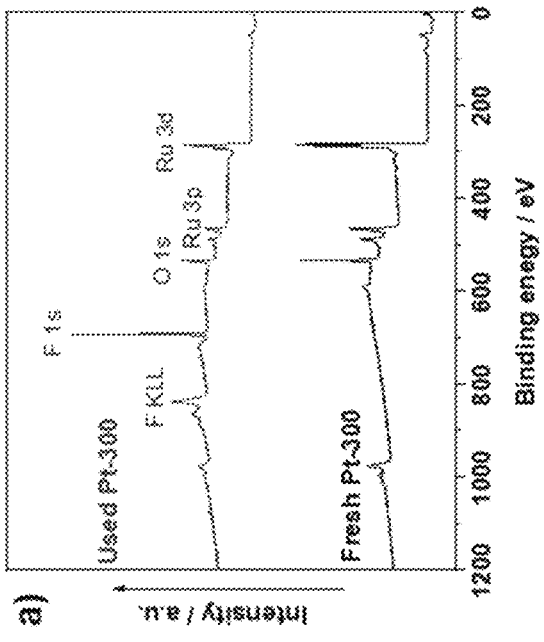
FIGS. 26A and 26B show VA conversion and areal ECDX rate of a 6-hour chronoamperometry test with a $RuO_2$-300 electrode (FIG. 26A), and areal ECDX and OER rates and current efficiency (FIG. 26B) as a function of time using the same electrode for repeated chronoamperometry tests at a constant potential of 4.5 V vs. RHE for 1 hour per test.
Figure 26B:
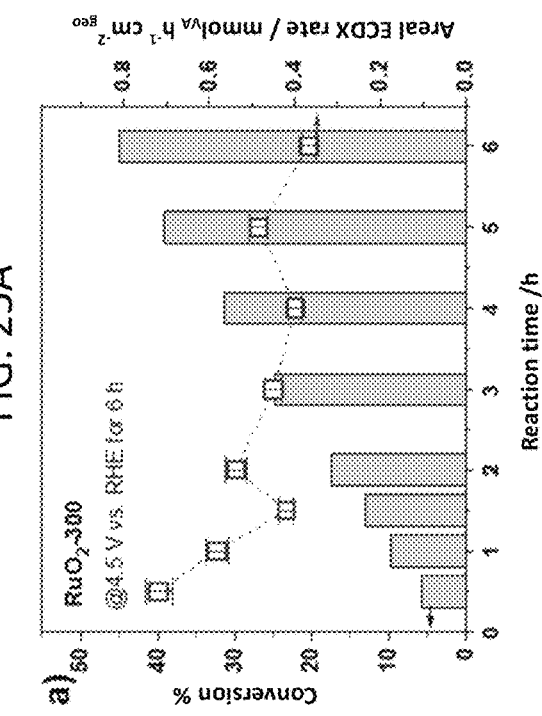

The $RuO_2$ NP's stability and corresponding electrode durability were also investigated. As shown in FIGS. 25A and 25B, $RuO_2$-300 exhibited similar Ru 3d spectra before and after 6 h of ECDX chronoamperometry tests at 4.5 V vs. RHE. Only $Ru^{4+}$ 3d peaks were observed from used $RuO_2$-300, an no $Ru^{6+}$ and $Ru^{8+}$ (i.e., $RuO_3$ and $RuO_4$ respectively) were observed, suggesting that as-synthesized $RuO_2$ is stable even when operating at 4.5 V vs. RHE. The ICP results show that <1 ppm Ru was found in the electrolyte (i.e., <1.2% of the total Ru loading) after 6 h ECDX tests, further demonstrating the good stability of $RuO_2$ NPs. Despite slight particle agglomeration observed by TEM, the average particle size only increased from 12.6 to 14.0 nm. However, the $RuO_2$-300 exhibited stable areal ECDX rates of ~0.4 $mmol_{VA}$ $h^{-1}$ $cm^{-2}_{geo}$ during a 6 h test (FIG. 26A). The electrode durability was further studied by reproducing the ECDX activity in three different chronopotentiometry tests for 1 h. As shown in FIG. 26B, there was no significant change in ECDX and OER rate as well as CE between the $1^{st}$ and $3^{rd}$ test. Overall, the results of both physical characterizations and electrochemical characterizations demonstrated the good $RuO_2$-300 stability and electrode durability under the reported reaction conditions.

Effect of $RuO_2$ and Pt Nanoparticle Sizes on VA ECDX Performance

Figure 27B:
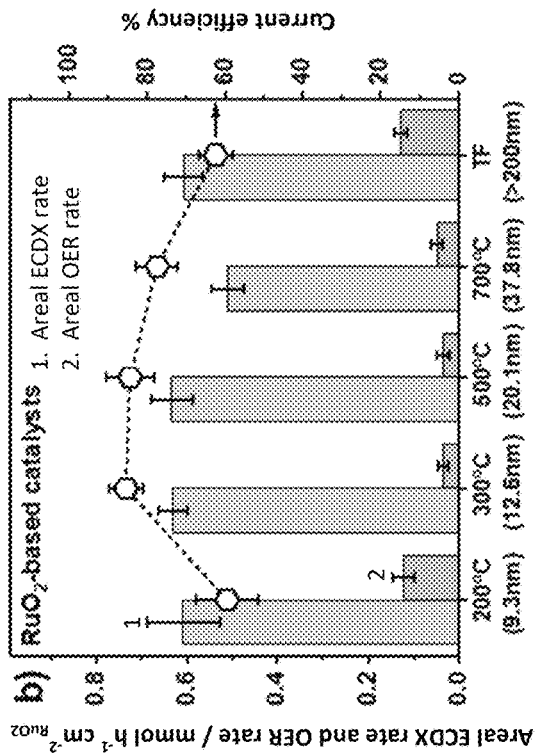
FIGS. 27A-27C show the electrochemical surface area (FIG. 27A), areal ECDX and OER rate (FIG. 27B), and TOF and specific rate of $RuO_2$ or Pt NPs as a function of particle size (FIG. 27C) of VA ECDX for 1 h over $RuO_2$-200, 300, 500, 700 and $RuO_2$-TF electrodes, at constant potential of 4.5 V vs. RHE; reaction conditions: 70 mL of 0.5M valeric acid+0.14M $Na_2SO_4$ solution (pH 6) at ~0° C.
Figure 27A:
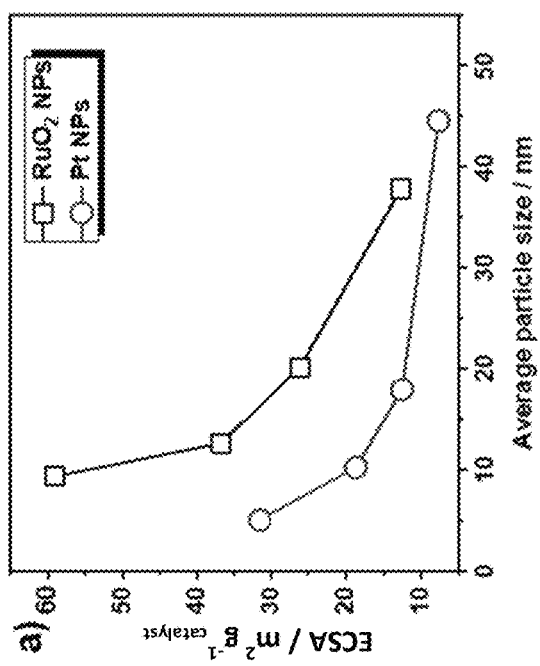

To assess the structure sensitivity of the $RuO_2$ and Pt for the ECDX reaction, $RuO_2$ and Pt NPs with different particle sizes were prepared through calcination at different temperatures. The ECSA and average particle size of $RuO_2$ and Pt nanoparticles are summarized in Table 8. As expected, the ECSA decreases as the average particle size increases for both the $RuO_2$ and Pt electrodes. Due to the higher material density of Pt than $RuO_2$, a smaller ECSA was measured from Pt NPs that have similar particle size to $RuO_2$ NPs (FIG. 27A).

Figure 27C:
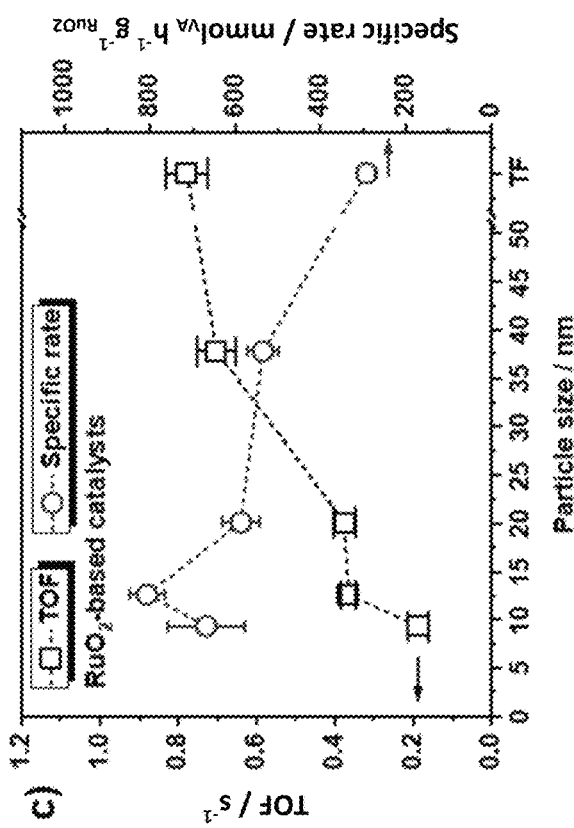

The ECDX activity of all the $RuO_2$ and Pt electrodes was studied via chronoamperometry in 0.5 M VA+0.14 M $Na_2SO_4$ solution (pH 6) at 4.5 V vs. RHE for 1 h. As shown in FIG. 27B, all the nano-scaled $RuO_2$ electrodes exhibited similar areal ECDX rates (0.6 $mmol_{VA}$ $h^{-1}$ $cm^{-2}_{RuO2}$) but different OER rates to that of $RuO_2$-TF. As the average NP size increased from 9.3 to 12.6 nm, the areal OER rate decreased≈4 times from 0.12 to 0.04 $mmol_{O2}$ $h^{-1}$ $cm^{-2}_{RuO2}$. $RuO_2$ NPs with average size between 12.6 and 20.1 nm had similar areal OER (~0.04 $mmol_{O2}$ $h^{-1}$ $cm^{-2}_{RuO2}$). This decrease in areal OER areal rate as a function of particle size was caused by the proportional decrease in the electrode ECSA. That is the OER rate normalized by the ECSA was similar for $RuO_2$ NP between 9.3 and 37.8 nm, Table 12. However, the areal OER rate increased by a factor of ~3 and 4 times when using average $RuO_2$ particles>200 nm, 0.13 $mmol_{O2}$ $h^{-1}$ $cm^{-2}_{RuO2}$, suggesting that the OER might be a structure sensitive reaction. Consequently, a peak CE of 85.4% was obtained from $RuO_2$-300 (12.6 nm), followed by CE decreasing to 62.4% (RuO2-TF) as the $RuO_2$ particle size further increased. The intrinsic ECDX activity was evaluated by normalizing ECDX rate with the number of active sites and catalyst mass to obtain TOF and specific rate, respectively, as a function of particle size (FIG. 27C). The ECDX TOF monotonically increased with particle size from 9.3 ($RuO_2$-200) to >200 nm (TF). The maximum specific rate was obtained from $RuO_2$-300 with 12.6 nm particle size. The ECDX specific rate decreased as the $RuO_2$ NP became larger. The relatively low TOF of $RuO_2$-200 could be attributed to the $Ru(OH)_x$ residue in $RuO_2$-200 sample, which could decrease the active sites for ECDX on $RuO_2$-200 electrode. In addition, all the $RuO_2$ NPs electrodes exhibited similar product selectivities to $RuO_2$-TF in the absence of new product formation, emphasizing that the product selectivity is not structure sensitive while the ECDX and OER rates appear to be structure sensitive (i.e., they are affected by the particle size). The product selectivity after 1-hr chronopotentiometry test at a constant potential of 4.5 V vs. RHE is shown in Table 13.

TABLE 12

| Electrodes | Average Mass metal [mg] | current density [mA $cm^{-2}_{geo}$] | ECDX Areal [mmol $h^{-1}$ $cm^{-2}_{geo}$] | Specific [mmol $h^{-1}$ g$^{-2}$metal] | TOF [$s^{-1}$] | OER Areal [mmol $h^{-1}$ $cm^{-2}_{geo}$] | Specific [mmol $h^{-1}$ $g^{-2}_{metal}$] | ECSA [mmol $h^{-1}$ $cm^{-2}_{ECSA}$] |
|---|---|---|---|---|---|---|---|---|
| Ti | 0 | 1.33 | 0 | 0.0 | 0 | 0.019 | 0 | 0 |
| $RuO_2$-200 | 5.46 | 32.5 | 0.53 | 579 | 0.16 | 0.147 | 161 | 2.73 |
| $RuO_2$-300 | 4.70 | 27.00 | 0.60 | 766 | 0.35 | 0.048 | 60.8 | 1.65 |
| $RuO_2$-500 | 6.47 | 25.0 | 0.59 | 545 | 0.35 | 0.051 | 47.0 | 1.80 |
| $RuO_2$-700 | 5.71 | 23.3 | 0.48 | 499 | 0.65 | 0.061 | 63.7 | 5.02 |
| $RuO_2$-TF | 12.5 | 36.7 | 0.57 | 272 | 0.72 | 0.143 | 68.8 | 11.0 |
| Pt-100 | 9.48 | 40.83 | 0.00 | 0.00 | 0 | 0.381 | 241.07 | 7.63 |
| Pt-300 | 10.2 | 37.2 | 0.00 | 0.0 | 0 | 0.347 | 204 | 10.9 |
| Pt-350 | 10.1 | 25.0 | 0.00 | 0.0 | 0 | 0.233 | 139 | 11.0 |
| Pt-400 | 10.8 | 10.3 | 0.00 | 0.0 | 0 | 0.096 | 53.6 | 6.95 |
| Pt foil | 160 | 25.8 | 0.70 | 26.2 | 31.8 | 0.014 | 0.54 | 64.1 |

TABLE 13

| | Average current | Paraffins octane | Paraffins butane | Olefins butene | Alcohols 1-butanol & 2-butanol | Carboxylic acids butanoic acid | Esters Butyl-valerate & iso-butyl-valerate |
|---|---|---|---|---|---|---|---|
| $RuO_2$-200 | 195 mA | 31.3% | 3.0% | 24.1% | 15.2% | 0.7% | 16.0% |
| $RuO_2$-300 | 162 mA | 33.2% | 3.0% | 23.8% | 12.7% | 2.8% | 11.5% |
| $RuO_2$-500 | 150 mA | 0.0% | 0.0% | 0.0% | 0.0% | 0.0% | 0.0% |
| $RuO_2$-700 | 140 mA | 45.3% | 2.8% | 18.5% | 8.8% | 0.0% | 23.7% |

Figure 28B:
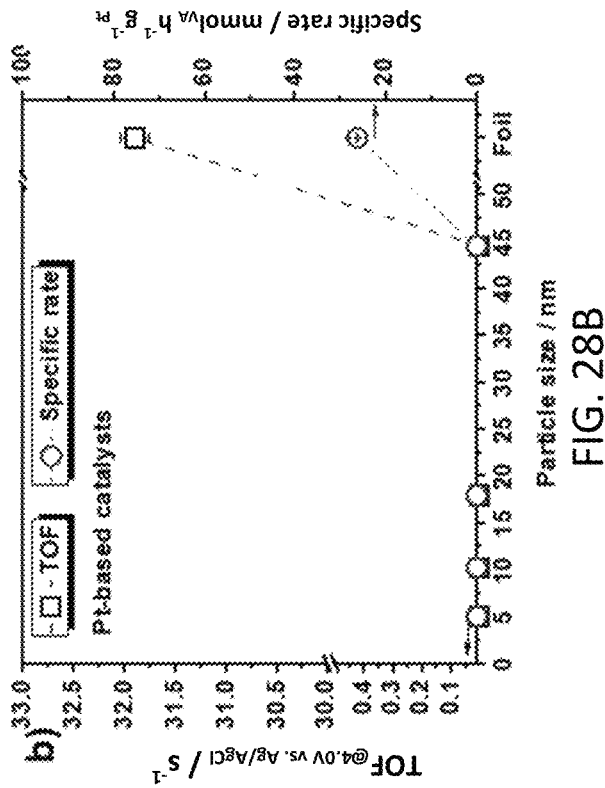
FIGS. 28A and 28B show areal ECDX and OER rate (FIG. 28A), and TOF and specific rate (FIG. 28B) of Pt NPs as a function of particle size: reaction conditions: 70 mL of 0.5 M valeric acid+0.14M $Na_2SO_4$ solution (pH 6) at ~0° C.
Figure 28A:
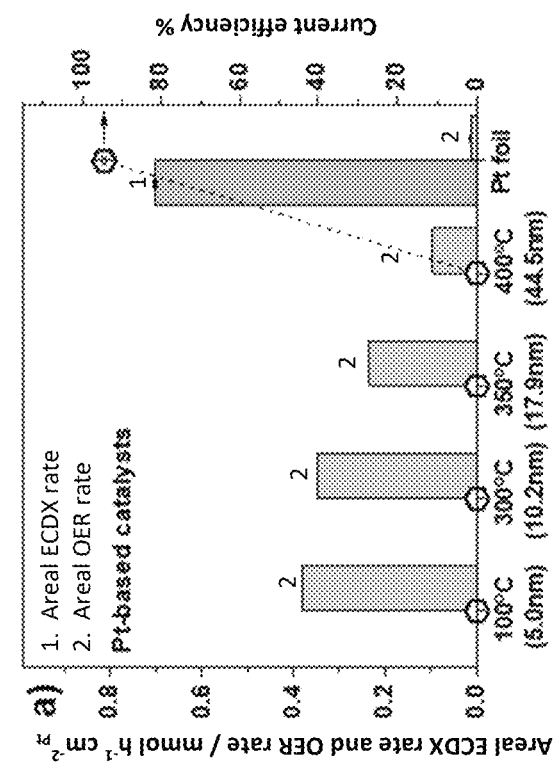

On the other hand, all nano-scaled Pt samples only favored OER. The areal OER rates decreased (from 0.38 to 0.09 $mmol_{VA}$ $h^{-1}$ $cm^{-2}_{geo}$) with increasing Pt NP size growing from 5.0 to 44.5 nm (FIGS. 28A-28B, Table 14). In contrast, bulk Pt foil favored ECDX with a high CE of 94.06%. The OER rate normalized by the ECSA shows that all the Pt NPs have >7 times lower OER activity than the bulk Pt foil (even when the bulk Pt foil operated at 94.5% CE). These results suggest that all the synthesized Pt NPs had the same negligible behavior of ECDX regardless of the average particle size change, which may be attributed to the preferable $PtO_x$ formation under the reaction conditions. Therefore, Pt NPs cannot serve as the electrocatalyst for ECDX in biomass upgrading.

TABLE 14

| Electrodes | Average Mass metal [mg] | Average current density [mA cm$^{-2}_{geo}$] | ECDX Areal [mmol h$^{-1}$ cm$^{-2}_{geo}$] | ECDX Specific [mg h$^{-1}$ g$^{-2}$metal] | ECDX TOF [s$^{-1}$] | OER Areal [mmol h$^{-1}$ cm$^{-2}_{geo}$] | OER Specific [mmol h$^{-1}$ g$^{-2}$metal] | OER ECSA [mmol h$^{-1}$ cm$^{-2}_{ECSA}$] |
|---|---|---|---|---|---|---|---|---|
| Ti | 0 | 1.33 | 0 | 0.0 | 0 | 0.019 | 0 | 0 |
| RuO$_2$-200 | 5.46 | 32.5 | 0.53 | 579 | 0.16 | 0.147 | 161 | 2.73 |
| RuO$_2$-300 | 4.70 | 27.00 | 0.60 | 766 | 0.35 | 0.048 | 60.8 | 1.65 |
| RuO$_2$-500 | 6.47 | 25.0 | 0.59 | 545 | 0.35 | 0.051 | 47.0 | 1.80 |
| RuO$_2$-700 | 5.71 | 23.3 | 0.48 | 499 | 0.65 | 0.061 | 63.7 | 5.02 |
| RuO$_2$-TF | 12.5 | 36.7 | 0.57 | 272 | 0.72 | 0.143 | 68.8 | 11.0 |
| Pt-100 | 9.48 | 40.83 | 0.00 | 0.00 | 0 | 0.381 | 241.07 | 7.63 |
| Pt -300 | 10.2 | 37.2 | 0.00 | 0.0 | 0 | 0.347 | 204 | 10.9 |
| Pt-350 | 10.1 | 25.0 | 0.00 | 0.0 | 0 | 0.233 | 139 | 11.0 |
| Pt-400 | 10.8 | 10.3 | 0.00 | 0.0 | 0 | 0.096 | 53.6 | 6.95 |
| Pt foil | 160 | 25.8 | 0.70 | 26.2 | 31.8 | 0.014 | 0.54 | 64.1 |

CONCLUSIONS

Nano-scaled RuO$_2$ and Pt particles were synthesized and evaluated for the ECDX of VA in aqueous solution at room temperature and ambient pressure. The ECDX activity (e.g., areal ECDX rate, TOF, specific rate), CE, and (non-) Kolbe product selectivity were evaluated through chronoamperometry tests at 4.5 V vs. RHE. The RuO$_2$-based electrode composed of 12.6 nm nanoparticles (RuO$_2$-300) exhibited three orders of magnitude higher ECDX specific rate and similar areal ECDX rate to the well-known best ECDX catalyst of Pt foil. In addition, RuO$_2$-300 NPs showed good material stability with robust electrode durability during a 6 h chronoamperometry test without apparent surface composition change and particle agglomeration. In contrast, nano-scaled Pt favored only OER, which is attributed to Pt oxide formation to inhibit ECDX on Pt NPs surface. The Pt nanoparticles had no apparent ECDX activity regardless of particle size.

The TOF of ECDX increased with RuO$_2$ particle size, while the specific activity decreased as RuO$_2$ particle size decreased. The maximum specific ECDX rate was obtained from RuO$_2$ nanoparticles with an average 12.6 nm particle size. However, similar (non-) Kolbe product selectivity was observed for all the nano-scaled RuO$_2$ electrodes. These results suggest that the ECDX rates is structure sensitive while the product selectivity is structure insensitive. As compared to bulk Pt foil, RuO$_2$ NPs favored non-Kolbe products (i.e., butane, butene, butanol, and butanoic acid, etc.), while higher Kolbe products (i.e., octane) were obtained from Pt foil. The ECDX performance of the RuO$_2$-300 is also potential-dependent. The ECDX rate, OER rate, and Kolbe selectivity increased with potential. At 2.5 V vs. RHE, the RuO$_2$ NPS were selective towards esterification products but at 4.5 V vs. RHE the Kolbe selectivity increased at the expense of the esterification selectivity.

Overall, this work demonstrates that nano-scaled RuO$_2$ electrodes are stable for the ECDX reaction and can achieve similar activity to bulk electrodes at a fraction of the metal loading. Compared to Pt, RuO$_2$ NPs are a more suitable electrode material for the development of active, lower cost electrodes for the ECDX reaction.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:
1. An anode, comprising:
  a titanium support; and
  RuO$_2$ particles deposited directly onto a surface of the titanium support, the RuO$_2$ particles having an areal electrocatalytic decarboxylation rate to areal oxygen evolution reaction rate ratio of at least 5 and an average size of 12 nm to 40 nm.
2. The anode of claim 1, wherein the titanium support comprises titanium foil.
3. The anode of claim 1, further comprising a polymeric coating on the RuO$_2$ particles, the polymeric coating comprising poly(vinylidene fluoride) or a tetrafluoroethylene polymer.
4. The anode of claim 3, wherein the tetrafluoroethylene polymer is a copolymer of tetrafluoroethylene and a perfluoro (vinyl ether) monomer comprising a sulfonic acid terminal group.
5. The anode of claim 1, wherein:
  (i) the RuO$_2$ particles have a specific surface area of 40 m$^2$ $g_{RuO2}^{-1}$ to 100 m$^2$ $g_{RuO2}^{-1}$; or
  (ii) the anode has an electrochemical surface area of 25 m$^2$ $g_{RuO2}^{-1}$ to 60 m$^2$ $g_{RuO2}^{-1}$; or
  (iii) both (i) and (ii).
6. The anode of claim 1, wherein the RuO$_2$ particles have an areal electrocatalytic decarboxylation rate to areal oxygen evolution reaction rate ratio of at least 10, and an average size of 12 nm to 20 nm.
7. A flow cell, comprising:
  an anode according to claim 1;
  a cathode; and
  a separator positioned between the anode and the cathode.
8. The flow cell of claim 7, wherein the cathode comprises Pd/C or Cu/C.
9. An anode, comprising:
  a titanium foil support having a thickness of 0.1 mm to 2 mm; and

RuO$_2$ particles deposited directly onto a surface of the titanium foil support, wherein
(i) the RuO$_2$ particles have an average size of 12 nm to 20 nm,
(ii) the RuO$_2$ particles have a specific surface area of 40 m$^2$ g$_{RuO2}^{-1}$ to 100 m$^2$ g$_{RuO2}^{-1}$,
(iii) the anode has an electrochemical surface area of 25 m$^2$ g$_{RuO2}^{-1}$ to 60 m$^2$ g$_{RuO2}^{-1}$,
(iv) the RuO$_2$ particles have an areal electrocatalytic decarboxylation rate to areal oxygen evolution reaction rate ratio of at least 10, and
(v) the anode has a RuO$_2$ loading on the titanium foil support of 0.5 mg cm$^{-2}_{geo}$ to 2 mg cm$^{-2}_{geo}$.

10. A method, comprising:
flowing a process stream through the flow cell of claim 7, in the absence of added hydrogen, at a temperature of 0° C. to 50° C. and at atmospheric pressure;
applying a potential across the flow cell such that the anode is positive with respect to the cathode, thereby electrocatalytically oxidizing compounds in the process stream to produce a treated process stream at the anode and generating hydrogen gas as a byproduct at the cathode.

11. The method of claim 10, wherein the potential is from 2 V to 5 V vs. a reversible hydrogen electrode (RHE).

12. The method of claim 10, wherein the temperature is 15° C. to 25° C.

13. The method of claim 10, wherein the anode has:
(i) an areal electrocatalytic decarboxylation rate to areal oxygen evolution reaction rate ratio of at least 5; and
(ii) a hydrocarbon selectivity of at least 20%; both (i) and (ii).

14. The method of claim 10, wherein:
(i) the process stream comprises a crude bio-oil, wastewater, or a combination thereof; or
(ii) the process stream is provided by hydrothermal liquefaction of a feedstock; or
(iii) both (i) and (ii).

15. The method of claim 10, wherein electrocatalytically oxidizing the compounds in the process stream comprises decarboxylating of carboxylic acids, oxidizing nitrogen-containing compounds, oxidizing sulfur-containing compounds, or any combination thereof.

16. The method of claim 10, wherein the process stream comprises organic compounds and electrocatalytically oxidizing the organic compounds produces aliphatic compounds, ketones, esters, alcohols, or a combination thereof.

17. The method of claim 16, wherein the aliphatic compounds comprise C1-C8 aliphatic compounds, the method further comprising:
separating the C1-C8 aliphatic compounds from the treated process stream; and
using at least a portion of C1-C8 aliphatic compounds to generate heat.

18. The method of claim 10, further comprising using at least a portion of the hydrogen gas to generate electricity.

19. The method of claim 10, wherein the process stream comprises a crude bio-oil, the method further comprising using at least a portion of the hydrogen gas in a subsequent catalytic hydrotreatment of the treated process stream.

20. The method of claim 10, wherein the process stream comprises wastewater and electrocatalytically oxidizing compounds in the process stream produces hydrocarbons and gases, the method further comprising:
separating the gases and the hydrocarbons from water in the treated process stream;
utilizing at least a portion of the hydrocarbons to generate heat; and
recycling at least a portion of the water to a hydrothermal liquefaction process.

* * * * *